(12) United States Patent
Kobayashi et al.

(10) Patent No.: US 6,246,487 B1
(45) Date of Patent: Jun. 12, 2001

(54) MULTI-FUNCTION UNIT, SERVER AND NETWORK SYSTEM HAVING MULTI-FUNCTION UNIT

(75) Inventors: Sumitake Kobayashi; Keiji Ishiguro; Ken Murata; Takashi Kawasaki, all of Kawasaki; Tatsuru Miyata; Shigeo Ichikawa, both of Ishikawa, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,663

(22) Filed: Mar. 24, 1998

(30) Foreign Application Priority Data

Apr. 4, 1997 (JP) .................................................. 9-086691

(51) Int. Cl.[7] ............................. B41B 15/00; G03G 15/00
(52) U.S. Cl. ................................. 358/1.13; 358/1.6; 399/1
(58) Field of Search ........................................ 358/402, 407, 358/442, 468, 1.13, 498, 1.1, 1.6, 1.12; 399/391, 405, 16, 1; 271/298, 279, 280; 347/101, 104

(56) References Cited

U.S. PATENT DOCUMENTS

| | | | |
|---|---|---|---|
| 4,947,345 | * 8/1990 | Paradise et al. | 358/442 |
| 5,396,345 | 3/1995 | Motoyama | 358/448 |
| 5,640,232 | * 6/1997 | Miyake et al. | 399/18 |
| 5,768,483 | * 6/1998 | Maniwa et al. | 358/1.15 |
| 5,970,223 | * 10/1999 | Debes et al. | 358/1.16 |
| 5,970,224 | * 10/1999 | Salgado et al. | 358/1.16 |
| 5,982,510 | * 11/1999 | Funahashi | 358/468 |
| 6,075,928 | * 6/2000 | Kitada et al. | 358/1.13 |

FOREIGN PATENT DOCUMENTS

| | | |
|---|---|---|
| 7-149471 | * 6/1995 | (JP) . |
| 8-36472 | 2/1996 | (JP) . |
| 8-87391 | 4/1996 | (JP) . |
| 9-277656 | * 10/1997 | (JP) . |

OTHER PUBLICATIONS

Fujitsu (1997) vol. 48, No. 2, pp. 210–216; Coden: Fujtar ISSN: 0016–2515.
Fujitsu (1997) vol. 48, No. 2, pp. 217–221; Coden: Fujtar ISSN: 0016–2515.

* cited by examiner

Primary Examiner—Kimberly A. Williams
(74) Attorney, Agent, or Firm—Staas & Halsey LLP

(57) ABSTRACT

A multi-function unit includes a printer engine, a logical copying machine carrying out a copying process with respect to a recording medium by the printer engine, and a plurality of logical printers carrying out printing processes with respect to the recording medium by the printer engine. The logical copying machine and the logical printers carry out apparent parallel operations.

30 Claims, 50 Drawing Sheets

FIG. 27

| NAME | ADDRESS | FAX ADDRESS | |
|---|---|---|---|
| TOKYO HEAD OFFICE | tokyo.abc | 0 3 | |
| OSAKA BRANCH OFFICE | osaka.abc | 0 6 | |
| . | . | . | |
| . | . | . | |
| . | . | . | |

FIG. 42

```
                                                        ╭324
┌─────────────────────────────────────────────────────────┐
│  FOLDER PART NAME      : FOLDER 1                       │
│         .                                               │
│         .                                               │
│         .                                               │
│  NOTIFICATION SPECIFIED : 0 0   NONE                    │
│                           0 1   UPON REGISTRATION       │
│                                                         │
│  NOTIFYING METHOD      : m a i l                        │
│  NOTIFYING DESTINATION : h i r a k i @ a b c            │
└─────────────────────────────────────────────────────────┘
```

FIG. 48

```
                                                  351
ID:3820
    PASSWORD:××××××××(ENCIPHERED)
    NOTIFY:Mail  hiraki@abc
    FOLDER:HIRAKI'S PERSONAL FOLDER
ID:1210
    PASSWORD:××××××××
                       .
                       .
                       .
```

FIG. 49

DATA・TIME  ID  AMOUNT USED FOR EACH PAPER SIZE/SIDE
              OR RATE (PRICE)

・
・
・
・
・

371

MULTI-FUNCTION UNIT, SERVER AND NETWORK SYSTEM HAVING MULTI-FUNCTION UNIT

BACKGROUND OF THE INVENTION

The present invention generally relates to multi-function units, servers and network systems having multi-function units, and more particularly to a multi-function unit having multi-functions which include the functions of a scanner, facsimile machine, copying machine, printer, document registering unit, display unit and the like, and to a server which is coupled to such a multi-function unit, and also to a network system having such a multi-function unit.

Conventionally, it is known to process information in a computer system including a plurality of computers which are coupled by a network such as a local area network (LAN). In such a computer system, information can be printed on a printer which is coupled to the LAN by sending a print instruction to the printer from each computer. However, in such a computer system, a copying machine and the like are not coupled to the LAN, and the copying machine and the like themselves are provided as independent equipments with respect to the computer system.

If a facsimile machine and a copying machine are respectively provided independently of the computer system, for example, the space utilization efficiency is poor, and the cost of the system increases by a sum of the costs of the two independent equipments, namely, the facsimile machine and the copying machine. Hence, a multi-function unit having both the facsimile function and the copying function has been proposed. But even in the case of this proposed multi-function unit, the multi-function unit itself is still an independent equipment which is not coupled to the computer system via the network.

On the other hand, in the conventional computer system, a manager on the server side collects, processes and transmits the information, and the so-called pull-type structure is used whereby the end user goes to the server to retrieve the information. On the contrary, the so-called push-type structure has also been proposed whereby the server side distributes the information and the end user receives this information from the server.

Therefore, conventionally, there were problems in that equipments such as the copying machine cannot operate by linking to a computer system and that the space utilization efficiency is poor, because each equipment is an independent equipment by itself. In addition, even in the case of the multi-function unit having both the facsimile function and the copying function, for example, similar problems existed since the multi-function unit is also an independent equipment by itself.

On the other hand, the conventional computer system employing the push-type or pull-type structure is designed by focusing mainly on the server, and there was no concept of a push-type or pull-type structure which is designed by focusing mainly on the end user. As a result, there also were problems in that the usage and flexibility of the conventional computer system are not always satisfactory.

SUMMARY OF THE INVENTION

Accordingly, it is a general object of the present invention to provide a novel and useful multi-function unit, server and network system having the multi-function unit, in which the problems described above are eliminated.

Another and more specific object of the resent invention is to provide a multi-function unit which can operate as a part of a computer system, a server which can realize the concept of a push-type or pull-type structure which is designed by focusing mainly on the end user by linking with the multi-function unit, and a network system which includes the multi-function unit and can realize the concept of a push-type or pull-type structure which is designed by focusing mainly on the end user.

Still another object of the present invention is to provide a multi-function unit comprising a printer engine, a logical copying machine carrying out a copying process with respect to a recording medium by the printer engine, and a plurality of logical printers carrying out printing processes with respect to the recording medium by the printer engine, where the logical copying machine and the logical printers carry out apparent parallel operations. According to the multi-function unit of the present invention, it is possible to simultaneously carry out the copying process and the print process in an apparent parallel manner.

A further object of the present invention is to provide a server connectable via a network to an equipment which has at least a print function, comprising a print processor having a spool part in which print data are queued, and transferring the print data queued in the spool part to the equipment according to a print protocol, and a routing information processor having a routing list which stores at least an address of the equipment or another server coupled to the network, where a transmitting destination of the print data is specified by accessing the routing list. According to the server of the present invention, even if the operator does not know the address of the equipment at the printing destination, it is possible to acquire the address of the equipment at the printing destination from the routing list, without having to make an inquiry to a provider or the like of the network.

Another object of the present invention is to provide a server connectable via a network to an equipment which has at least a scanner function, comprising a filing processor having a folder which stores image data read from a document by the equipment, and carrying out a document registration process by controlling input and output of the image data with respect to the folder, and a routing information processor having a routing list which stores at least an address of the equipment or another server coupled to the network, where a transmitting destination of the print data is specified by accessing the routing list. According to the server of the present invention, even if the operator does not know the address of the equipment at the document registering destination, it is possible to acquire the address of the equipment at the document registering destination from the routing list, without having to make an inquiry to a provider or the like of the network.

Still another object of the present invention is to provide a server connectable via a network to an equipment which has at least a scanner function, comprising a facsimile processor having a reception register and a transmission register which store image data, and controlling facsimile transmission and reception of the image data, and a routing information processor having a routing list which stores at least an address of the equipment or another server coupled to the network, where the facsimile processor automatically retrieves and selects a route having a minimum transmission cost by accessing the routing list. According to the server of the present invention, even if the operator does not know the structure of the network system, it is possible to automatically retrieve a route having a minimum transmission cost from the routing list and to make a facsimile transmission using this route.

A further object of the present invention is to provide a server connectable via a network to an equipment which has at least a scanner function and an operation panel, comprising a facsimile processor having a reception register and a transmission register which store image data, and controlling facsimile transmission and reception of the image data, and a telephone directory processor having a telephone number list which stores telephone numbers, and controlling input and output of a telephone number used for a facsimile process, where the telephone directory processor generates a telephone directory to be displayed on the operation panel based on the telephone number list. According to the server of the present invention, it is possible to acquire the facsimile transmission destination from the telephone directory, without having the operator be aware of the network structure.

Another object of the present invention is to provide a network system comprising at least one computer, at least one multi-function unit comprising a printer engine, a logical copying machine carrying out a copying process with respect to a recording medium by the printer engine, and a plurality of logical printers carrying out printing processes with respect to the recording medium by the printer engine, where the logical copying machine and the logical printers carry out apparent parallel operations, and one or a plurality of networks couple the computer and the multi-function unit. According to the network system of the present invention, it is possible to request various processes to an arbitrary multi-function unit within the network system and to make various notifications to an arbitrary server within the network system, thereby making it possible to realize the concept of the push-type structure and the pull-type structure which are centered on the end user.

Other objects and further features of the present invention will be apparent from the following detailed description when read in conjunction with the accompanying drawings.

BRIEF DESCRIPTION OF THE DRAWINGS

FIG. 27 is a diagram showing an embodiment of the routing list which is automatically generated;

FIG. 42 is a diagram showing a folder information list;

FIG. 48 is a diagram showing an identification list;

FIG. 49 is a diagram showing an accounting log; and

DESCRIPTION OF THE PREFERRED EMBODIMENTS

Figure 1:
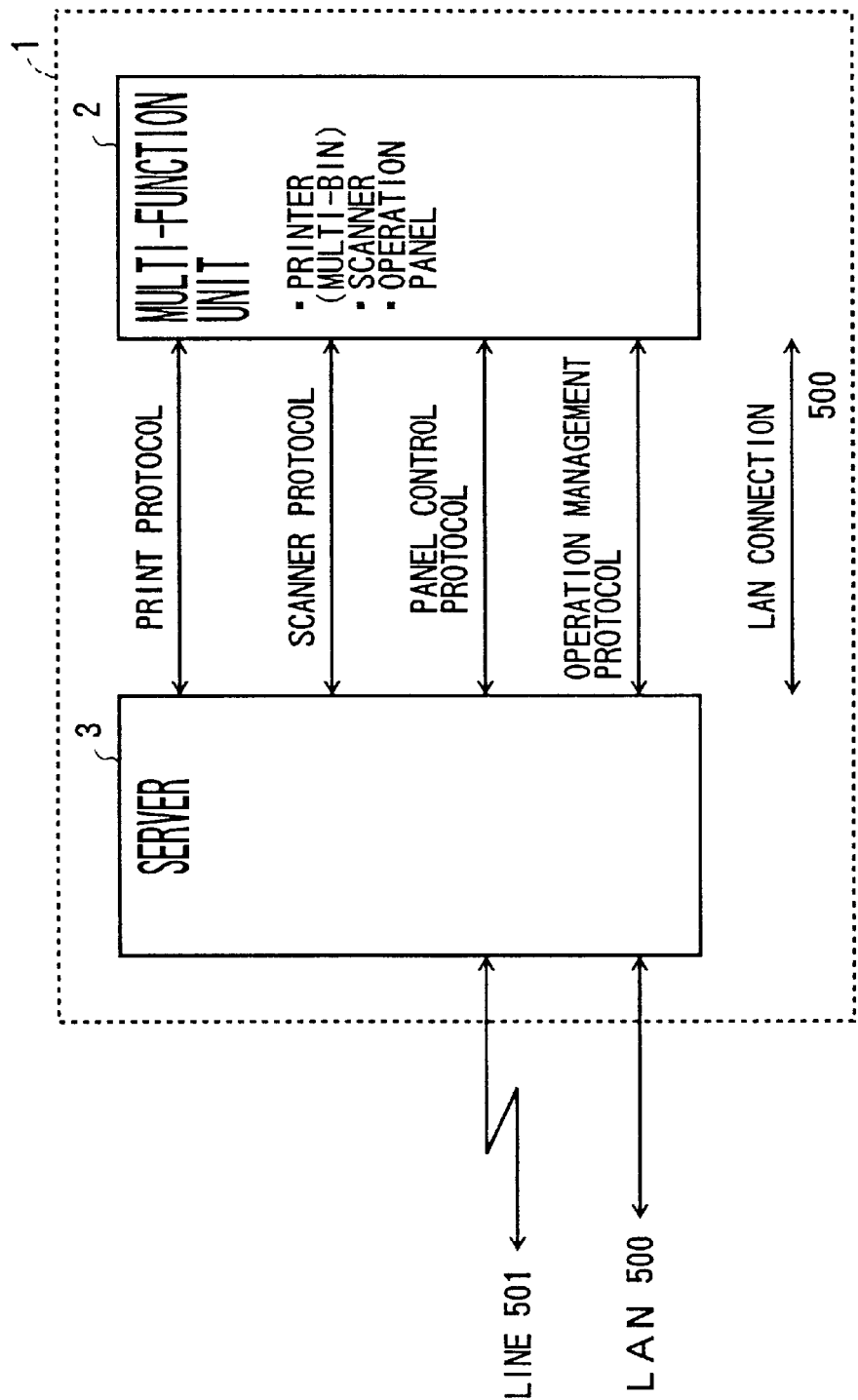
FIG. 1 is a system block diagram showing the general construction of a composite apparatus.

First, a description will be given of a composite apparatus which is made up of an embodiment of a multi-function unit according to the present invention and an embodiment of a server according to the present invention. FIG. 1 is a system block diagram showing the general construction of the composite apparatus. A composite apparatus 1 includes a multi-function unit 2 and a server 3 which are coupled via a LAN 500. As will be described later, the multi-function unit 2 includes a printer part, a scanner part, an operation panel, an equipment state managing part and the like. The server 3 includes a computer such as a personal computer, which is coupled to a line 501 such as a telephone line and to the LAN 500.

Exchange of information between the server 3 and the printer part of the multi-function unit 2 is made according to a print protocol. The print protocol is used to transfer print data from the server 3 to a logical printer within the multi-function unit 2, and a number of sessions equal to the number of logical printers are set up. Exchange of information between the server 3 and the scanner part of the multi-function unit 2 is made according to a scanner protocol. The scanner protocol is used to transfer data read from a document by the scanner part to the server 3.

Exchange of information between the server 3 and the operation panel of the multi-function unit 2 is made according to a panel control protocol. The panel control protocol is used to notify the server 3 of event generation information at a time when an operation button of the operation panel is pushed, and to acquire display data if necessary. For example, when an operation button of the operation panel for displaying a telephone directory is pushed, the server 3 is notified of a request for telephone directory data together with the event generation information which is generated by the pushing of this operation button. In response to such a notification from the operation panel, the server 3 sends the telephone directory data to the multi-function unit 2. In addition, according to the panel control protocol, the server 3 is notified of facsimile transmission start information, document registration start information and the like from the operation panel, and the server 3 carries out a process based on such start information.

Exchange of information between the server 3 and the equipment state managing part of the multi-function unit 2 is made according to an operation management protocol. The operation management protocol is used to notify the server 3 of information related to the state of the multi-function unit 2. The information notified to the server 3 according to the operation management protocol includes (a) operation state information indicating that the multi-function unit 2 is carrying out a copying operation, a scanner operation, or a print operation, (b) printed sheet information indicating the number of printed sheets (or prints) made for each paper size with respect to a logical copying machine and the logical printers of the multi-function unit 2, (c) supply information indicating replenishing/replacing times (or intervals) and the like of supplies such as toner, developing agent and photoconductive body, (d) various setting information with respect to the multi-function unit 2, and (e) error information related to various parts of the multi-function unit 2, and the like.

Hence, the server 3 is coupled to the multi-function unit 2 according to 4 protocols, and controls the multi-function unit 2. In addition, the server 3 links to another server or computer (client) which is coupled to the LAN 500, and realizes functions such as printing, document registration, facsimile communication and operation management via a network such as the LAN 500.

Figure 2:
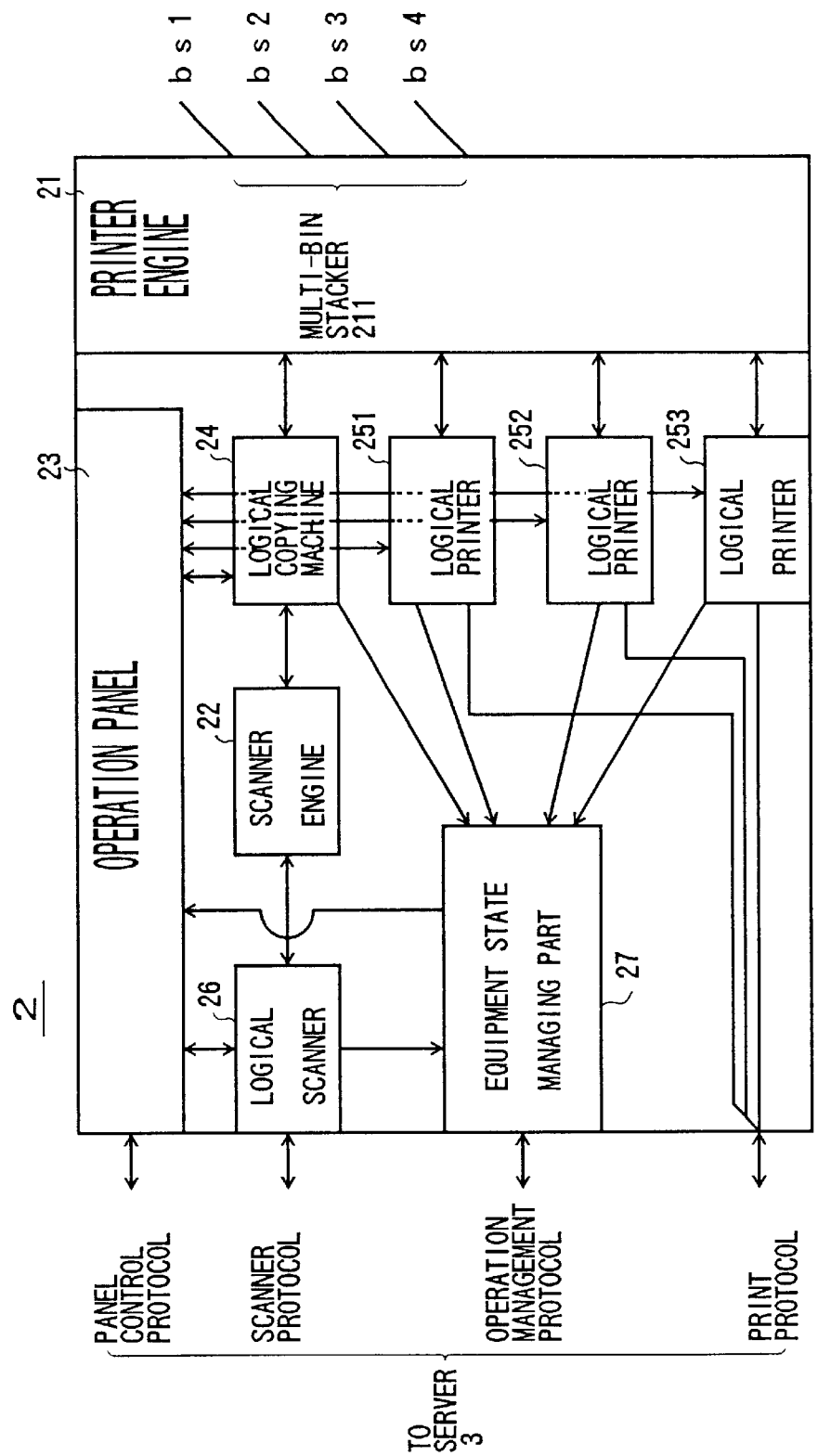
FIG. 2 is a system block diagram showing the construction of an embodiment of a multi-function unit according to the present invention.

FIG. 2 is a system block diagram showing the construction of the embodiment of the multi-function unit 2. The multi-function unit 2 includes a printer engine 21, a scanner engine 22, an operation panel 23, a logical copying machine 24, logical printers 251 through 253, a logical scanner 26, and an equipment state managing part 27 which are connected as shown in FIG. 2. The printer engine 21 and the logical printers 251 through 253 form the printer part described above. The scanner engine 22 and the logical scanner 26 form the scanner part described above. The functions of the logical copying machine 24, the logical printers 251 through 253, the logical scanner 26 and the equipment state managing part 27 may be realized by a combination of one or a plurality of processors such as a central processing unit (CPU), and a memory which stores data and programs to be executed by the processor.

In this embodiment, the printer engine 21 is made of a known laser printer which uses cut recording paper, and is provided with a plurality of paper supply hoppers and a multi-bin stacker 211. However, the printer engine 21 is of course not limited to a laser printer which uses a photoconductive body, and further, a recording medium used by the printer engine 21 is not limited to the cut recording paper. For the sake of convenience, FIG. 2 shows a case where a number of bin stackers of the multi-bin stacker 211 is 4, but the number of bin stackers is of course not limited to 4.

The scanner engine 22 has a known construction including an automatic document feeder (ADF) and a document reader which employs a flat bed. In this embodiment, the document reader is capable of simultaneously reading both sides of the document.

The logical scanner 26 issues an operation instruction with respect to the scanner engine 22 based on a control code of the scanner protocol. Image data read from the document by the scanner engine 22 are transferred to the server 3 by the logical scanner 26.

In this embodiment, the operation panel 23 includes a known liquid crystal touch panel which forms a display part and a part of an operation part, and various operation buttons. However, the operation panel 23 is of course not limited to the liquid crystal touch panel. In addition, the operation panel 23 may be formed by a touch panel which forms the display part and the entire operation part.

The logical copying machine 24 prints the data read from the document by the scanner engine 22 onto the recording paper by the printer engine 21. In this case, various setting information such as the number of sheets to be printed and the magnification (enlarge/reduce rate) is input from the operation panel 23. The logical copying machine 24 operates based on the various setting information which is input, and issues an instruction to operate with respect to the scanner engine 22 and the printer engine 21. A bin stacker to which the printed recording paper is to be ejected may be set in advance.

Various image processes such as the magnification are carried out using at least one of the scanner engine 22 and the logical copying machine 24. In this embodiment, the various image processes are carried out by the scanner engine 22.

The logical printers 251 through 253 respectively print the print data received from the server 3 according to the print protocol onto the recording paper by the printer engine 21. The printer engine 21 supplies the recording paper from the paper supply hopper which is specified by a command or a setting, and ejects the printed recording paper to the stacker bin which is specified by a command or a setting. The paper supply hopper and the stacker bin to be used can be specified for each of the logical printers 251 through 253.

The logical printers 251 through 253 can operate with different emulations. For example, the logical printer 251 may operate with a first emulation such as a FM emulation and the logical printer 252 may operate with a second emulation such as an ESC/P emulation, so as to realize multi-emulation. Since only 1 physical printer engine 21 is provided with respect to the 3 logical printers 251 through 253, the logical printers 251 through 253 successively make a print start operation with respect to the printer engine 21 in the order with which each page is printed. As a result, although only 1 physical printer engine 21 is provided, it appears as if the 3 logical printers 251 through 253 can operate in parallel simultaneously.

It is possible to simultaneously set up a number of print protocols equal to the number of logical printers. In addition, only 3 logical printers are provided in FIG. 2 for the sake of convenience, but the number of logical printers is not limited to 3, and an arbitrary plural number of logical printers may be provided.

The logical printer itself is known, and is proposed in Japanese Laid-Open Patent Applications No.8-36472 and No.8-87391, for example. For this reason, a detailed description on this logical printer will be omitted in this specification.

The equipment state managing part 27 is coupled to the logical copying machine 24, the logical scanner 26 and the logical printers 251 through 253, and obtains information related to the state of the multi-function unit 2 by gathering information from these logical elements. The information related to the state of the multi-function unit 2 is notified from the equipment state managing part 27 to the server 3 according to the operation management protocol. In addition, the equipment state managing part 27 displays on the operation panel 23 a server message which is notified from the server 3 according to the operation management protocol.

The basic construction of the multi-function unit 2 is not limited to that shown in FIG. 2, and the printer part and the scanner part may be provided as independent units with respect to the multi-function unit 2.

Figure 3:
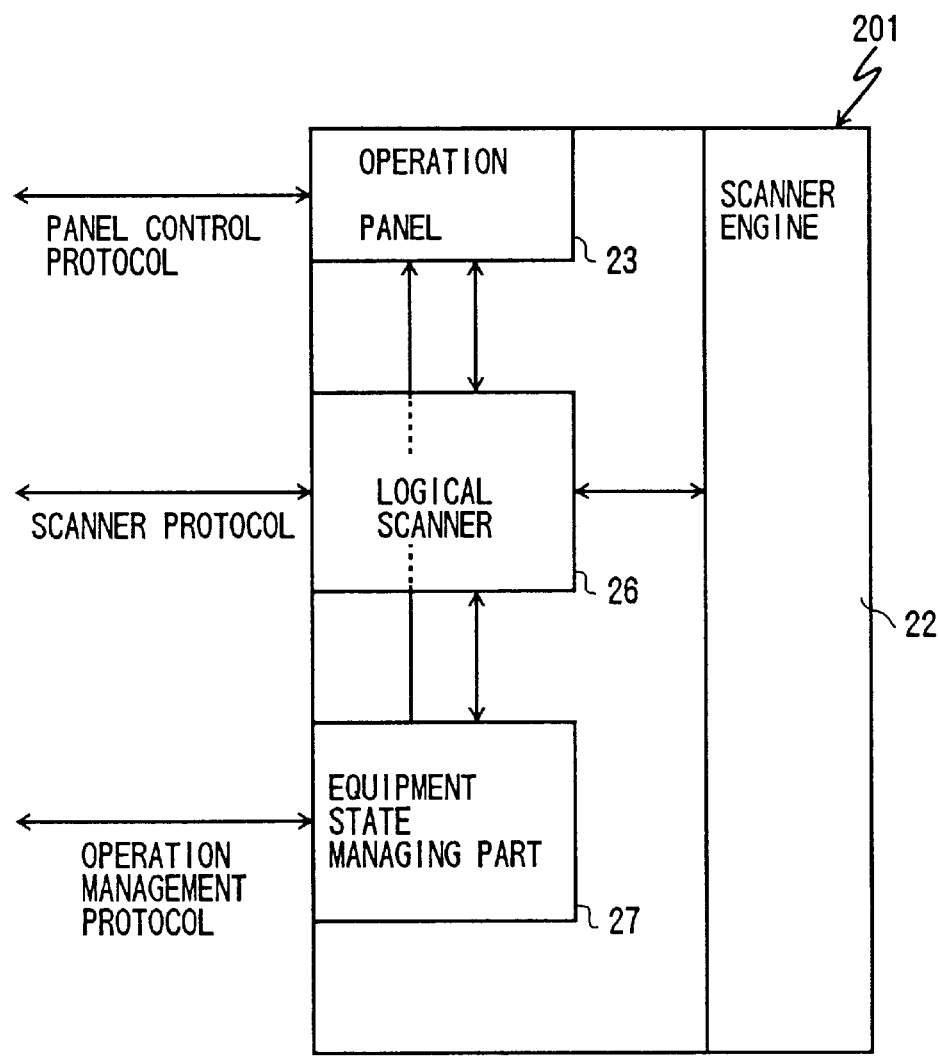
FIG. 3 is a system block diagram showing the construction of a first modification of the embodiment of the multi-function unit.

FIG. 3 is a system block diagram showing the construction of a first modification of the embodiment of the multi-function unit 2. In FIG. 3, those parts which are the same as those corresponding parts in FIG. 2 are designated by the same reference numerals, and a description thereof will be omitted. In this case, a part of the multi-function unit 2 is made up of a scanner part 201 which is formed as an independent unit with respect to the remaining part of the multi-function unit 2.

Figure 4:
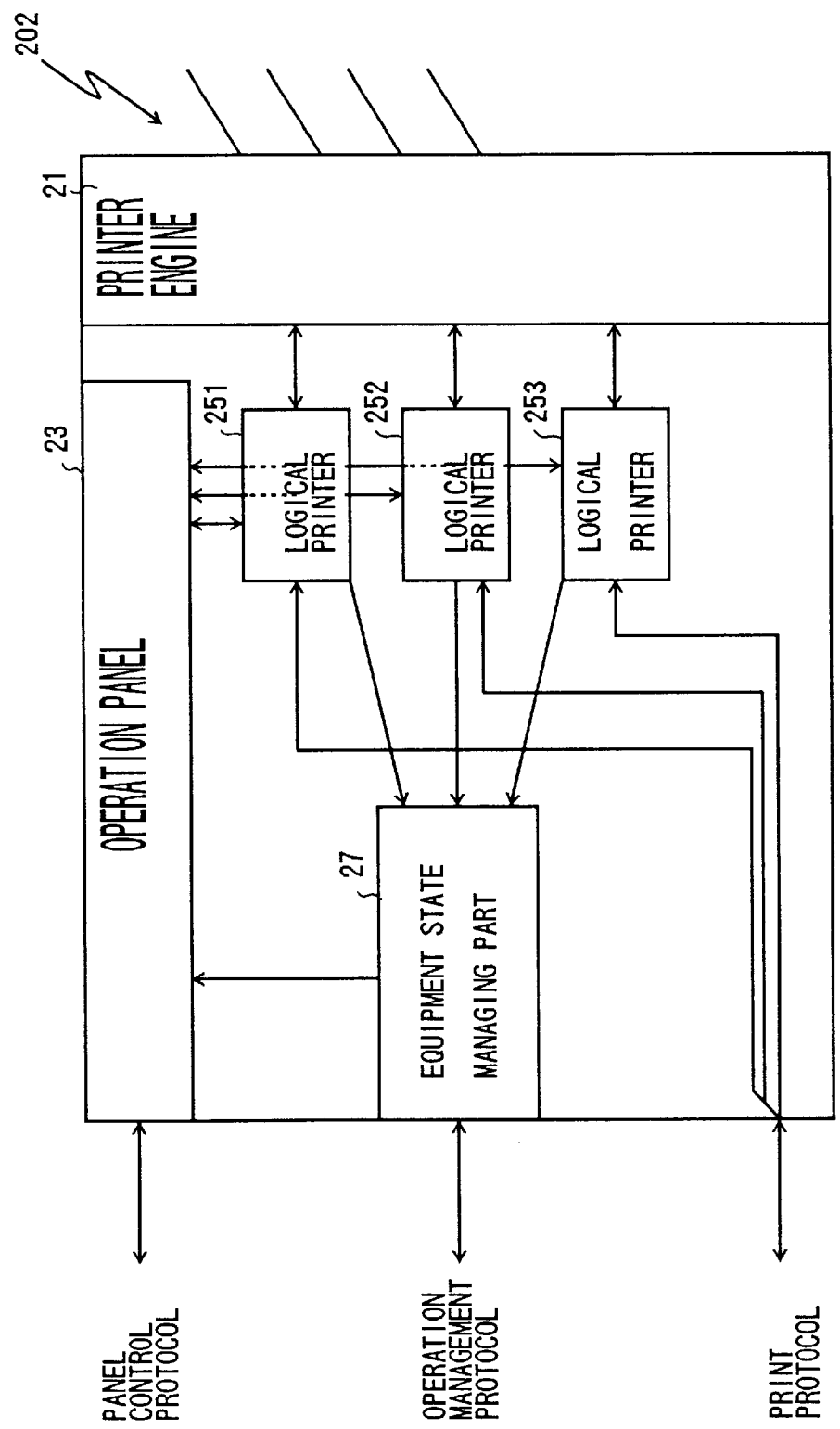
FIG. 4 is a system block diagram showing the construction of a second modification of the embodiment of the multi-function unit.

FIG. 4 is a system block diagram showing the construction of a second modification of the multi-function unit 2. In FIG. 4, those parts which are the same as those corresponding parts in FIG. 2 are designated by the same reference numerals, and a description thereof will be omitted. In this case, a part of the multi-function unit 2 is made up of a printer part 202 which is formed as an independent unit with respect to the remaining part of the multi-function unit 2.

Figure 5:
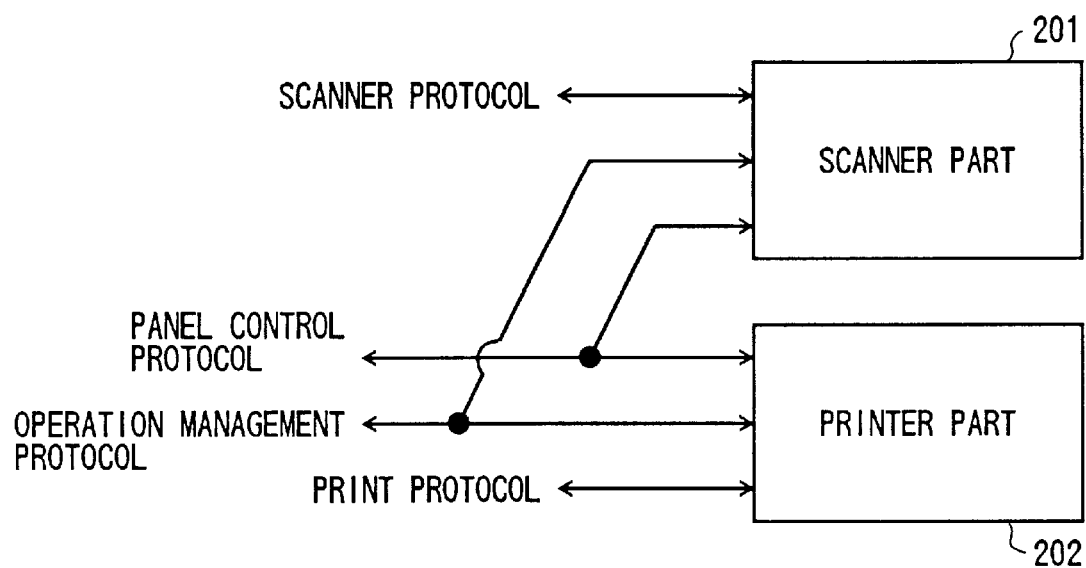
FIG. 5 is a system block diagram showing the construction of a third modification of the embodiment of the multi-function unit.

FIG. 5 is a system block diagram showing the construction of a third modification of the multi-function unit 2. In FIG. 5, those parts which are the same as those corresponding parts in FIGS. 3 and 4 are designated by the same reference numerals, and a description thereof will be omitted. In this case, the multi-function unit 2 is made up of a scanner part 201 shown in FIG. 3 and a printer part 202 shown in FIG. 4 which are formed as mutually independent units. In this third modification, the logical copying machine 24 shown in FIG. 2 is not provided within the multi-function unit 2.

Of course, the multi-function unit 2 may have a construction which is an arbitrary combination of the structures shown in FIGS. 2 through 5.

Figure 6:
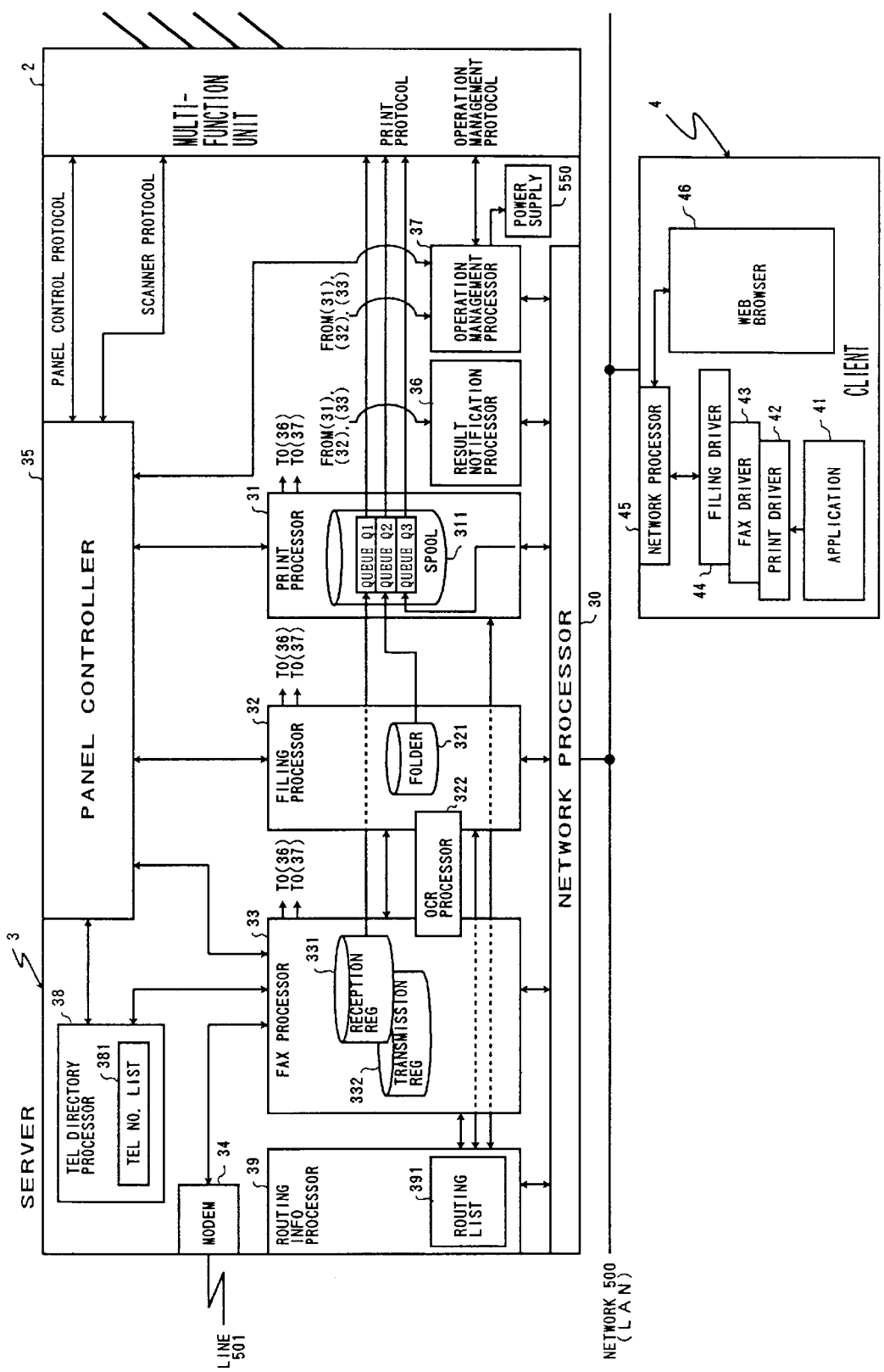
FIG. 6 is a system block diagram showing the construction of an embodiment of a server according to the present invention.

FIG. 6 is a system block diagram showing the construction of the embodiment of the server. The server 3 includes a network processor 30, a print processor 31, a filing processor 32, a facsimile processor 33, a modem 34, a panel controller 35, a result notification processor 36, an operation managing processor 37, a telephone directory processor 38, and a routing information processor 39 which are coupled as shown in FIG. 6. For the sake of convenience, FIG. 6 also shows a computer (client) 4 which is coupled to the LAN 500 to which the multi-function unit 2 is coupled.

The functions the network processor 30, the print processor 31, the filing processor 32, the facsimile processor 33, an optical character reader (OCR) processor 322, the panel controller 35, the result notification processor 36, the operation managing processor 37, the telephone directory processor 38 and the routing information processor 39 may be realized by a combination of one or a plurality of processors such as a CPU, and a memory which stores data and programs to be executed by the processor.

The network processor 30 is coupled to the print processor 31, the filing processor 32, the facsimile processor 33, the panel controller 35, the result notification processor 36, the operation managing processor 37 and the routing information processor 39, and controls the exchange of information between the LAN 500 and these processors 31, 32, 33, 35, 36, 37 and 39. In addition, the network processor 30 controls the TCP/IP and the http protocol in the layer higher than the TCP/IP. The communication between the server 3 and the computer 4 is made according to the http protocol. Although this embodiment uses the http protocol, other protocols may be used as long as the protocol has a bidirectional communication function.

The print processor 31 includes a spool part 311 in which the print data are queued. The print data queued in the spool part 311 are successively transferred for example to the logical printer 251 within the multi-function unit 2 according to the print protocol. The number of queues within the spool part 311 corresponds to the number of logical printers provided within the multi-function unit 2. In this embodiment, 3 queues Q1 through Q3 are provided within the spool part 311 because the 3 logical printers 251 through 253 are provided within the multi-function unit 2. For example, the queue Q1 is used for printing facsimile reception data, the queue Q2 is used for printing data of a document folder 321 within the filing processor 32, and the queue Q3 is used for printing data transferred via the LAN 500. The correspondence between each queue and the print data may be set arbitrarily. Further, the combination of each queue and the logical printer may also be set arbitrarily.

The filing processor 32 includes the folder 321 which forms a simple database structure for storing image data, and controls input and output of the image data with respect to the folder 321. The input routes for inputting the image data to the folder 321 include a route which inputs the image data from the scanner engine 22 of the multi-function unit 2 to the folder 321 via the logical scanner 26 according to the scanner protocol, a route which inputs the image data from a transmitting facsimile machine to the folder 321 via the line 501 or the LAN 500 and a reception register 331 of the facsimile processor 33 which will be described later, and a route which inputs the image data from the LAN 500 to the folder 321 via the network processor 30. On the other hand, the output route for outputting the image data from the folder 321 include a route which outputs the image data from the folder 321 to the printer engine 21 via the print processor 31 and the logical printer of the multi-function unit 2, a route which outputs the image data from the folder 321 to the line 501 or the LAN 500 as a facsimile transmission output via the facsimile processor 33, and a route which outputs the image data from the folder 321 to another multi-function unit or another computer 4 which is coupled to the LAN 500 via the network processor 30 and the LAN 500.

The facsimile processor 33 includes the reception register 331 and a transmission register 332 which form a simple database structure for storing the image data, and controls facsimile transmission and reception. The reception register 331 stores facsimile reception data received from the line 501 or the LAN 500 and a reception history of the facsimile reception data. The transmission register 332 stores facsimile transmission data to be transmitted to the line 501 or the LAN 500, and transmission history related to the facsimile transmission data.

In this embodiment, 1 reception register 331 and 1 transmission register 332 are provided. However, it is of course possible to provide a plurality of reception registers 331 and a plurality of transmission registers 332 in the facsimile processor 33. For example, it is possible to provide 1 reception register 331 and 1 transmission register 332 for each person or for each department.

The OCR processor 322 subjects the image data to an OCR process, so as to automatically extract a document title, for example, when registering the image data to the folder 321 of the filing processor 32 and when storing the facsimile reception data and its reception history in the reception register 331 of the facsimile processor 33. The OCR processor 322 is called in common from the filing processor 32 and the facsimile processor 33. The OCR process carried out by the OCR processor 322 includes a process of automatically extracting a title such as the document title, a process of automatically sorting the image data by recognizing a destination upon a facsimile reception in a case where 1 reception register 311 is provided for each destination, and the like.

A modem 34 carries out a demodulation process with respect to the facsimile reception data received from the line 501, and a modulation process with respect to the facsimile transmission data transmitted to the line 501, to control the exchange of the facsimile reception data and the facsimile transmission data between the line 501 and the facsimile processor 33.

The panel controller 35 receives various events generated from the operation panel 23 of the multi-function unit 2 according to the panel control protocol, and controls the print processor 31, the filing processor 32, the facsimile processor 33, the operation managing processor 37 and the telephone directory processor 38 so as to carry out a process corresponding to the generated event. In addition, the panel controller 35 controls the logical scanner 26 of the multi-function unit 2 according to the scanner protocol, depending on the event which is notified from the operation panel 23 according to the panel control protocol. Hence, the scanner engine 22 reads the document under the control of the logical scanner 26, and the read image data are transmitted to the print processor 31, the filing processor 32 and the facsimile processor 33.

The panel controller 35 controls the print processor 31, the filing processor 32, the facsimile processor 33, the operation managing processor 37 and the telephone directory processor 38 in the following manner.

When the panel controller 35 receives a document registration event from the operation panel 23 of the multi-function unit 2 according to the panel control protocol, the panel controller 35 controls the logical scanner 26 and the scanner engine 22 of the multi-function unit 2 according to the scanner protocol, so as to read the image data from the document. The panel controller 35 supplies the read image data to the filing processor 32, and instructs registration of the read image data into the folder 321.

In addition, when the panel controller 35 receives a facsimile transmission event from the operation panel 23 of the multi-function unit 2 according to the panel control protocol, the panel controller 35 controls the logical scanner 26 and the scanner engine 22 of the multi-function unit 2 according to the scanner protocol, so as to read the image data from the document. The panel controller 35 supplies the read image data to the facsimile processor 33, and instructs a facsimile transmission process including storage of the facsimile transmission data and its transmission history into the transmission register 332.

In a case where the multi-function unit 2 is made up of the scanner part 201 and the printer part 202 which are formed as mutually independent units as shown in FIG. 5, no logical copying machine exists within the multi-function unit 2, and the copying function is realized as follows. That is, when the panel controller 35 receives a copy start event from the operation panel 23 of the multi-function unit 2 (scanner part 201) according to the panel control protocol, the panel controller 35 controls the logical scanner 26 and the scanner engine 22 of the multi-function unit 2 (scanner part 201) according to the scanner protocol, so as to read the image data from the document. The panel controller 35 supplies the read image data to the print processor 31, and instructs the number of printed sheets to be made by printing the image data on the recording paper. As a result, the print processor 31 controls for example the logical printer 251 and the printer engine 21 of the multi-function unit 2 (printer part 202) according to the print protocol, and instructs printing of the specified number of printed sheets to be made so as to finally realize the copying function.

Furthermore, when the panel controller 35 receives a telephone directory list request event from the operation panel 23 of the multi-function unit 2 according to the panel control protocol, the panel controller 35 acquires the telephone directory list data from the telephone directory processor 38 and supplies the telephone directory list data to the multi-function unit 2 according to the panel control protocol.

In addition, when the panel controller 35 receives a power OFF event from the operation panel 23 of the multi-function unit 2 according to the panel control protocol, the panel controller 35 instructs turning OFF of a power supply to the operation managing processor 37.

The result notification processor 36 is coupled to the facsimile processor 33, the filing processor 32 and the print processor 31, and is notified of a process result from the facsimile processor 22 when a facsimile transmission or reception ends, a process result from the filing processor 32 when a document registration ends, and a process result from the print processor 31 when a printing ends. The result notification processor 36 notifies the process result notified from each of these processors 33, 32 and 31 to a destination which is registered in advance in the result notification processor 36 or a destination which is specified, via the network processor 30 and the LAN 500. In this embodiment, the process result is notified to the destination by an electronic mail system. In this case, the network processor 30 makes a communication via the LAN 500 according to an electronic mail protocol.

The operation managing processor 37 is coupled to the facsimile processor 33, the filing processor 32 and the print processor 31, and gathers state messages from these processors 33, 32 and 31. If necessary, the operation managing processor 37 instructs a display of the state messages which are gathered to the operation panel 23 of the multi-function unit 2 according to the operation management protocol. In addition, the operation managing processor 37 periodically gathers information and state of the multi-function unit 2 according to the operation management protocol. In other words, the operation managing processor 37 centrally gathers and manages, as operation management information, the states of and information related to various processors (at least the facsimile processor 33, the filing processor 32 and the print processor 31) of the server 3 and various processors (at least the logical copying machine 24, the logical printers 251 through 253 and the logical scanner 26) of the multi-function unit 2. The operation management information gathered and managed by the operation managing processor 37 is accessible from the side of the LAN 500 via the network processor 30. For example, the operation management information gathered and managed by the operation managing processor 37 is accessible from a web browser 46 of the computer 4 which will be described later.

The operation managing processor 37 also controls the turning OFF of the power supply of the server 3. When a power OFF instruction is received from the panel controller 35, the operation managing processor 37 carries out a power OFF control to turn OFF the power supply with respect to various parts within the server 3. By this power OFF control, the various parts within the server 3 carry out processes such as ending a session of each protocol and saving necessary information in a storage unit. The storage unit is made of a hard disk unit which forms the spool 311, the reception register 331, the transmission register 332, the folder 321, a telephone number list 381, a routing list 391 and the like. For the sake of convenience, the storage unit is illustrated in FIG. 6 as being included in the various processors, but it is of course possible to provide an independent storage unit, and further, it is also possible to provide one or a plurality of such storage units.

The power OFF instruction is made from the operation panel 23 of the multi-function unit 2. The power OFF event is notified from the operation panel 23 to the panel controller 35 of the server 3 according to the panel control protocol. The panel controller 35 notifies the power OFF instruction to the operation managing processor 37 in response to the power OFF event. The operation managing processor 37 simultaneously starts power OFF processes in parallel with respect to the various parts within the server 3, and carries out a synchronized control of the power OFF processes with respect to the various parts of the server 3 and the multi-function unit 2, including the various parts of the multi-function unit 2. The operation managing processor 37 instructs power OFF to a power supply 550 at a time when all of the processes in progress in the various parts of the server 3 and the multi-function unit 2 are completed.

The telephone directory processor 38 controls input and output of the telephone numbers used for the facsimile process, and includes the telephone number list 381 which stores the telephone numbers. The telephone number list 381 is usable by the multi-function unit 2 and the computer 4. When making a facsimile transmission from the multi-function unit 2, the telephone directory processor 38 displays the telephone numbers stored in the telephone number list 381 on the operation panel 23, so that a desired telephone number can be selected from the displayed telephone numbers. On the other hand, when making a facsimile transmission from the computer 4, the telephone directory processor 38 displays the telephone numbers stored in the telephone number list 381 by use of the web browser 46, so that a desired telephone number can be selected from the displayed telephone numbers. The telephone number list 381 is accessed from the computer 4 via the LAN 500, the network processor 30 and the facsimile processor 33. The telephone directory processor 38 has a sorting function, and is capable of sorting the telephone numbers in an alphabetical order of names of destinations, in an order dependent upon a frequency of use of the telephone numbers, and the like.

The routing information processor 39 includes the routing list 391 which stores addresses of all multi-function units, servers or composite apparatuses coupled to the LAN 500. When exchanging data via the LAN 500, the data transfer is made by specifying an address within the routing list 391. The contents of the routing list 391 can be updated manually from the operation panel 23 of the multi-function unit 2, updated by copying list data in one operation from a multi-function unit other than the multi-function unit 2, or updated by automatically and periodically gathering routing information.

The computer 4 shown in FIG. 6 generally includes an application 41, a print driver 42, a facsimile driver 43, a filing driver 44, a network processor 45 and the web browser 46. The functions of these elements of the computer 4 may be realized by a combination of one or a plurality of processors such as a CPU, and a memory which stores data and programs to be executed by the processor. The application 41 may be a general application software such as an software for a word processor presently available on the market. When a print operation is made, the print, facsimile and filing drivers 42 through 44 are called by this application 41.

The print driver 42 is operated when making the print operation by the application 41. This print driver 42 inputs and specifies an address of a multi-function unit (destination printer) which is to carry out the printing, a mail address to be notified of a print result, a comment on the mail and the like. The address of the destination printer is selected from a display by acquiring and displaying the routing list 391 of the server 3.

The facsimile driver 43 is operated when making a facsimile transmission by the application 41. This facsimile driver 43 inputs and specifies a telephone number of a destination of the facsimile transmission, a mail address to be notified of a facsimile transmission result, a comment on the mail and the like. The telephone number of the destination of the facsimile transmission is selected from a display by acquiring and displaying the telephone number list 381 of the server 3.

The filing driver 44 is operated when making a document registration by the application 41. The filing driver 44 inputs and specifies an address of a destination of the document registration, a mail address to be notified of a document registration result, a comment on the mail and the like. The address of the destination of the document registration is selected from a display by acquiring and displaying the routing list 391 of the server 3.

The network processor 45 controls a network communication between the server 3 and the printer, facsimile and filing drivers 42 through 44. The web browser 45 is made of an information inspecting browser of a world wide web (WWW) server, and communicates via the LAN 500 according to the http protocol.

Figure 7:
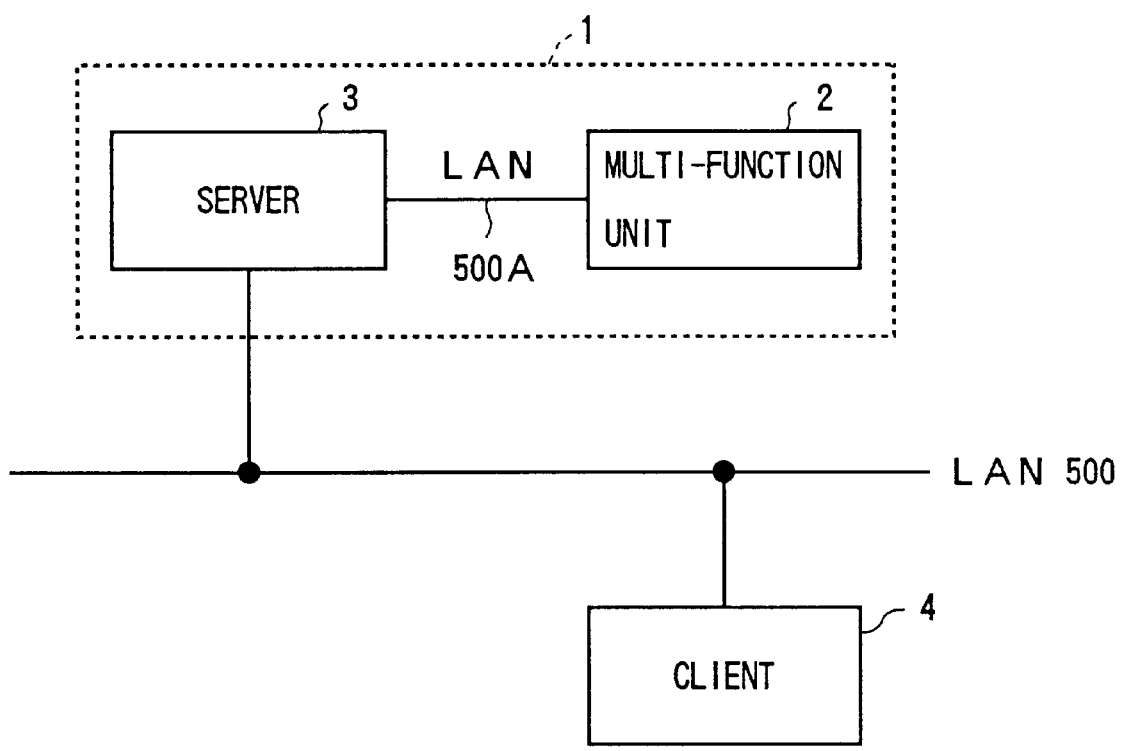
FIG. 7 is a diagram for explaining a case where the multi-function unit and the server are coupled via a private LAN.
Figure 8:
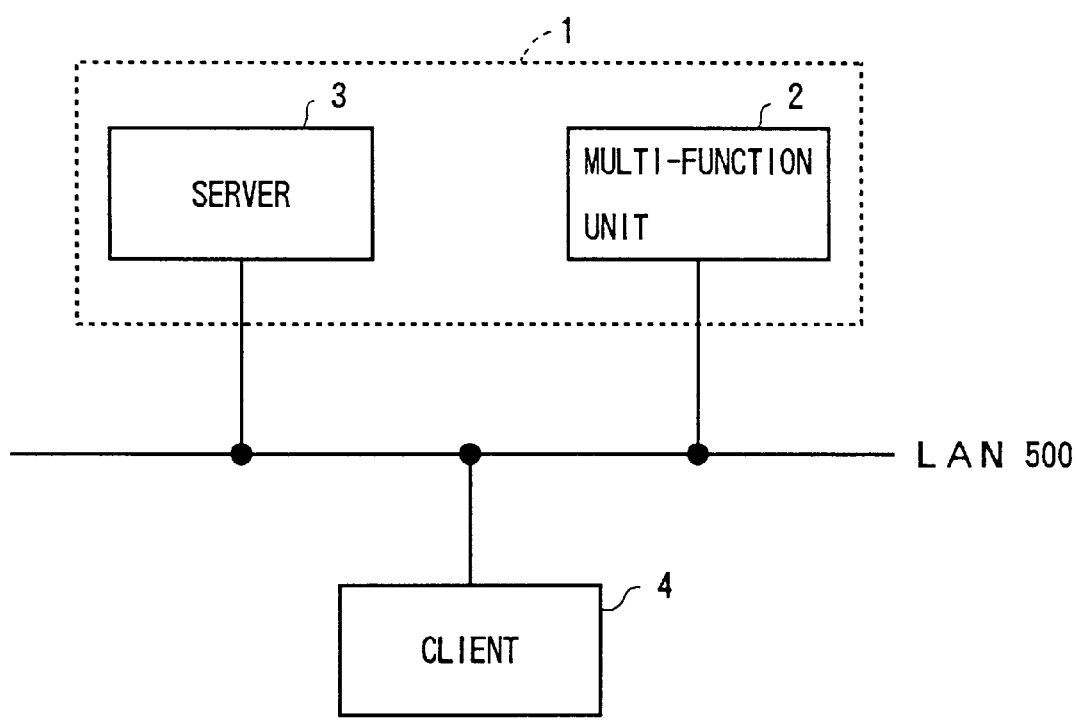
FIG. 8 is a diagram for explaining a case where the multi-function unit and the server are coupled via a LAN having a computer coupled thereto.

The multi-function unit 2 and the server 3 may be coupled via a private LAN 500A as shown in FIG. 7 or, coupled via the LAN 500 to which the computer 4 is coupled as shown in FIG. 8. In the case where the connection shown in FIG. 7 is employed, the private LAN 500A is used when supplying the image data from the multi-function unit 2 to the server 3 at the time of the document registration or the like, and thus, the LAN 500 is unaffected thereby. On the other hand, in the case where the connection shown in FIG. 8 is employed, it is sufficient to provide 1 LAN interface in the server 3. Accordingly, the connections shown in FIGS. 7 and 8 may be selected depending on the needs of the user, so that the system structure may be formed with a high flexibility.

Figure 9:
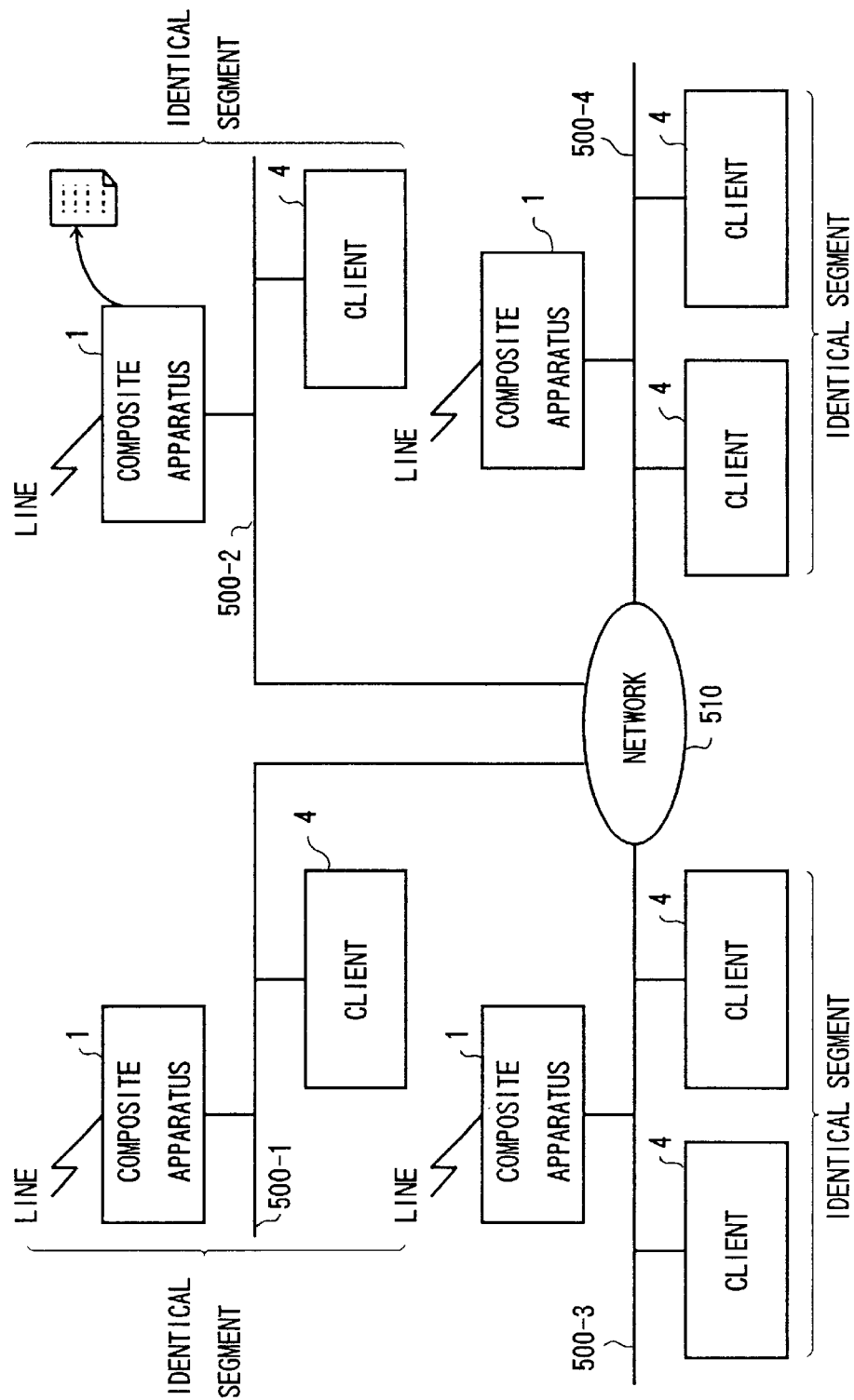
FIG. 9 is a diagram showing an embodiment of a network system according to the present invention.

FIG. 9 is a diagram showing an embodiment of a network system according to the present invention. In FIG. 9, those parts which are the same as those corresponding parts in FIGS. 1 and 6 are designated by the same reference numerals, and a description thereof will be omitted. As shown in FIG. 9, a plurality of LANs are coupled via a network 510, and at least 2 multi-function units 2 are provided in the network system. In this embodiment, 4 LANs 500-1 through 500-4 are coupled via the network 510, and 4 multi-function units 2 are provided within the network system.

The multi-function unit 2 and the server 3 may be independent units or, designed to be provided within a single unit.

Figure 10:
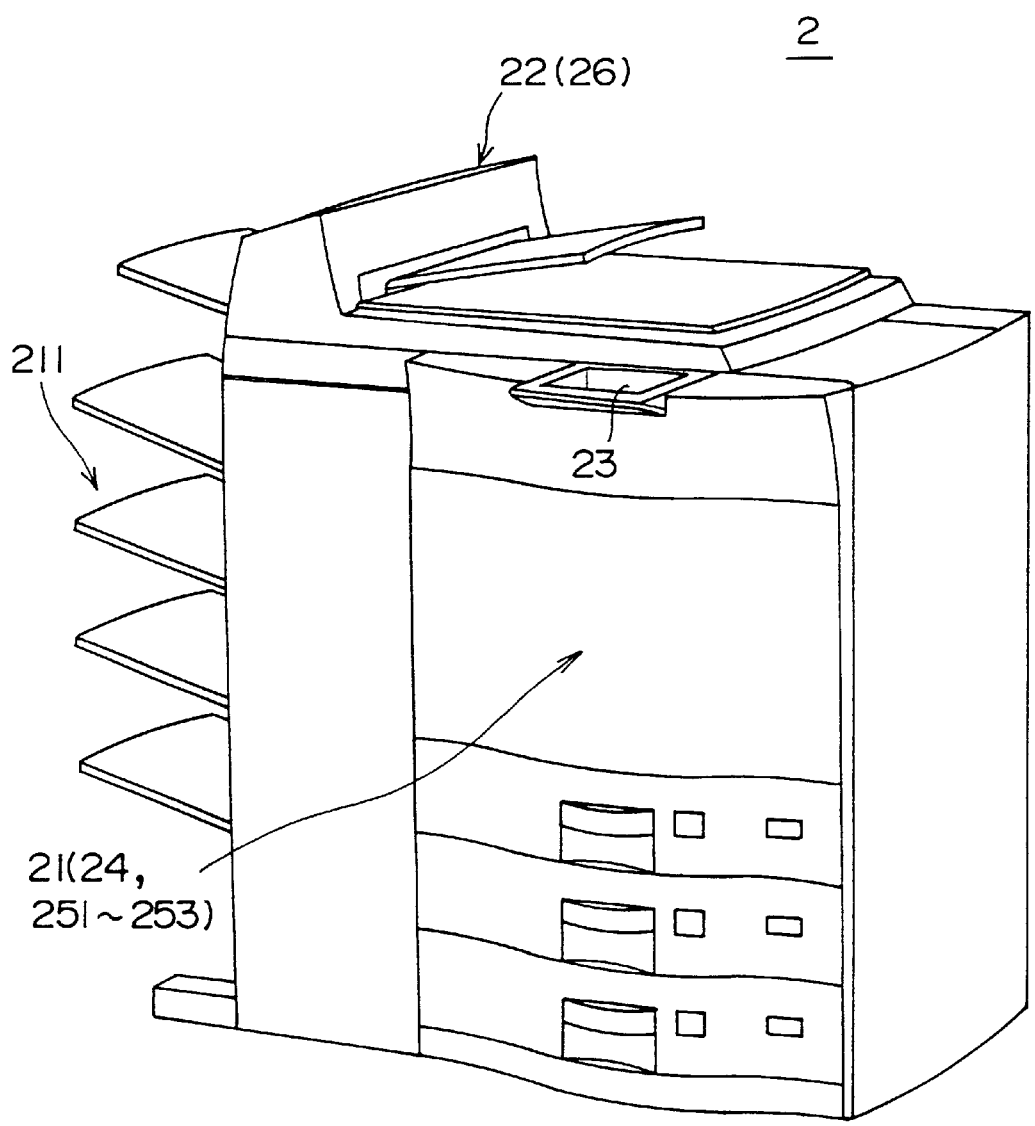
FIG. 10 is a perspective view showing the embodiment of the multi-function unit.
Figure 11:
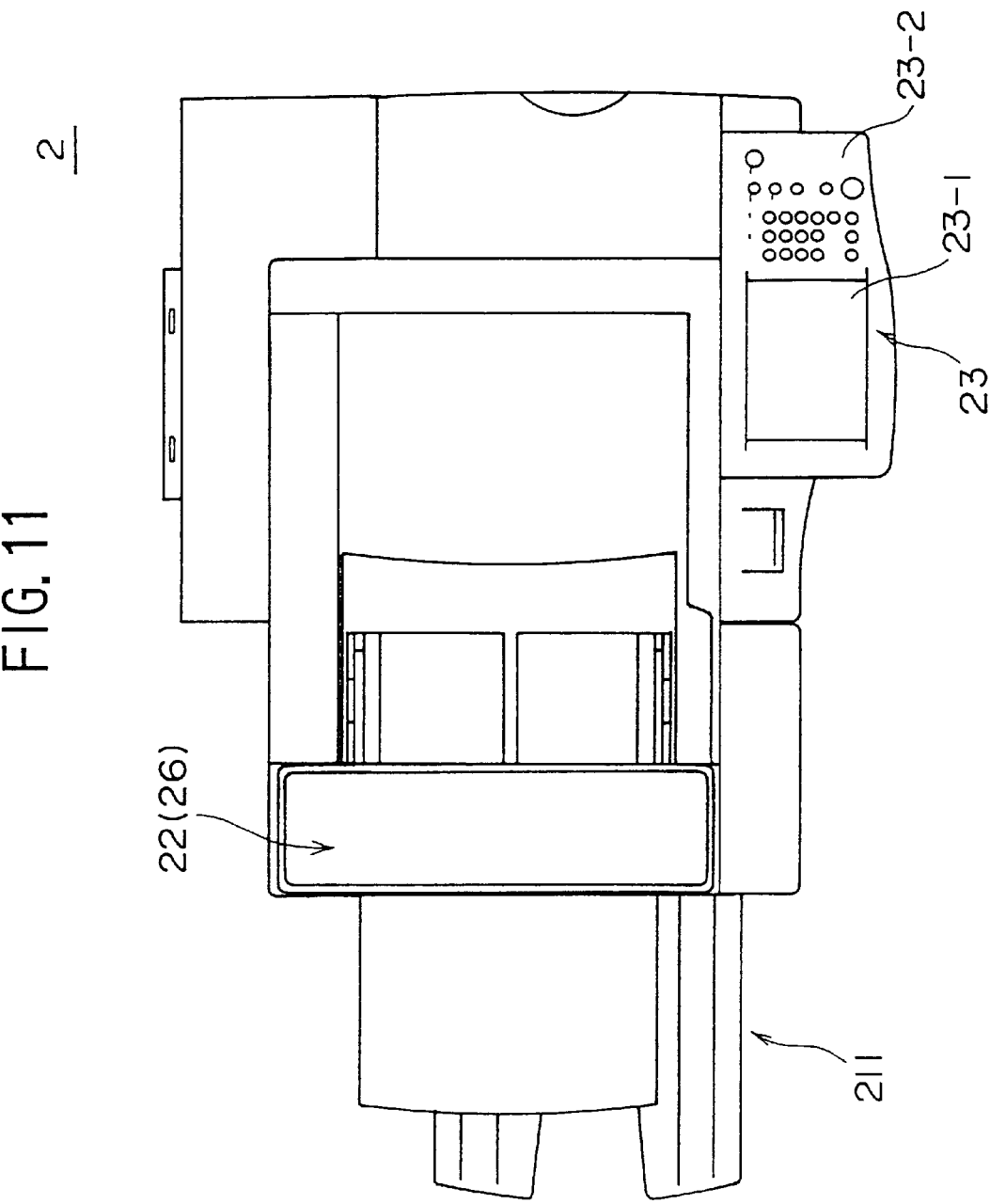
FIG. 11 is a plan view showing the embodiment of the multi-function unit.

FIGS. 10 and 11 respectively are diagrams showing the embodiment of the multi-function unit 2 for the case where the multi-function unit 2 is a unit independent of the server 3. FIG. 10 shows a perspective view of the multi-function unit 2, and FIG. 11 shows a plan view of the multi-function unit 2. In FIGS. 10 and 11, those parts which are the same as those corresponding parts in FIG. 2 are designated by the same reference numerals, and a description thereof will be omitted. FIG. 11 shows a case where the operation panel 23 includes a known liquid crystal touch panel 23-1 which forms the display part and a part of the operation part, and various operation buttons 23-2.

Next, a more detailed description will be given of a (1) print process, (2) routing process, (3) operation panel control process, (4) OCR control process, and (5) operation managing process in this embodiment.

(1) Print Process

Figure 12:
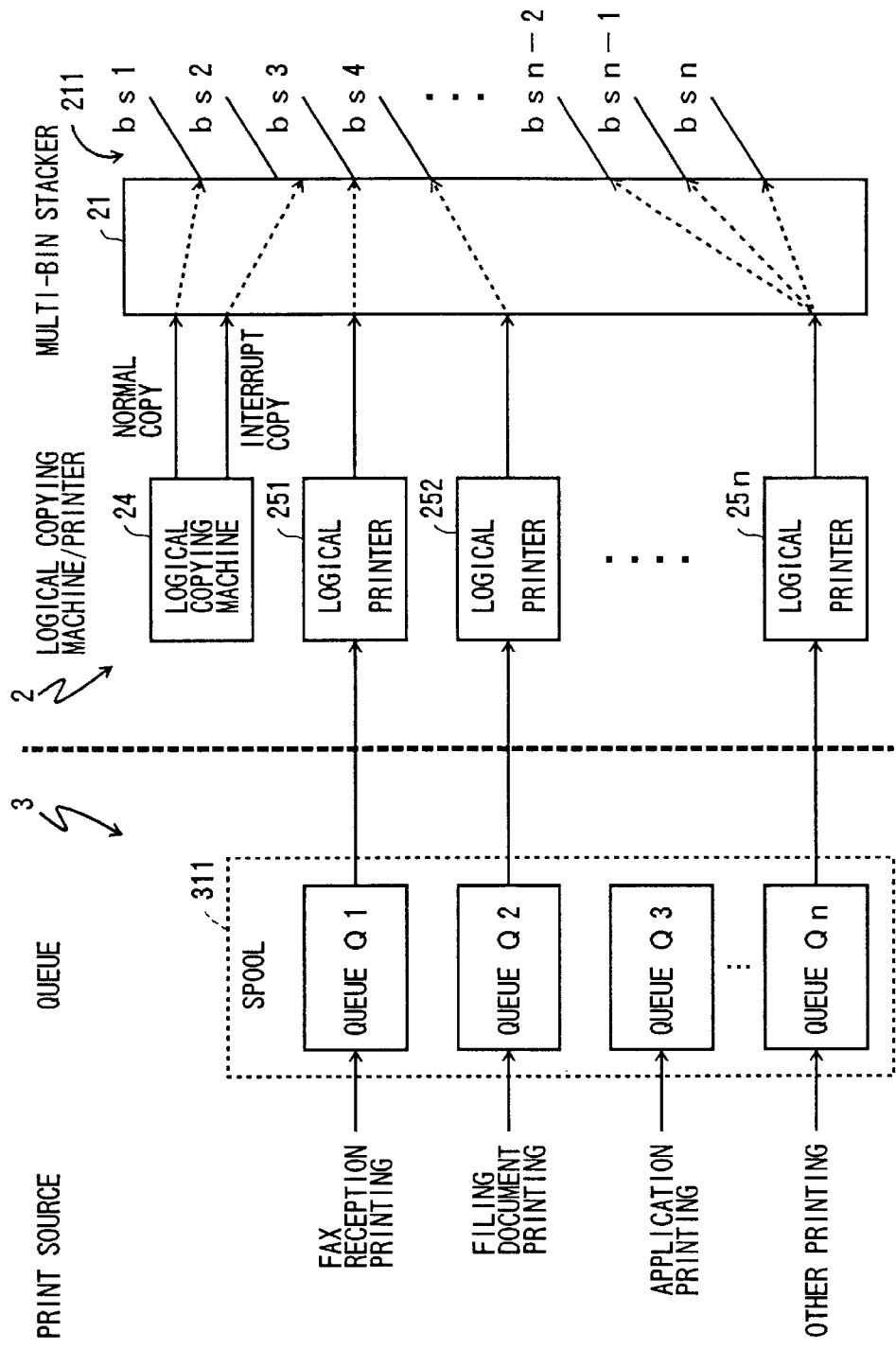
FIG. 12 is a system block diagram showing important parts of the multi-function unit and the server for explaining a print process.

FIG. 12 is a system block diagram showing important parts of the multi-function unit 2 and the server 3 for explaining the print process. In FIG. 12, those parts which are the same as those corresponding parts in FIGS. 2 and 6 are designated by the same reference numerals, and a description thereof will be omitted. In addition, FIG. 13 is a flow chart generally showing the print process.

In FIG. 12, the print processor 31 within the server 3 includes the spool 311 which stores n queues Q1 through Qn. The queues Q1 through Qn stored in the spool 311 respectively correspond to print sources. For example, the queue Q1 corresponds to a facsimile reception printing, the queue Q2 corresponds to a filing document printing, the queue Q3 corresponds to an application printing, . . . , and queue Qn corresponds to other printing. The multi-function unit 2 includes the logical copying machine 24, n logical printers 251 through 25n, the printer engine 21, and the multi-bin stacker 211 including n bin stackers bs1 through bsn. The logical printers 251 through 25n respectively correspond to the queues Q1 through Qn stored in the spool 311. The bin stackers bs1 through bsn are allocated so that a pair of a corresponding queue and logical printer corresponds to one or a plurality of bin stackers. In other words, the bin stackers bs1 through bsn are allocated to each pair of the queue and logical printer in this embodiment so that mutually different queues and mutually different logical printers cannot share a common bin stacker.

Figure 13:
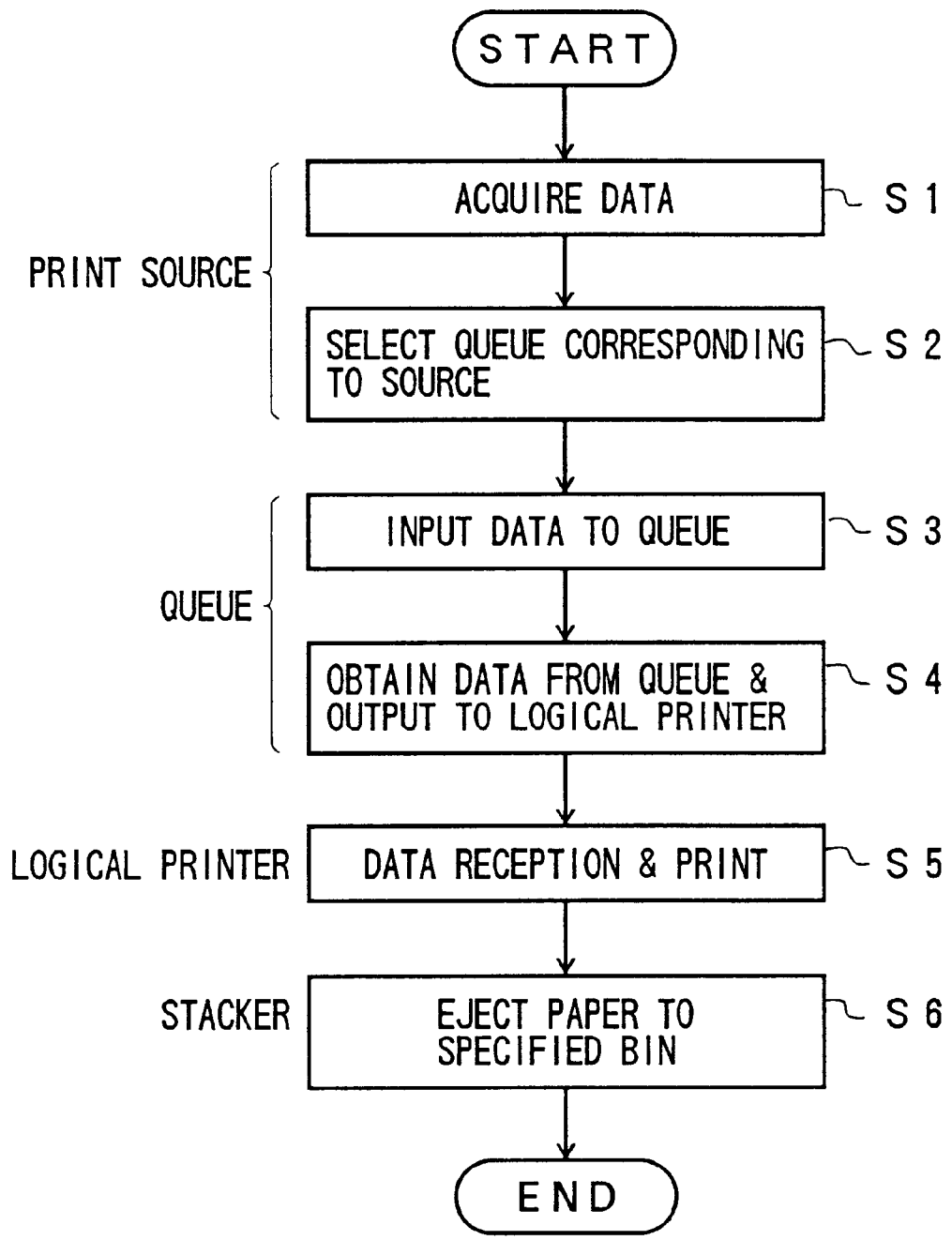
FIG. 13 is a flow chart generally showing the print process.

As shown in FIG. 13, a step S1 acquires the image data to be printed from the print source, and a step S2 selects a queue corresponding to the print source from the queues Q1 through Qn stored in the spool 311. A step S3 inputs the acquired image data to the selected queue, and a step S4 obtains the image data from the selected queue and outputs the image data to a corresponding logical printer. A step S5 prints the image data on the recording paper by the logical printer, and a step S6 ejects the recording paper printed with the image data to one or a plurality of bin stackers allocated for the logical printer.

In FIG. 12, the bin stacker bs3 is allocated for the pair of the corresponding queue Q1 and logical printer 251, the bin stacker bs4 is allocated for the pair of the corresponding queue Q2 and logical printer 252, and the bin stackers bsn-2 through bsn are allocated for the pair of corresponding queue Qn and logical printer 25n. In addition, when the logical copying machine 24 is used as the print source, the bin stacker bs1 is allocated for the recording paper copied in a normal copy mode, and the bin stacker bs2 is allocated for the recording paper copied in an interrupt mode.

Therefore, according to this embodiment, it is possible to freely and variably set the corresponding relationship of the print source and the queues Q1 through Qn within the spool 311, that is, the logical printers 251 through 25n. In addition, it is also possible to freely and variably set the corresponding relationship of the bin stackers bs1 through bsn of the multi-bin stacker 211 and the logical copying machine 24 and the logical printers 251 through 25n. Moreover, since the logical copying machine 24 and the logical printers 251 through 25n cannot share the same bin stacker, it is possible to carry out apparent parallel operations on the logical copying machine 24 and the logical printers 251 through 25n, so as to improve the processing speed of the multi-function unit 2.

With respect to the logical copying machine 24 and the logical printers 251 through 25n, it is possible to freely set a priority to the order of the printing in the printer engine 21.

For example, the priority of the printing order may be set in the order of the print requests received, or the priority of the printing order of the logical copying machine 24 may be set higher than those of the logical printers 251 through 25n so as to give priority to the copying function which has a higher possibility of urgency. In addition, it is possible to freely set the priority to the printing order among the queues Q1 through Qn or among the logical printers 251 through 25n. In this case, the priority of the printing order of the logical printer 252 can be set higher than that of the logical printer 251, for example, so as to give the filing document printing a priority over the facsimile reception printing.

(2) Routing Process (2a) Printing From Computer (Client) 4

When instructing the printing from the computer 4 to a predetermined multi-function unit 2, the address of the predetermined multi-function unit 2, server 3 or composite apparatus 1 is selected from the routing list 391 by accessing the routing list 391 within the routing information processor 39 of the server 3. This address specifies the multi-function unit 2, the server 3 or the composite apparatus 1 (1 pair of the multi-function unit 2 and the server 3) in the network. For example, in the case of the network system having the structure shown in FIG. 9, at least 1 server 3 within the network system includes the routing list 391 which contains the address of the predetermined multi-function unit 2, server 3 or composite apparatus 1. Accordingly, even if the operator of the computer 4 does not know the address or the like of the predetermined multi-function unit 2, server 3 or composite apparatus 1, the operator can acquire this address from the routing list 391 (of the server 3) which contains the address of the predetermined multi-function unit 2, server 3 or composite apparatus 1, without having to make an inquiry to a provider or the like of the network system.

Figure 14:
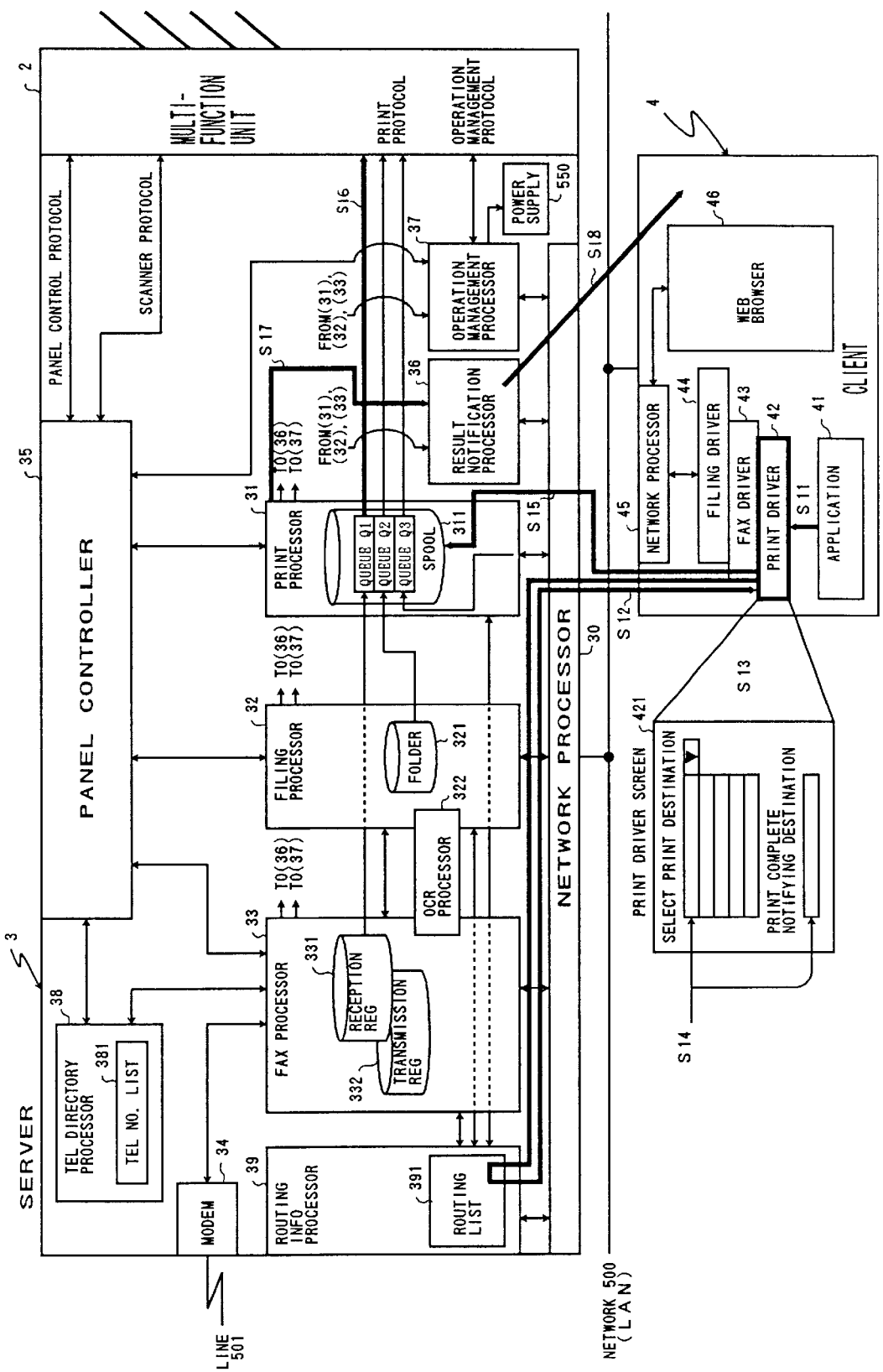
FIG. 14 is a diagram for explaining the print process from the computer.
Figure 15:
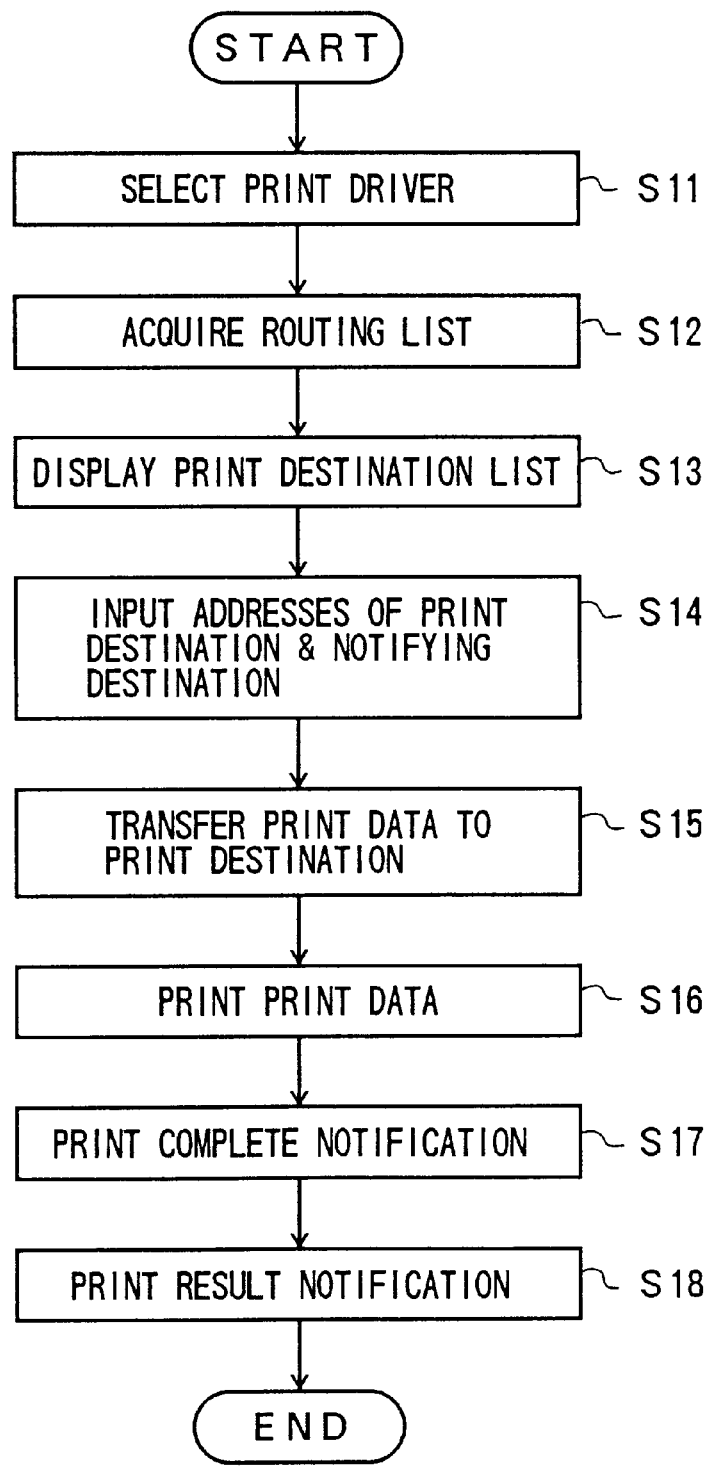
FIG. 15 is a flow chart for explaining a procedure of the print process from the computer.

FIG. 14 is a diagram for explaining the print process from the computer 4. In FIG. 14, those parts which are the same as those corresponding parts in FIG. 6 are designated by the same reference numerals, and a description thereof will be omitted. In addition, FIG. 15 is a flow chart for explaining a procedure of the print process from the computer 4. In FIG. 14, S11 through S18 respectively correspond to steps S11 through S18 shown in FIG. 15.

In FIGS. 14 and 15, the step S11 selects the print driver 42 from the application 41 of the computer 4. The step S12 makes an access from the print driver 42 to the server 3 which includes the routing list 391, and acquires the routing list 391 from the routing information processor 39 of this server 3. At least 1 server 3 which includes the routing list 391 is set in advance. If a plurality of servers 3 each including the routing list 391 are set in advance, it is possible to acquire the routing list 391 even in a case where 1 server 3 is down or is not accessible. When setting a plurality of servers 3 each including the routing list 391, the plurality of servers 3 are successively accessed in a predetermined order or a random order, so that the routing list 391 is acquired from the first accessible server 3.

The step S13 displays the acquired routing list 391 on a screen 421 of the print driver 42 shown in FIG. 14 in the form of a print destination list which is used to select the print destination. The step S14 urges the operator to select the print destination on the screen 421, and urges the operator to input a notifying destination which is to be notified of the print result, so that a print destination address and a notifying destination address are input. It is not essential to display the print destination address and the notifying destination address on the screen 421 of the print driver 42, and it is of course possible to input the corresponding addresses from the routing list 391 by selecting or inputting the names or the like of the print destination and the notifying source. In addition, it is possible to display the names and the like of the print destination and the notifying destination on the screen 421 with a corresponding relationship to the addresses or, to display only the print destination address and the notifying destination address on the screen 421.

For the sake of convenience, the steps S15 through S18 which will now be described are shown in FIG. 14 for the server 3 related to the steps S11 through S14 described above. But actually, the steps S15 through S18 are related to a server 3 (not shown) which forms a composite apparatus 1 together with a multi-function unit 2 at the print destination.

The step S15 transfers the print data (image data) to the selected print destination by the print driver 42 in response to a print start. More particularly, the print data is transferred to the server 3 which forms the composite apparatus 1 together with the multi-function unit 2 at the print destination. This server need not be the same as the server 3 which provided the routing list 391 described above. The step S16 transfers the print data from the print processor 31 of the server 3 which is supplied with the print data to the corresponding logical printer (for example, the logical printer 253) of the multi-function unit 2 at the print destination, and the printing is carried out by the printer engine 21. The step S17 notifies a print completion to the result notification processor 36 when the print processor 31 of the server 3 detects completion of the printing by the multi-function unit 2 or, notifies an abnormality to the result notification processor 36 if an abnormality such as a paper jam occurs in the multi-function unit 2. The step S18 notifies the print result to the notifying destination specified by the print driver 41 when the result notification processor 36 is notified of the print completion. In this case, the notifying destination of the print result is the computer 4 which requested the printing, and the print result is notified to the application 41. For example, the print result indicates the print completion when the result notification processor 36 is notified of the print completion within a predetermined time, and the print result indicates a print incomplete when the result notification processor 36 is not notified of the print completion within the predetermined time.

In FIG. 14, the print data is transferred to the server 3 which is coupled to the computer 4 via the LAN 500, but the server 3 to which the print data is transferred does not have to be coupled to the LAN 500. In the case of the network system shown in FIG. 9, the print data may be transferred for example from the computer 4 which is coupled to the LAN 500-1 to the server 3 of the composite apparatus 1 which is coupled to the remote LAN 500-4 via the network 510. In addition, the notifying destination of the print result does not have to be the computer 4 which makes the print request, and may be any computer 4 or any composite apparatus 1 within the network system shown in FIG. 9, for example. Furthermore, the notifying destination of the print result may be set in advance to an address peculiar to each print driver 42 or each print processor 31, and in this case, it is possible to give a priority to a notifying destination which is input from the screen 421 of the print driver 42 if such an input is made.

The print result notification may be made by utilizing the mail function such as the electronic mail (e-mail).

Figure 16:
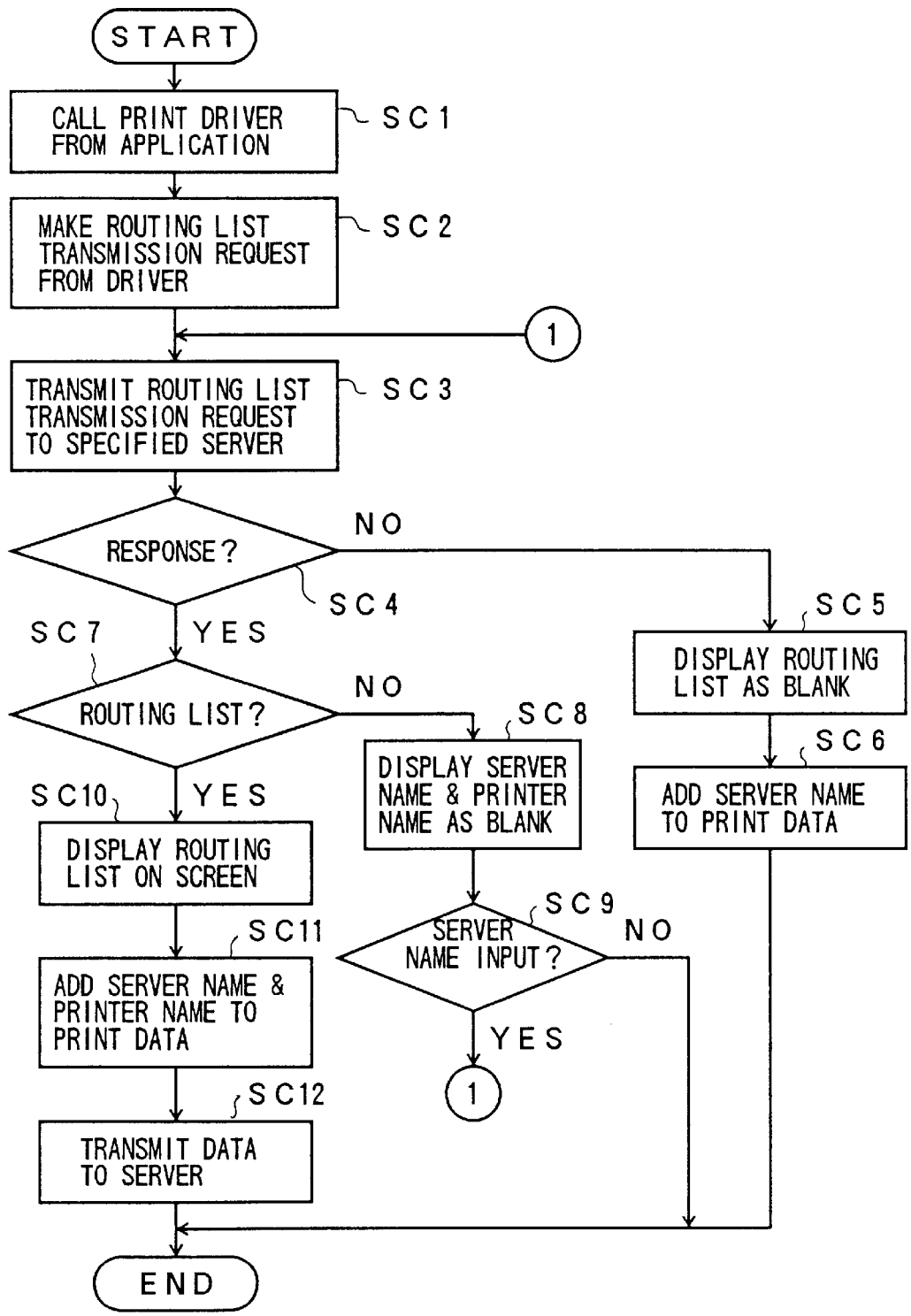
FIG. 16 is a flow chart for explaining a process of the computer when the printing is made from the computer.
Figure 17:
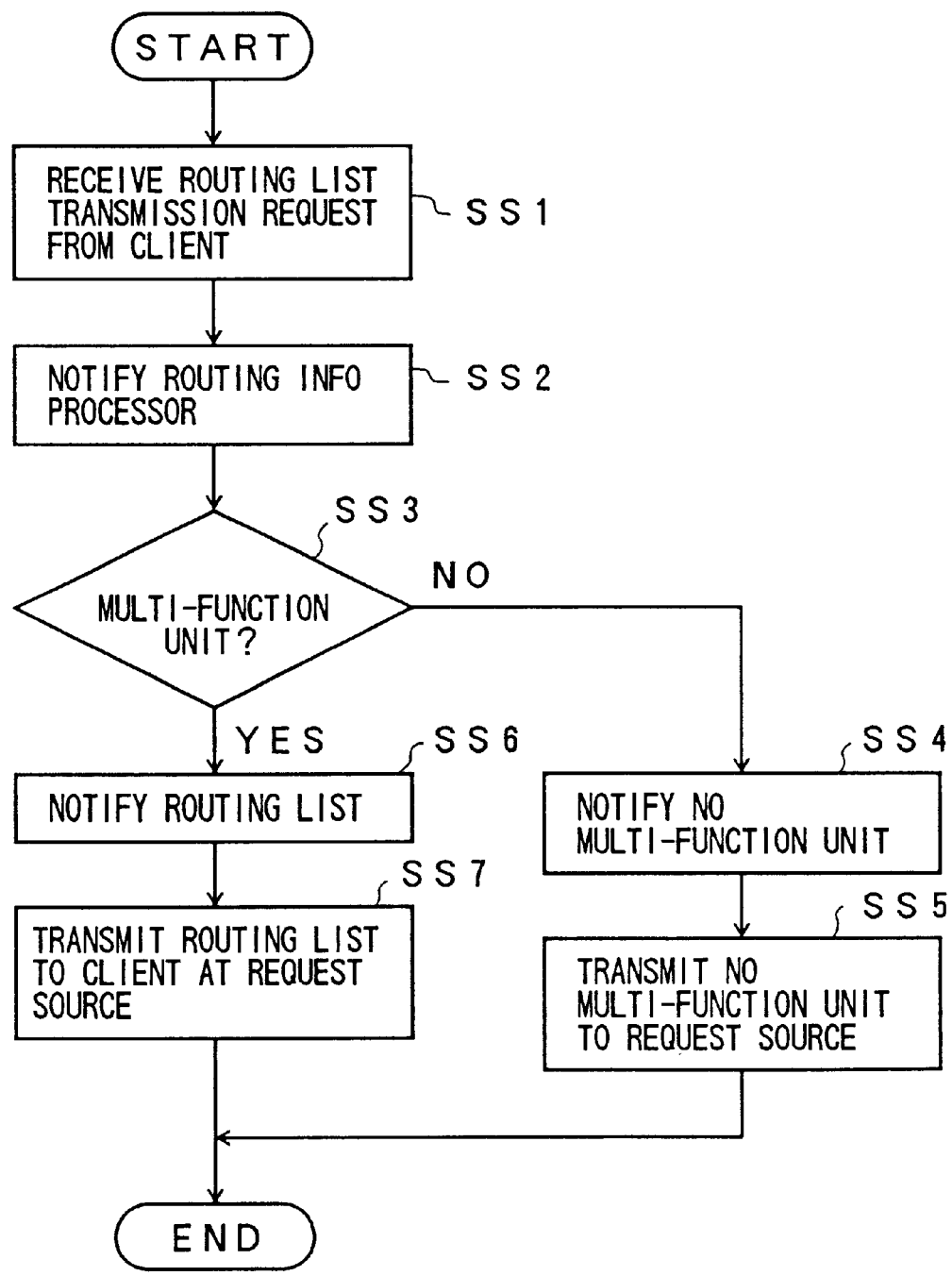
FIG. 17 is a flow chart for explaining a process of a server when the printing is made from the computer.

FIG. 16 is a flow chart for explaining a process on the side of the computer 4 described above when printing from the computer 4. FIG. 17 is a flow chart for explaining a process on the side of the server 3 in this case.

In FIG. 16, when the computer 4 makes a print request, a step SC1 calls the print driver 42 from the application 41. A step SC2 makes a routing list transmission request from the print driver 42. A step SC3 transmits the routing list transmission request to the server 3 which is set in advance. A step SC4 decides whether or not a response is received from the server 3 within a predetermined time. If the decision result in the step SC4 is NO, a step SC5 displays the routing list on the screen 421 of the printer driver 42 in blank. In addition, a step S6 adds to the print data a server name of the server 3 which is set in advance, and the process ends.

On the other hand, if the decision result in the step SC4 is YES, a step SC7 decides whether or not the routing list 391 is received. If the decision result in the step SC7 is NO, a step SC8 displays both the server name and a multi-function unit name on the screen 421 in blank. In addition, a step SC9 decides whether or not the server name is input by the operator, and the process ends if the decision result in the step SC9 is NO. If the decision result in the step SC9 is YES, the process returns to the step SC3.

If the decision result in the step SC7 is YES, a step SC10 displays the received routing list 391 on the screen 421. A step SC11 adds to the print data the multi-function unit name selected from the routing list 391 by the operator and the corresponding server name. A step SC12 transmits the print data to the server 3 having the selected server name, together with the multi-function unit name and the server name added to the print data, and the process ends.

In FIG. 17, when the server 3 becomes accessible, a step SS1 receives the routing list transmission request from the computer 4. A step SS2 notifies the routing list transmission request to the routing information processor 39 via the network processor 30. A step SS3 decides whether or not a multi-function unit 2 registered in the routing list 391 within the routing information processor 39 exists, and a step SS4 notifies the network processor 30 that no registered multi-function unit 2 exists if the decision result in the step SS3 is NO. In addition, a step SS5 notifies the computer 4 that no registered multi-function unit 2 exists, and the process ends.

On the other hand, if the decision result in the step SS3 is YES, a step SS6 notifies the network processor 30 of the routing list 391 which includes the registered multi-function unit 2. In addition, a step SS7 notifies the computer 4 of the routing list 391 which includes the registered multi-function unit 2, and the process ends.

(2b) Document Registration From Computer (Client) 4

When instructing a document registration from the computer 4 to a predetermined multi-function unit 2, the routing list 391 within the routing information processor 39 of the server 3 is accessed, and the address of the predetermined multi-function unit 2, server 3 or composite apparatus 1 is selected from the routing list 391. For example, in the case of the network system having the structure shown in FIG. 9, at least 1 server 3 within the network system includes the routing list 391 which contains the address of the predetermined multi-function unit 2. Accordingly, even if the operator of the computer 4 does not know the address or the like of the predetermined multi-function unit 2, server 3 or composite apparatus 1, the operator can acquire this address from the routing list 391 (of the server 3) which contains the address of the predetermined multi-function unit 2, server 3 or composite apparatus 1, without having to make an inquiry to a provider or the like of the network system.

Figure 18:
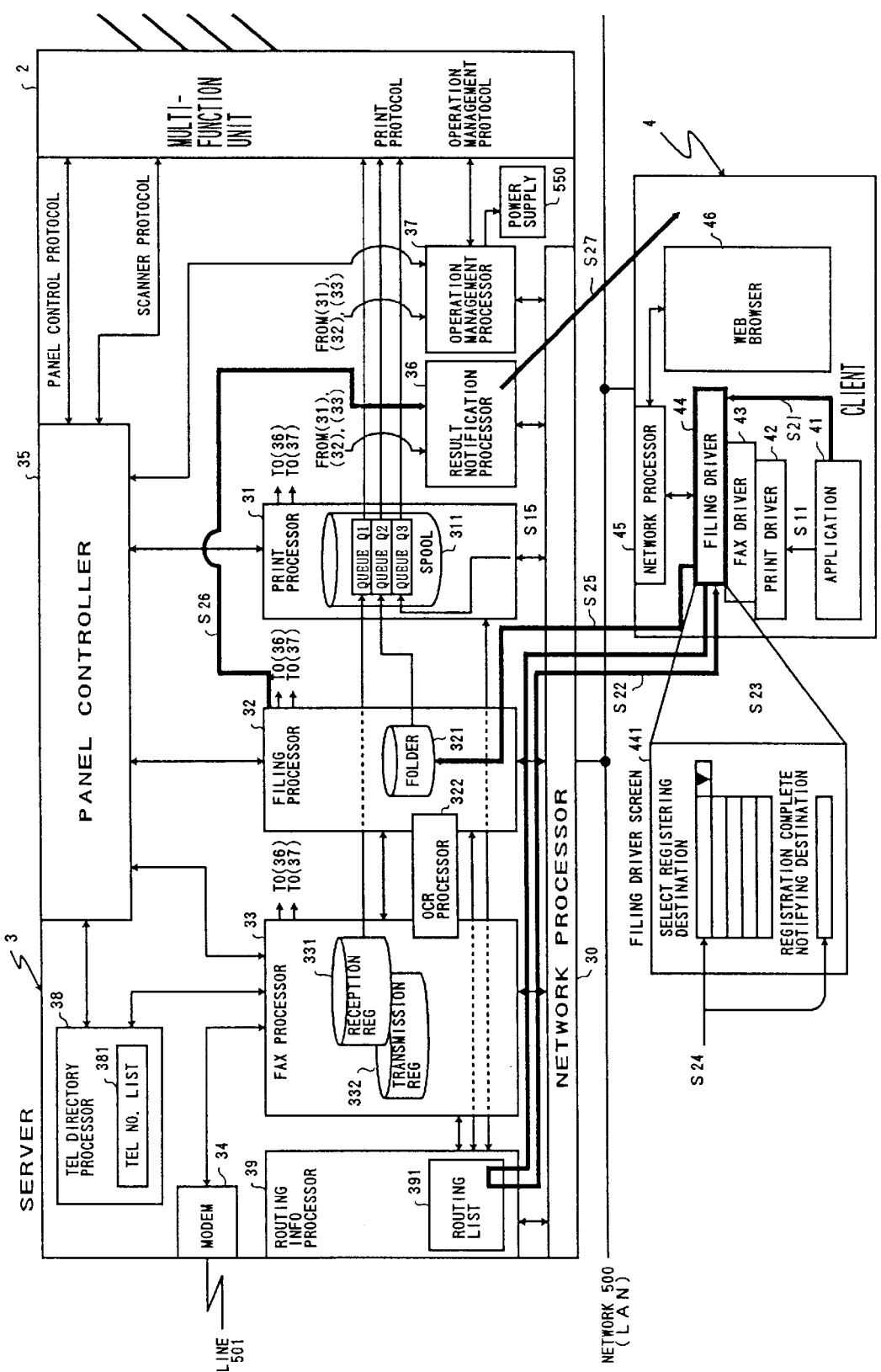
FIG. 18 is a diagram for explaining a document registration process from the computer.
Figure 19:
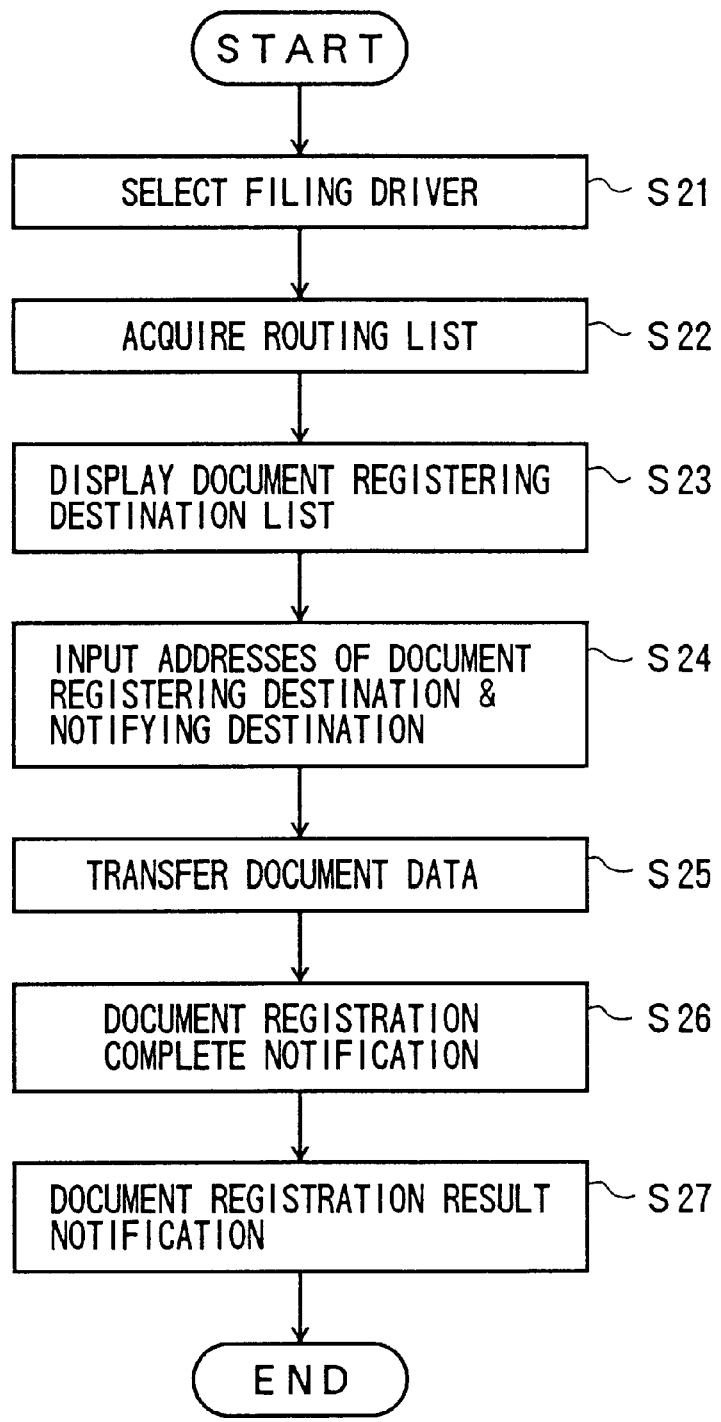
FIG. 19 is a flow chart for explaining a procedure of the document registration process from the computer.

FIG. 18 is a diagram for explaining a document registration process from the computer 4. In FIG. 18, those parts which are the same as those corresponding parts in FIG. 6 are designated by the same reference numerals, and a description thereof will be omitted. In addition, FIG. 19 is a flow chart for explaining a procedure of the document registration process from the computer 4. In FIG. 18, S21 through S27 respectively correspond to steps S21 through S27 shown in FIG. 19.

In FIGS. 18 and 19, the step S21 selects the filing driver 44 from the application 41 of the computer 4. The step S22 makes an access from the filing driver 44 to the server 3 which includes the routing list 391, and acquires the routing list 391 from the routing information processor 39 of this server 3. At least 1 server 3 which includes the routing list 391 is set in advance. If a plurality of servers 3 each including the routing list 391 are set in advance, it is possible to acquire the routing list 391 even in a case where 1 server 3 is down or is not accessible. When setting a plurality of servers 3 each including the routing list 391, the plurality of servers 3 are successively accessed in a predetermined order or a random order, so that the routing list 391 is acquired from the first accessible server 3.

The step S23 displays the acquired routing list 391 on a screen 441 of the filing driver 44 shown in FIG. 18 in the form of a document registering destination list which is used to select the document registering destination. The step S24 urges the operator to select the document registering destination on the screen 441, and urges the operator to input a notifying destination which is to be notified of the document registration result, so that a document registering destination address and a notifying destination address are input. It is not essential to display the document registering destination address and the notifying destination address on the screen 441 of the filing driver 44, and it is of course possible to input the corresponding addresses from the routing list 391 by selecting or inputting the names or the like of the document registering destination and the notifying source. In addition, it is possible to display the names and the like of the document registering destination and the notifying destination on the screen 441 with a corresponding relationship to the addresses or, to display only the document registering destination address and the notifying destination address on the screen 441.

For the sake of convenience, the steps S25 through S27 which will now be described are shown in FIG. 18 for the server 3 related to the steps S21 through S24 described above. But actually, the steps S25 through S27 are related to a server 3 (not shown) which forms a composite apparatus 1 together with a multi-function unit 2 at the document registering destination.

The step S25 transfers the document data (image data) to the selected document registering destination by the filing driver 44 in response to a document registration start. More particularly, the document data is transferred to the server 3 which forms the composite apparatus 1 together with the multi-function unit 2 at the document registering destination. This server need not be the same as the server 3 which provided the routing list 391 described above. The server 3 which receives the document data registers the document by storing the received document data in the folder 321 within the filing processor 32. The step S26 notifies a document registration completion to the result notification processor 36 when the filing processor 32 of the server 3 completes the document registration or, notifies an abnormality to the result notification processor 36 if an abnormality occurs during the document registration. The step S27 notifies the document registration result to the notifying destination specified by the filing driver 44 when the result notification processor 36 is notified of the document registration completion. In this case, the notifying destination of the document registration result is the computer 4 which requested the document registration, and the document registration result is notified to the application 41. For example, the document registration result indicates the document registration completion when the result notification processor 36 is notified of the document registration completion within a predetermined time, and the document registration result indicates a document registration incomplete when the result notification processor 36 is not notified of the document registration completion within the predetermined time.

In FIG. 18, the document data is transferred to the server 3 which is coupled to the computer 4 via the LAN 500, but the server 3 to which the document data is transferred does not have to be coupled to the LAN 500. In the case of the network system shown in FIG. 9, the document data may be transferred for example from the computer 4 which is coupled to the LAN 500-1 to the server 3 of the composite apparatus 1 which is coupled to the remote LAN 500-4 via the network 510. In addition, the notifying destination of the document registration result does not have to be the computer 4 which makes the document registration request, and may be any computer 4 or any composite apparatus 1 within the network system shown in FIG. 9, for example. Furthermore, the notifying destination of the document registration result may be set in advance to an address peculiar to each filing driver 44 or each filing processor 32, and in this case, it is possible to give a priority to a notifying destination which is input from the screen 441 of the filing driver 44 if such an input is made.

The document registration result notification may be made by utilizing the mail function such as the electronic mail (e-mail).

(2c) Printing From Server 3 Via Remote Server 3

For example, a description will be given of a processing procedure for a case where a registered document in the server 3 of the composite apparatus 1 which is coupled to the LAN 500-1 is accessed from the computer 4 which is coupled to the same LAN 500-1, and a multi-function unit 2 of another composite apparatus 1 which is coupled to the remote LAN 500-4 is instructed to print this registered document. In this case, the LAN 500-4 is coupled to the LAN 500-1 via the network 510.

Figure 20:
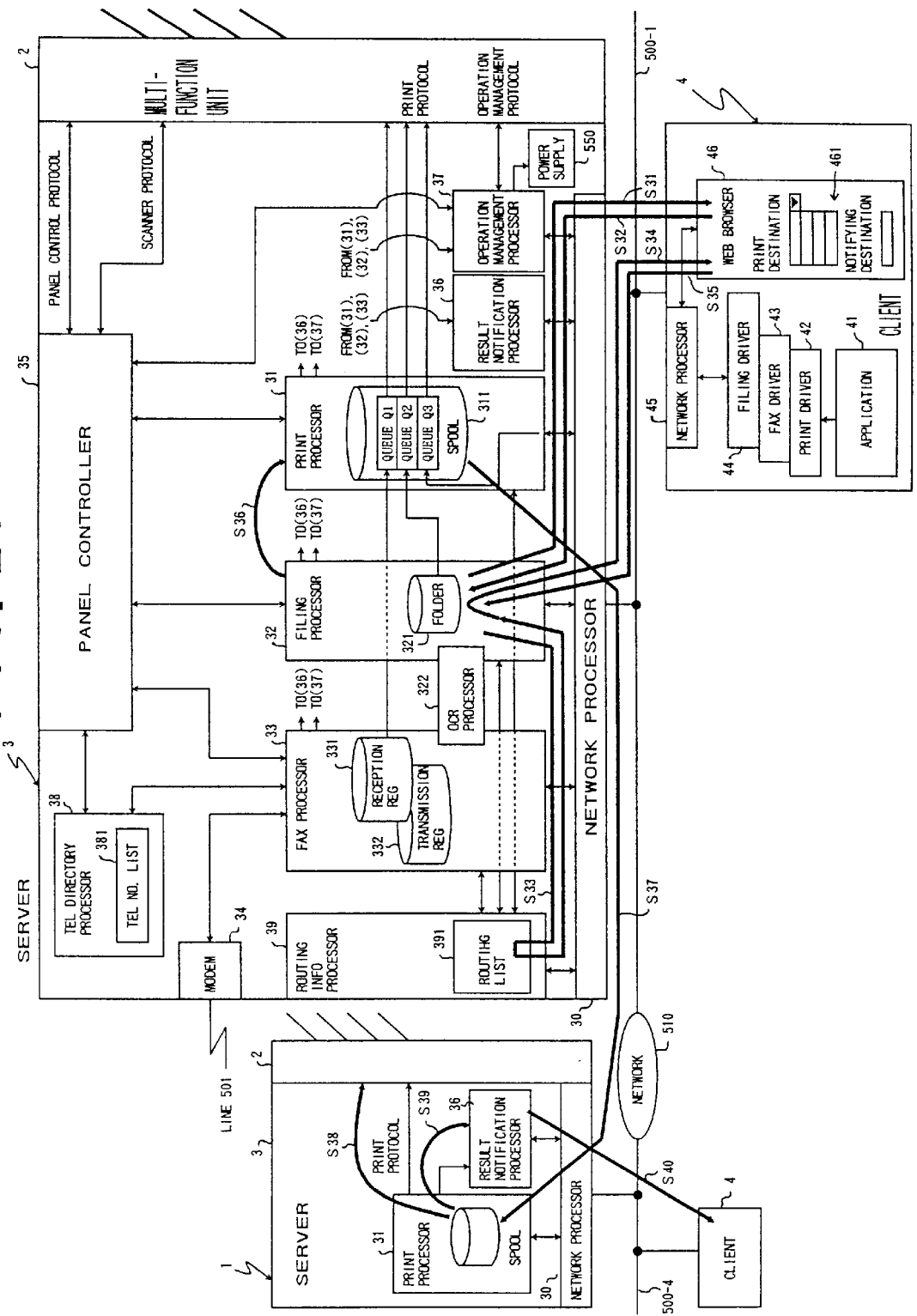
FIG. 20 is a diagram for explaining a print process from the server via a remote server.
Figure 21:
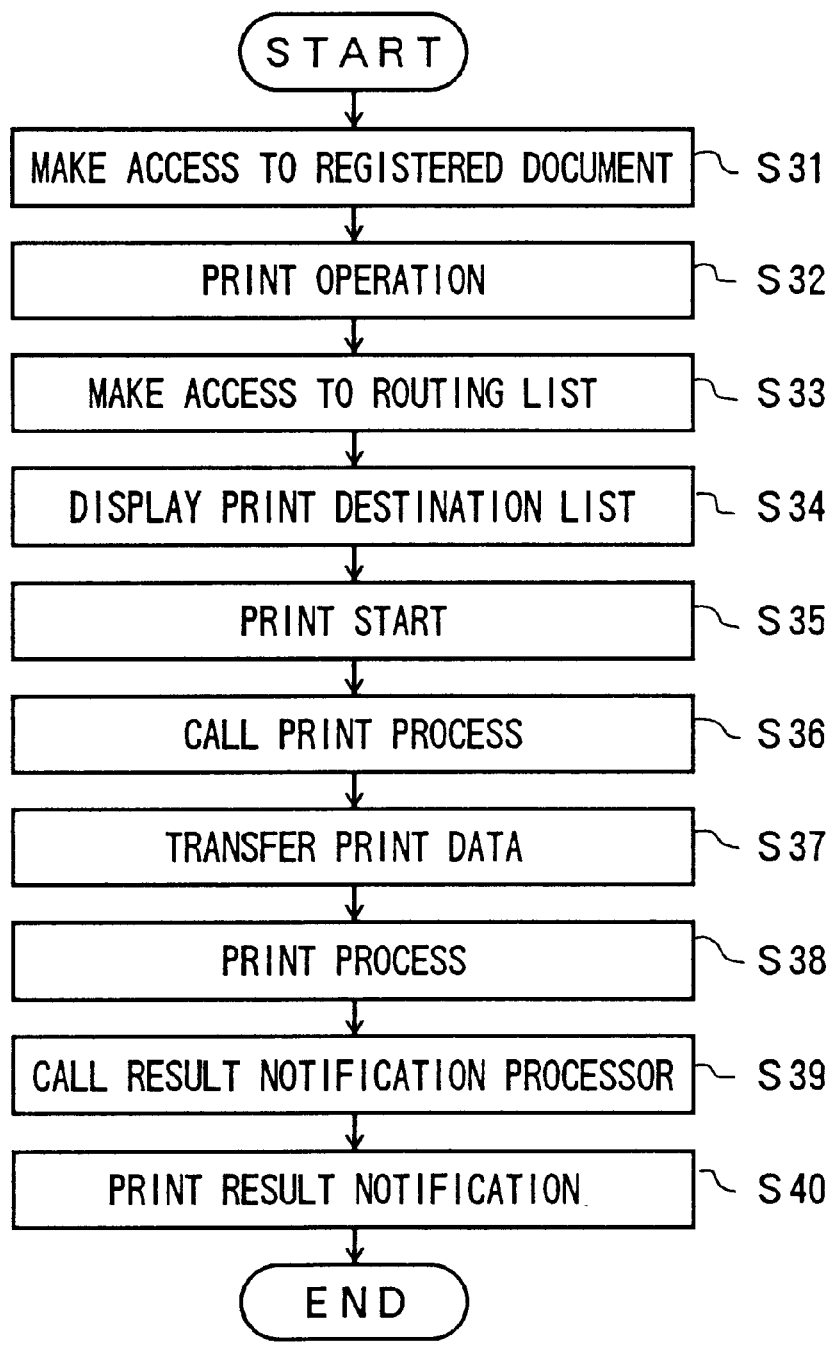
FIG. 21 is a flow chart for explaining a procedure of a print process from the server via the remote server.

FIG. 20 is a diagram for explaining a print process from the server 3 via the remote server 3. In FIG. 20, those parts which are the same as those corresponding parts in FIG. 6 are designated by the same reference numerals, and a description thereof will be omitted. FIG. 21 is a flow chart for explaining a procedure of the print process from the server 3 via the remote server 3. In FIG. 20, S31 through S40 respectively correspond to steps S31 through S40 shown in FIG. 21.

In FIGS. 20 and 21, the step S31 makes an access from the web browser 46 of the computer 4 to the registered documents which are registered in the filing processor 32 of the server 3 that is coupled to the LAN 500-1. The step S32 specifies a registered document which is to be printed, and carries out a print operation for calling the print function with respect to the filing processor 32. The step S33 makes an access to the routing list 391 of the routing information processor 39 from the filing processor 32, and the step S34 displays on a screen 461 of the web browser 46 a print destination list which is obtained from the routing list 391. The step 35 urges the operator to select the print destination and to input a notifying destination of a print result notification, and the print start is carried out when the print destination and the notifying destination are specified.

The step S36 calls a print process with respect to the print processor 31 from the filing processor 32. The step S37 transfers the print data which is related to the registered document and specified from the print processor 31 to the server 3 (hereinafter referred to as the other server 3) of another composite apparatus 1 which is coupled to the remote LAN 500-4. The step S38 carries out the above described print process by the print processor 31 of the other server 3, with respect to the multi-function unit 2 (hereinafter referred to as the other multi-function unit 2) which forms the other composite apparatus 1 together with the other server 3. The step S39 calls the result notification processor 36 within the other server 3 when the print process by the other multi-function unit 2 is completed. For example, if the notifying destination of the print result notification specified in the step S35 is the computer 4 which is coupled to the LAN 500-4, the step S40 makes the print result notification to this computer 4 which is coupled to the LAN 500-4 from the result notification processor 36 within the other server 3. For example, the print result indicates the print completion when the result notification processor 36 is notified of the print completion within a predetermined time, and the print result indicates a print incomplete when the result notification processor 36 is not notified of the print completion within the predetermined time.

The print result notification may be made by utilizing the mail function such as the electronic mail (e-mail).

(2d) Document Registration From Server 3 To Remote Server 3

For example, a description will be given of a processing procedure for a case where a registered document in the server 3 of the composite apparatus 1 which is coupled to the LAN 500-1 is accessed from the computer 4 which is coupled to the same LAN 500-1, and a server 3 of another composite apparatus 1 which is coupled to the remote LAN 500-4 is instructed to register this registered document. In this case, the LAN 500-4 is coupled to the LAN 500-1 via the network 510.

Figure 22:
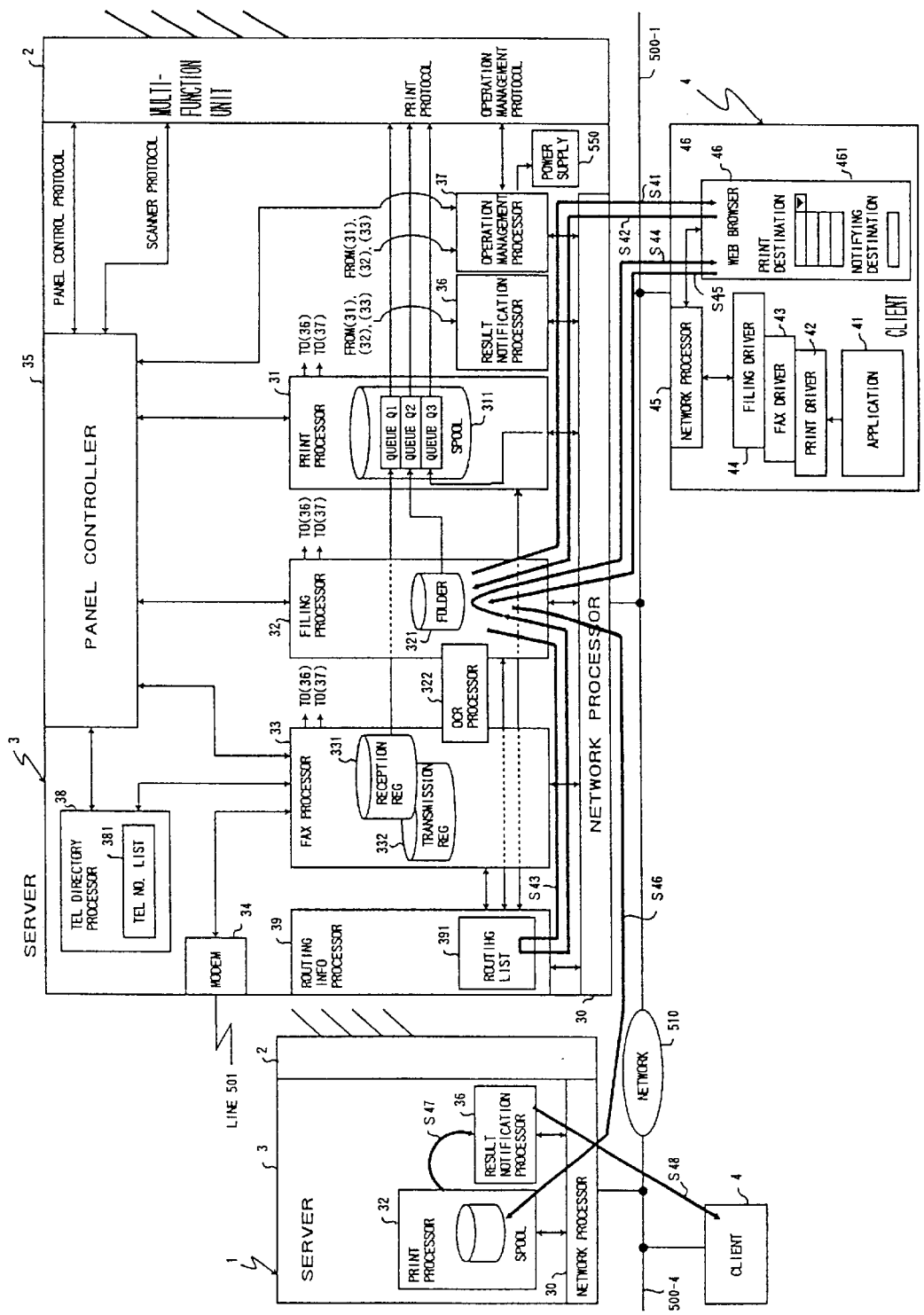
FIG. 22 is a diagram for explaining a document registration process from the server via a remote server.
Figure 23:
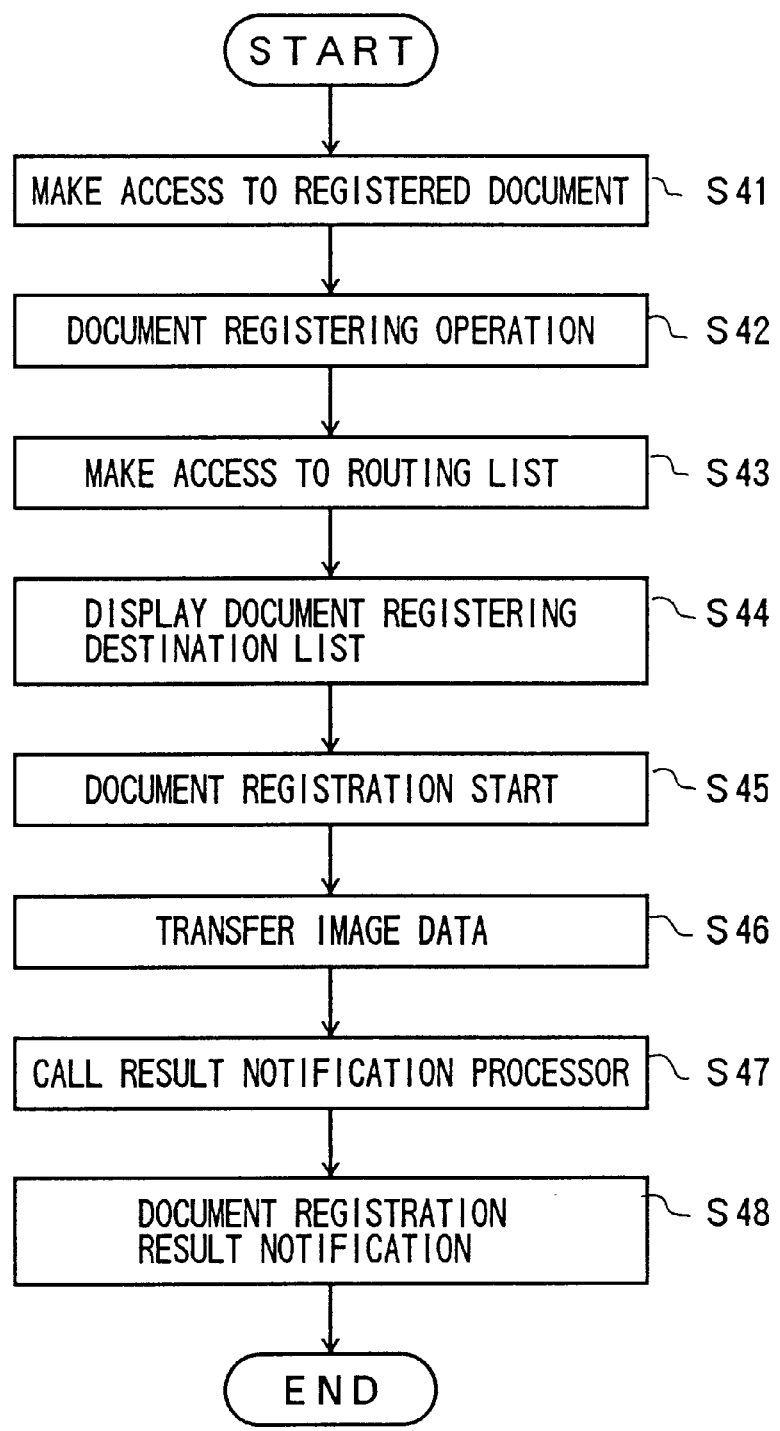
FIG. 23 is a flow chart for explaining a procedure of the document registration process from he server via the remote server.

FIG. 22 is a diagram for explaining a document registration from the server 3 via the remote server 3. In FIG. 22, those parts which are the same as those corresponding parts in FIG. 6 are designated by the same reference numerals, and a description thereof will be omitted. FIG. 23 is a flow chart for explaining a procedure of the document registration from the server 3 via the remote server 3. In FIG. 23, S41 through S48 respectively correspond to steps S41 through S48 shown in FIG. 22.

In FIGS. 22 and 23, the step S41 makes an access from the web browser 46 of the computer 4 to registered documents which are registered in the filing processor 32 of the server 3 which is coupled to the LAN 500-1. The step S42 specifies a registered document which is to be registered, and carries out a document registering (or document move or copy) operation with respect to the filing processor 32. The step S43 makes an access from the filing processor 32 to the routing list 391 of the routing information processor 39, and the step S44 displays on the screen 461 of the web browser 46 a document registering destination list which is obtained from the routing list 391. The step S45 urges the operator to select the document registering destination and to input a notifying destination of a document registration result notification on the screen 461, and the document registration (or document move or copy) start is carried out when the document registering destination and the notifying destination are specified.

The step S46 transfers the image data related to the registered document which is specified from the filing processor 32 to the filing processor 32 within the server 3 (hereinafter referred to as the other server 3) of the other composite apparatus 1 which is coupled to the remote LAN 500-4, and moves or copies the image data to the folder 321 of the filing processor 32 within this other server 3. As a result, the specified registered document is registered in the folder 321 of the filing processor 32 within this other server 3. The step S47 calls the result notification processor 36 within this other server 3 when the document registration process to this other server 3 is completed. For example, when the notifying destination of the document registration result notification specified in the step S45 is the computer 4 which is coupled to the LAN 500-4, the step S48 makes the document registration result notification from the result notification processor 36 within the other server 3 to the computer 4 which is coupled to the LAN 500-4. For example, the document registration result indicates the document registration completion when the result notification processor 36 is notified of the document registration completion within a predetermined time, and the document registration result indicates a document registration incomplete when the result notification processor 36 is not notified of the document registration completion within the predetermined time.

The document registration result notification may be made by utilizing the mail function such as the electronic mail (e-mail).

(2e) Facsimile Transmission From Server 3

For example, a description will be given of a processing procedure for a case where the image data read by the multi-function unit 2 of the composite apparatus 1 which is coupled to the LAN 500-1 is sent to the server 3 of another composite apparatus 1 which is coupled to the remote LAN 500-4 by a facsimile transmission. In this case, the LAN 500-4 is coupled to the LAN 500-1 via the network 510.

Figure 24:
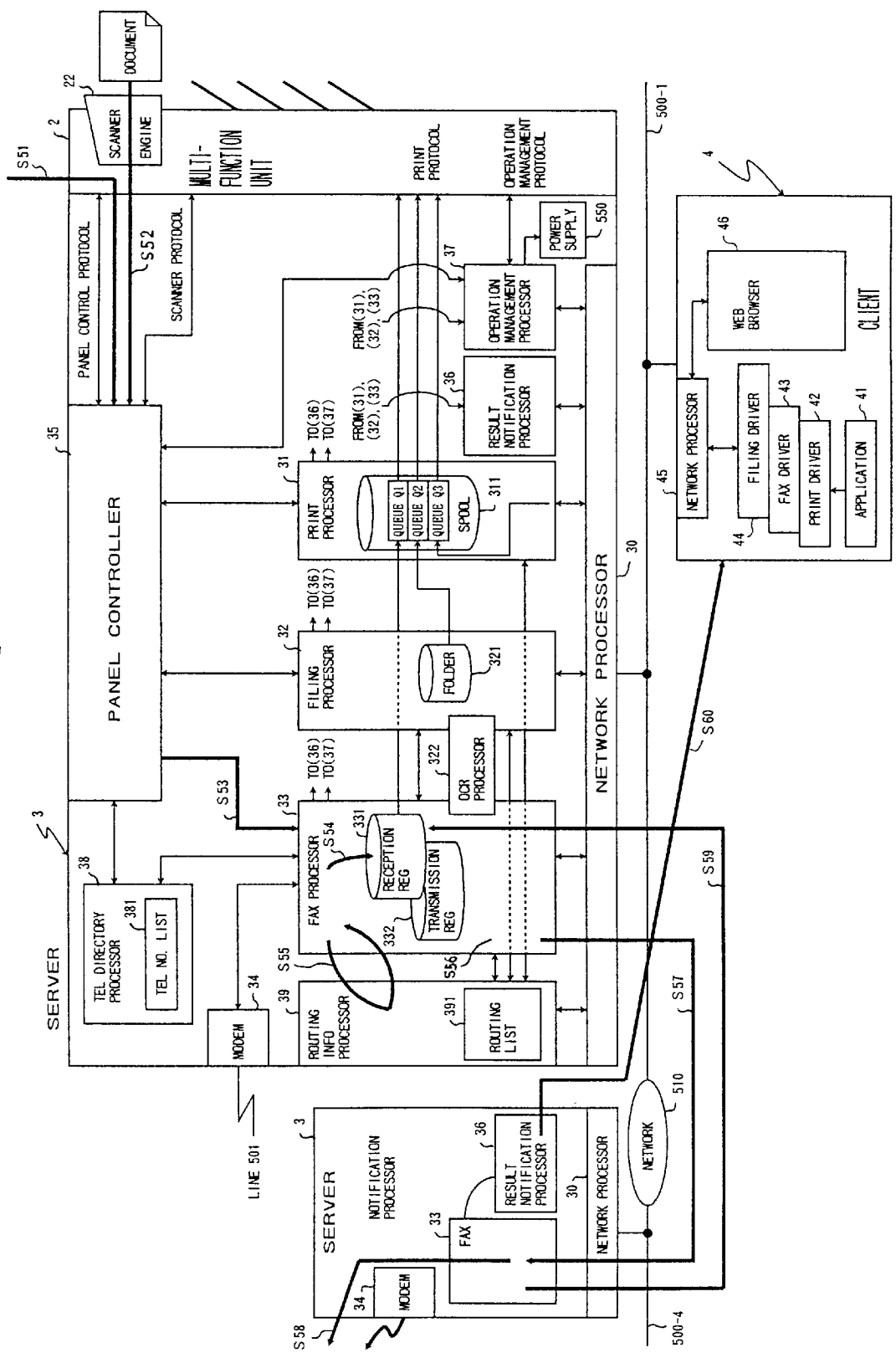
FIG. 24 is a diagram for explaining a facsimile communication process from the server.
Figure 25:
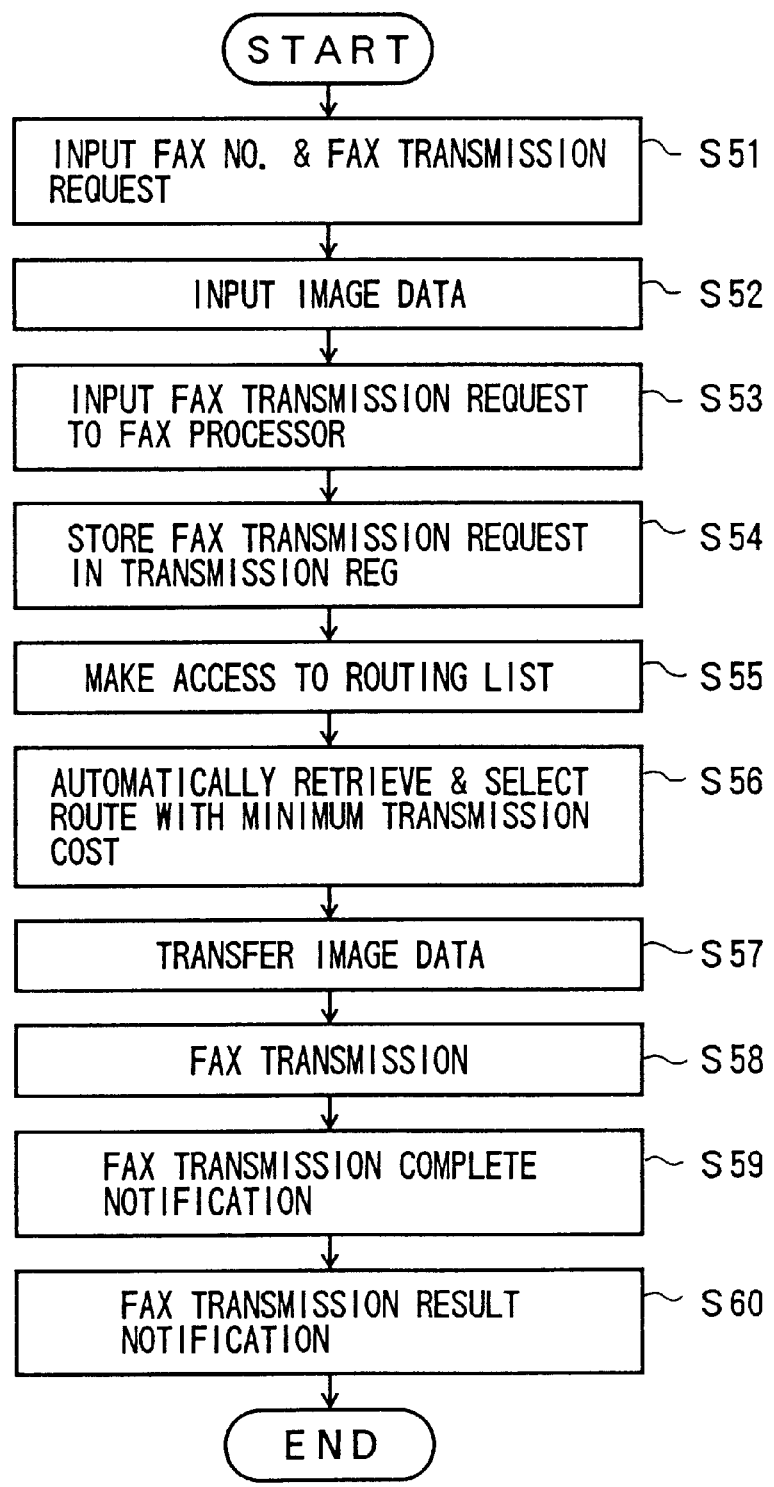
FIG. 25 is a flow chart for explaining a procedure of the facsimile communication process from he server.

FIG. 24 is a diagram for explaining a facsimile transmission process from the server 3 to the remote server 3. In FIG. 24, those parts which are the same as those corresponding parts in FIG. 6 are designated by the same reference numerals, and a description thereof will be omitted. In addition, FIG. 25 is a flow chart for explaining a procedure of the facsimile transmission process from the server to the remote server 3. In FIG. 24, S51 through S60 respectively correspond to steps S51 through S60 shown in FIG. 25.

In FIGS. 24 and 25, when a facsimile number of a destination is input and a facsimile transmission operation is made from the operation panel 23 of the multi-function unit 2, the step S51 inputs the facsimile number and a facsimile transmission request to the panel controller 35 of the server 3 which forms the composite apparatus 1 together with the multi-function unit 2. A notifying destination of a facsimile transmission result which will be described later may be specified in advance with respect to the facsimile processor 33 or, input and specified from the operation panel 23 in the step S51. The step S52 inputs the image data of the document which is read by the scanner engine 22 of the multi-function unit 2 to the panel controller 35 of the server 3. The step S53 inputs the facsimile transmission request from the panel controller 35 to the facsimile processor 33. The step S54 stores the facsimile transmission request in the transmission register 312 within the facsimile processor 33.

The step S55 makes an access to the routing list 391 of the routing information processor 39, and the step S56 automatically retrieves and selects a route having a minimum transmission cost from the routing list 391. The step S57 transfers the image data which is read by the scanner engine 22 of the multi-function unit 2 to the server 3 (hereinafter referred to as the other server 3) of the other composite apparatus 1 which is coupled to the remote LAN 500-4, via the selected route. The step S58 transmits the image data from the facsimile processor 33 within this other server 3 via the modem 34 within this other server 3 and the line 501, and a facsimile machine or a multi-function unit 2 at the destination makes a facsimile reception via the line 501. When the facsimile transmission process by the facsimile processor 33 within the other server 3 is completed, the step S59 makes a facsimile transmission complete notification to the facsimile processor 33 within the server 3 which is coupled to the LAN 500-1. In addition, the step S60 makes a facsimile transmission result notification by calling the result notification processor 36 within the other server 3 from the facsimile processor 33 within this other server 3. For example, when the notifying destination of the facsimile transmission result specified in the step S51 is the computer 4 which is coupled to the LAN 500-4, the step S60 makes the facsimile transmission result notification from the result notification processor 36 within the other server 3 to the computer 4 which is coupled to the LAN 500-4. For example, the facsimile transmission result indicates the facsimile transmission completion when the result notification processor 36 is notified of the facsimile transmission completion within a predetermined time, and the facsimile transmission result indicates a facsimile transmission incomplete when the result notification processor 36 is not notified of the facsimile transmission completion within the predetermined time.

The facsimile transmission result notification may be made by utilizing the mail unction such as the electronic mail (e-mail).

(2f) Generation of Routing List 391

The routing list 391 within the routing information processor 39 may be input manually at the server 3 or the computer 4 or, generated automatically. For example, when inputting the routing list 391 manually at the server 3, the routing list 391 is input from an input device of the server 3, such as a keyboard and a mouse. For the sake of convenience, it is assumed that the input device of the server 3 is included in the network processor 30 in FIG. 6. In addition, the routing list 391 may be copied and transferred from one server 3 to another server 3, and in this case, the transfer process may be carried out similarly to the process described above for the case where the registered document which is registered within one server 3 is transferred to and registered in another server 3.

Figure 26:
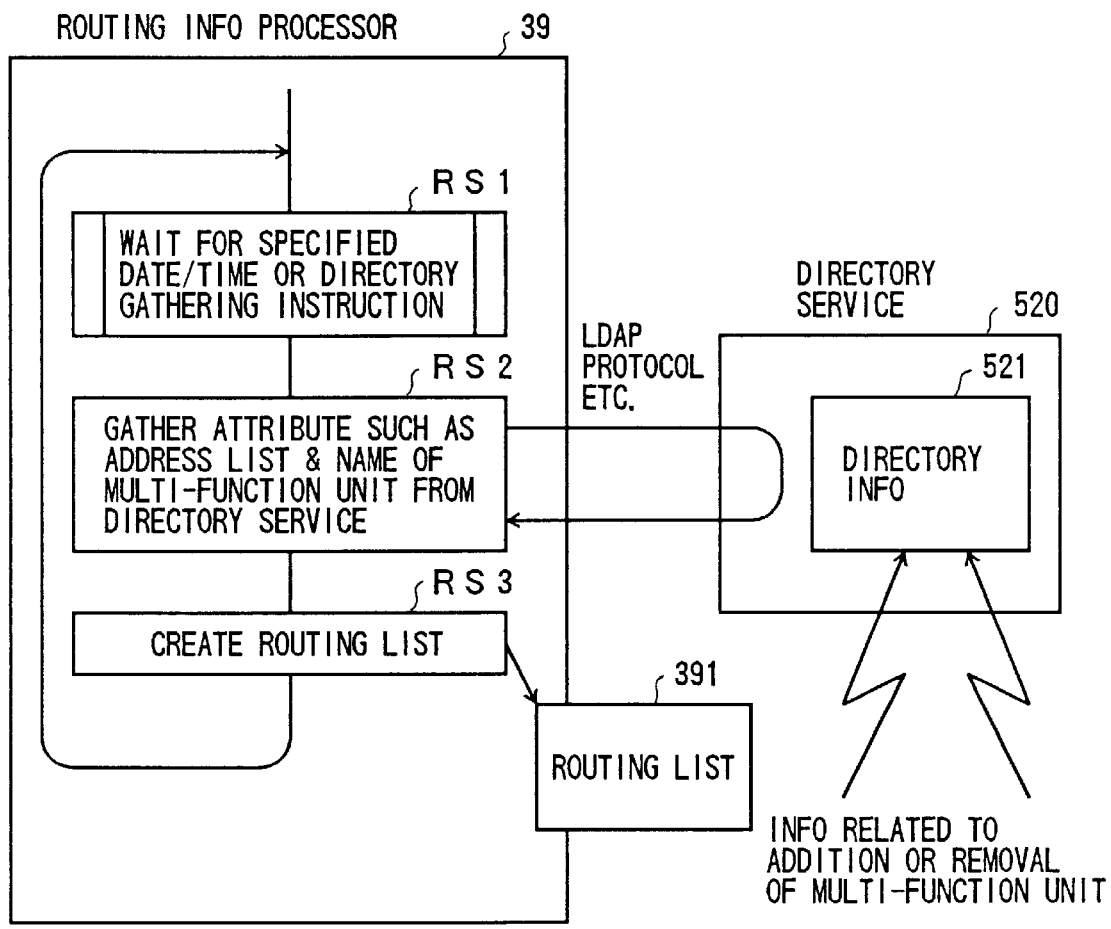
FIG. 26 is a diagram for explaining an automatic generation of a routing list.

When automatically generating the routing list 391, it is possible to utilize a directory service which is provided in each network. FIG. 26 is a diagram for explaining the automatic generation of the routing list 391 in this case, and shows a process carried out by the routing information processor 39. In FIG. 26, those parts which are the same as those corresponding parts in FIG. 6 are designated by the same reference numerals, and a description thereof will be omitted.

For example, directory information 521 related to composite apparatuses 1, computers 4 and the like which are coupled to the LANs 500-1 through 500-4 is registered in a directory server 520 which is provided with respect to the LANs 500-1 through 500-4. This directory information 521 includes lists of addresses, names, attributes (identifiers) and the like of equipments such as the composite apparatuses 1 ad the computers 4 which are coupled to the LANs 500-1 through 500-4, and these lists are updated every time an equipment is added or removed with respect to LANs 500-1 through 500-4. The attribute (identifier) indicates whether or not the equipment has a routing function.

In FIG. 26, a step RS1 waits for a specified date and/or time or, a directory information gathering instruction. A step RS2 makes access to and acquires the directory information 521 from the directory service 520 according to a predetermined protocol. A step RS3 generates the routing list 391 based on the directory information 521.

FIG. 27 is a diagram showing an embodiment of the routing list 391 which is automatically generated. The routing list 391 shown in FIG. 27 is automatically updated by repeating the steps RS1 through RS3 described above. When the routing list 391 which is required for the routing is automatically generated and automatically updated in this manner, the operator of the server 3 need not be aware of the structure of the LANs 500-1 through 500-4.

(3) Operation Panel Control Process (3a) Display of Telephone Directory

In this embodiment, the following 3 kinds of functions (i) through (iii) are provided in relation to the display of the telephone directory.

According to the function (i), the server 3 of the composite apparatus 1 displays a telephone directory which is based on the telephone number list 381 on the operation panel 23 in response to an instruction input from the operation panel 23 of the multi-function unit 2 of the composite apparatus 1, by the panel controller 35 and the telephone directory processor 38 of the server 3 of the composite apparatus 1. By displaying the telephone directory on the operation panel 23, it becomes possible to select a destination and/or a notifying destination from the displayed telephone directory when making a series of operations at the time of a facsimile transmission or the like. This telephone directory is also accessible from the side of the computer (client) 4.

According to the function (ii), the transfer of the telephone directory data from the panel controller 35 to the operation panel 23 is made in data units displayable at one time on the operation panel 23. By avoiding an extremely large amount of data from being transferred at one time, it becomes possible to display the telephone directory at a high speed. In a case where the entire telephone directory cannot be displayed within the screen of the operation panel 23, the data after a scroll of the screen is transferred from the panel controller 35 to the operation panel 23 every time a scroll button on the operational panel 23 or the screen is operated. The data once read from the telephone number list 381 of the telephone directory processor 38 may be stored in a cache memory within the telephone directory processor 38 or the panel controller 35, so as to realize a high-speed data transfer to the operation panel 23 in response to the scroll of the screen.

According to the function (iii), the contents of the telephone directory which is displayed on the screen of the operation panel 23 may be rearranged (sorted) in an alphabetical order, order dependent upon the frequency of use or the like, for example, depending on a selection which is made from the operation panel 23 or a setting which is made in advance.

Figure 28:
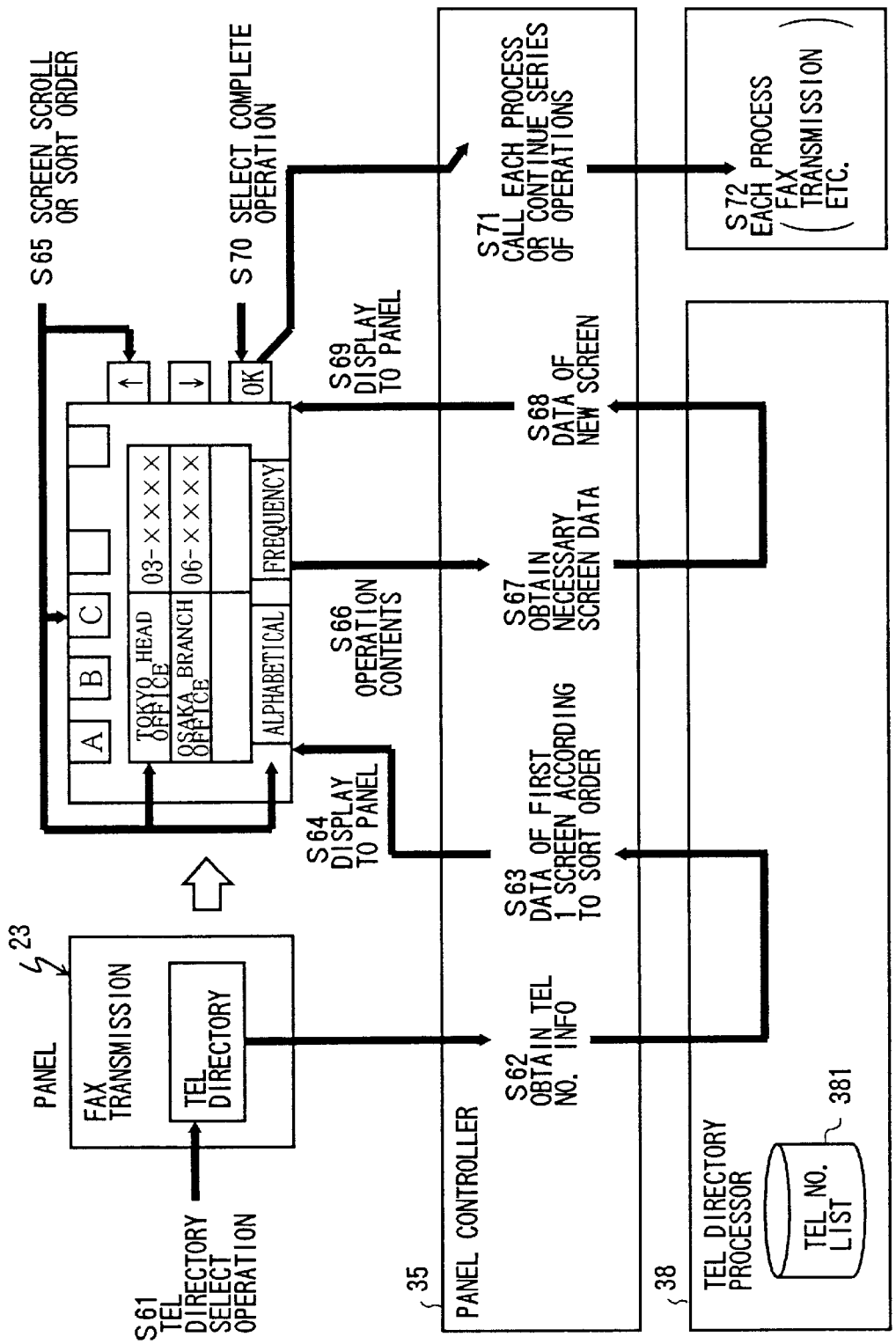
FIG. 28 is a diagram for generally explaining a telephone directory display procedure.

FIG. 28 is a diagram for generally explaining a telephone directory display procedure. In FIG. 28, a step S61 inputs a function of the multi-function unit 2 and a display of the telephone directory which are selected by the operator from the operation panel 23. For example, it is assumed for the sake of convenience that the facsimile transmission function is selected as the function of the multi-function unit 2. In a step S62, the panel controller 35 makes an access to and acquires the telephone number list 381 of the telephone directory processor 38 in response to the selection of the display of the telephone directory, and a telephone directory is generated in the telephone directory processor 38 based on telephone numbers which are related to the facsimile transmission function. A step S63 transfers the data amounting to the first 1 screen of the telephone directory from the telephone directory processor 38 to the operation panel 23 via the panel controller 35, depending on a sort order which is set in advance, for example. A step S64 displays the data transferred from the panel controller 35 on the operation panel 23.

In a step S65, the operator selects the screen scroll and the sort order from the operation panel 23. A step S66 notifies the panel controller 35 of the selection contents related to the selection made by the operator, and a step S67 obtains from the telephone directory processor 38 the data which become necessary depending on the selection contents. In the case where the cache memory is provided within the telephone directory processor 38 or the panel controller 35, the step S67 reads the data which become necessary depending on the selection contents from this cache memory. A step S68 transfers the data obtained in the step S67 to the operation panel 23, and a step S69 displays the data transferred from the panel controller 35 on the operation panel 23.

In a step S70, the operator makes a selection complete operation from the operation panel 23. A step S71 calls a process corresponding to the selected function, in response to this selection complete operation. In this case, since the facsimile transmission function is selected, the facsimile processor 33 starts a process in a step S72 according to the facsimile transmission function which is called. If a series of operations is required by the operator before the selected function is called, the step S71 displays a message urging the operator to make the operation on the operation panel 23 and waits for the operation to be made.

Figure 29:
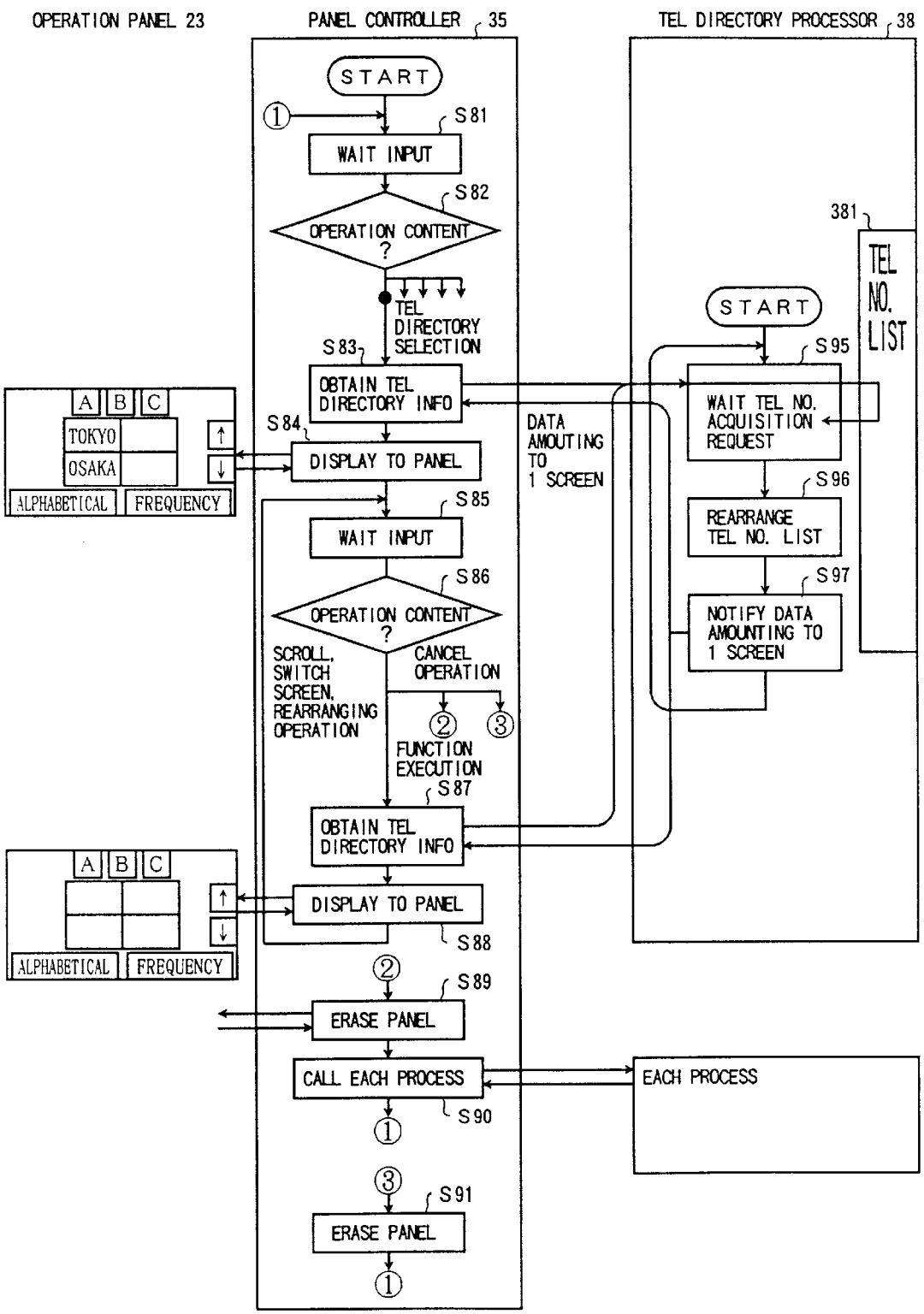
FIG. 29 is a flow chart for explaining the display of the telephone directory.

FIG. 29 is a flow chart for explaining the display of the telephone directory. In FIG. 29, the panel controller 35 waits for an input and/or selection to be made by the operator from the operation panel 23, in a step S81. A step S82 judges the contents of the input and/or selection when the input and/or selection is made from the operation panel 23, and the process advances to a step S83 if the display of the telephone directory is selected. The step S83 makes an access to and acquires the telephone directory list 391 of the telephone directory processor 38, and obtains from the telephone directory processor 38 the telephone directory data corresponding to the selected function.

In relation to the step S83, the telephone directory processor 38 waits for a telephone number acquisition request in a step S95, and generates a telephone directory corresponding to the selected function by reading the telephone numbers from the telephone number list 381 if the telephone number acquisition request is received. A step S96 rearranges (sorts) the telephone numbers of the telephone directory in the selected order or in the sort order which is set in advance. A step S97 transfers the data amounting to 1 screen of the sorted telephone directory to the panel controller 35. A known technique can be used for the sort process itself.

In a step S84, the panel controller 35 displays on the operation panel 23 the data amounting to the 1 screen obtained from the telephone directory processor 38, and a step S85 waits for an input and/or selection to be made from the operation panel 23. A step S86 judges the content of the input and/or selection when the input and/or selection is made from the operation panel 23. For example, the process advances to a step S87 if an operation such as scroll, switching of the screen, and rearranging (sorting) of the data is made from the operation panel 23, the process advances to a step S89 if a function execution (selection complete) operation is made from the operation panel 23, and the process advances to a step S91 if a cancel operation is made from the operation panel 23.

The step S87 obtains the data of the screen which is requested to be displayed from the telephone directory processor 38, depending on the operation such as scroll, switching of the screen, and rearranging (sorting) of the data made from the operation panel 23. A step S88 transfers the data obtained in the step S87 to the operation panel 23 to display the data on the operation panel 23. The process returns to the step S81 after the step S88.

The step S89 erases the display of the telephone directory on the operation panel 23, depending on the function execution operation made from the operation panel 23. A step S90 calls a process corresponding to the selected function. Since the facsimile transmission function is selected in this case, the step S90 calls the facsimile transmission function and a corresponding process of the facsimile processor 33 is started. The process returns to the step S81 after the step S90.

The step S91 erases the display on the operation panel 23 depending on the cancel operation made from the operation panel 23, and the process returns to the step S81.

(3b) Customizing of Operation Panel 23

In this embodiment, the following functions (iv) through (vi) are provided in relation to the customization of the operation panel 23.

According to the function (iv), it is possible to customize the display contents on the operation panel 23 of the multi-function unit 2 and the operation that is carried out when the operation panel 23 is operated.

According to the function (v), it is possible to edit the arrangement of the buttons and input items and the display contents on the operation panel 23. In addition, it is possible to define a series of operations corresponding to the selection of each of the buttons and each of the input items.

In addition, according to the function (vi), it is possible to select items (functions) such as the facsimile transmission and the document registration and to specify a processing script when defining the series of operations corresponding to the selection of each of the buttons and each of the input items.

Figure 30:
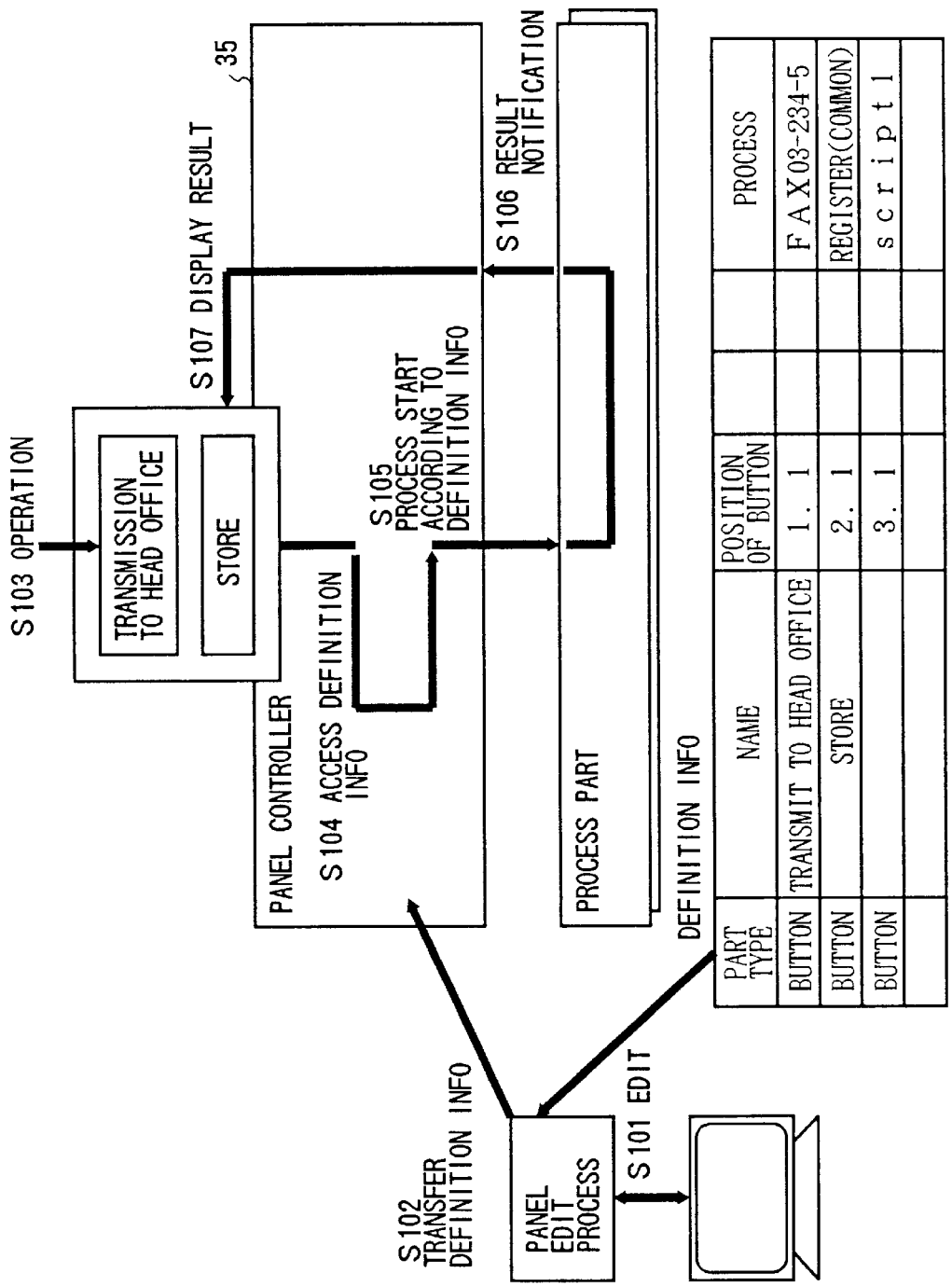
FIG. 30 is a diagram for generally explaining an operation panel customizing procedure.

FIG. 30 is a diagram for generally explaining an operation panel customizing procedure for customizing the operation panel 23. In a step S101 shown in FIG. 30, the operator makes an edit operation with respect to the display contents and the like of the operation panel 23. A step S102 transfers definition information related to an edit process of the operation panel 23 to the panel controller 35, so that the definition information is stored in a memory within the panel controller 35. The steps S101 and S102 are carried out in response to an instruction from the input device of the server 3, for example, but these steps S101 and S102 may be carried out in response to an instruction from the operation panel 23 of the multi-function unit 2 which forms the composite apparatus 1 together with the server 3 or, in response to an instruction from the computer 4 which is coupled to the same LAN as the server 3. The definition information related to the edit process of the operation panel 23 includes information shown in the lower part of FIG. 30, for example. In the definition information shown in FIG. 30, a process "register" is defined with respect to a part type "button", a name "store" and a button position "2.1", for example.

A step S103 inputs information corresponding to the operation made from the operation panel 23 to the panel controller 35, and a step S104 makes access to the definition information based on the information received from the operation panel 23. A step S105 selects a function corresponding to the accessed definition information. IF the facsimile function is selected, for example, the facsimile transmission process of the facsimile processor 33 is started. A step S106 notifies the panel controller 35 of a process result of the selected function, and a step S107 displays this process result on the operation panel 23. In this case, if the facsimile function is selected, the step S106 notifies the panel controller 35 of a facsimile process result of the facsimile processor 33, and the step S107 displays the facsimile process result on the operation panel 23.

Figure 31:
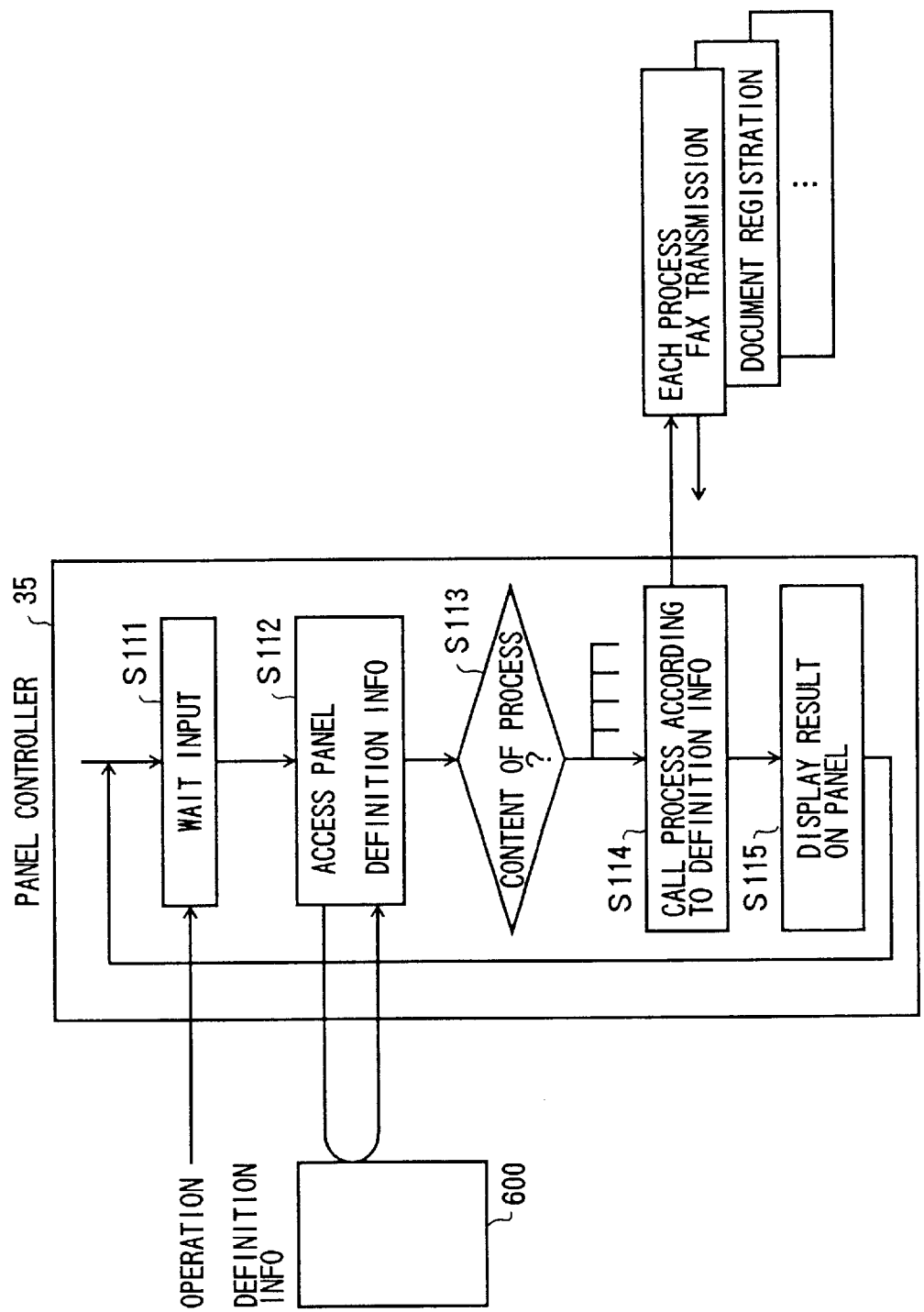
FIG. 31 is a flow chart for explaining customizing of the operation panel.

FIG. 31 is a flow chart for explaining customizing of the operation panel 23. In a step S111 shown in FIG. 31, the panel controller 35 waits for an input and/or selection to be made from the operation panel 23. A step S112 makes an access to a definition information 600 when the input and/or selection is made from the operation panel 23. Based on the definition information 600, a step S113 judges the contents of a process which is to be carried out depending on the input and/or selection made from the operation panel 23. A step S114 calls a process having the judged contents and waits for a notification of a process result related to this process. A step S115 displays the process result on the operation panel 23 when the notification of the process result is received, and the process returns to the step S111.

Figure 32:
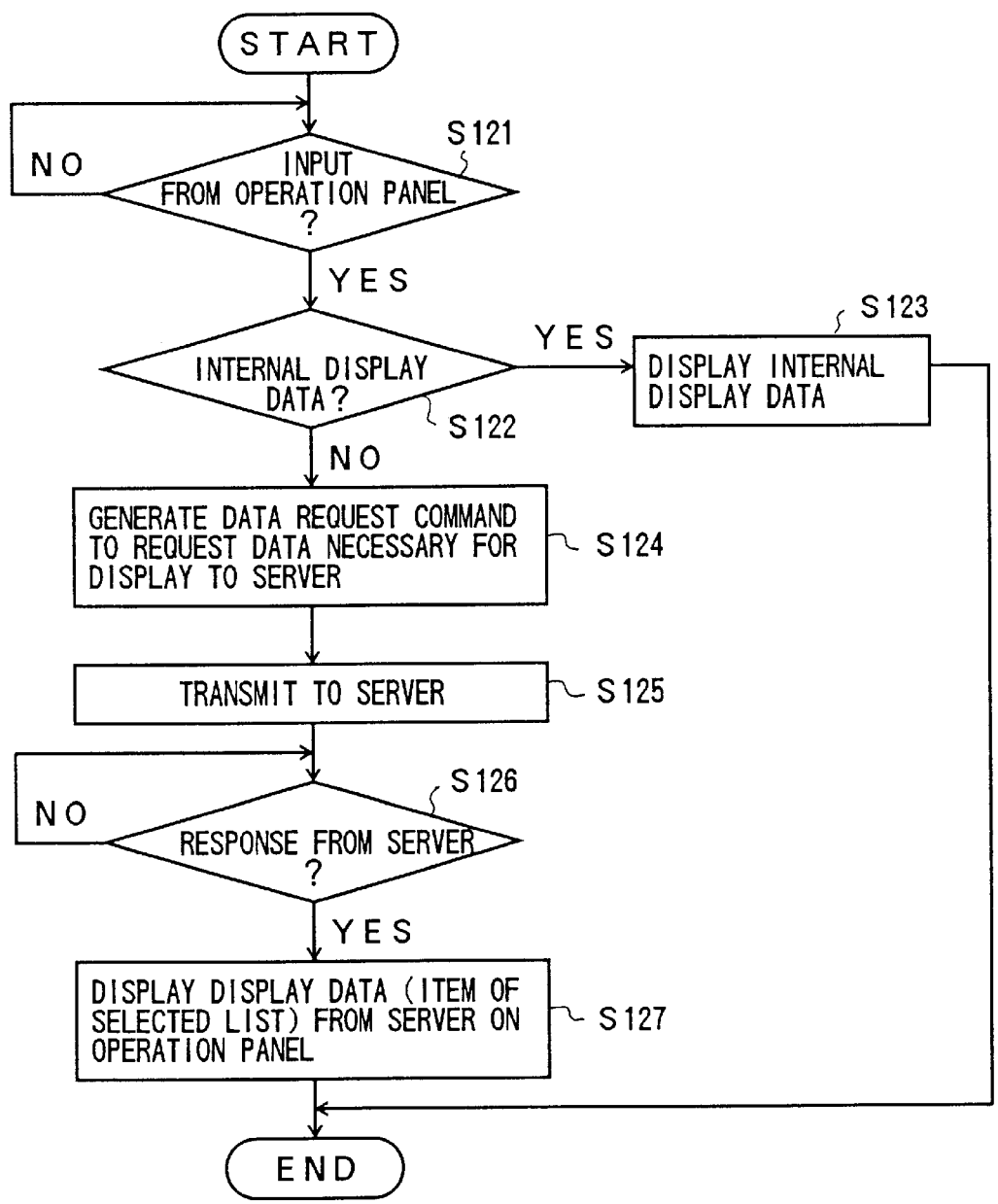
FIG. 32 is a flow chart for explaining a data acquisition process on an operation panel.

FIG. 32 is a flow chart for explaining a data acquisition process on the operation panel 23. The process shown in FIG. 32 may be carried out by the equipment state managing part 27 or, by a CPU provided within the operation panel 23 if the operation panel 23 is provided with such a CPU.

In FIG. 32, a step S121 decides whether or not an input and/or selection is made from the operation panel 23. If the decision result in the step S121 is YES, a step S122 decides whether or not the data to be displayed on the operation panel 23 is an internal display data of the multi-function unit 2, depending on the input and/or selection made from the operation panel 23. If the decision result in the step S122 is YES, a step S123 displays the internal display data on the operation panel 23, and the process ends.

On the other hand, if the decision result in the step S122 is NO, a step S124 generates a data request command in order to request the data necessary for the display to the panel controller 35 of the server 3. A step S125 transmits the generated data request command to the panel controller 35. A step S126 decides whether or not a response to the data request command is received from the panel controller 35, and the process advances to a step S127 if the decision result in the step S126 becomes YES. The step S127 displays the display data received from the panel controller 35 on the operation panel 23, and the process ends. In the case described above, the display data received from the panel controller 35 is the telephone directory data.

Figure 33:
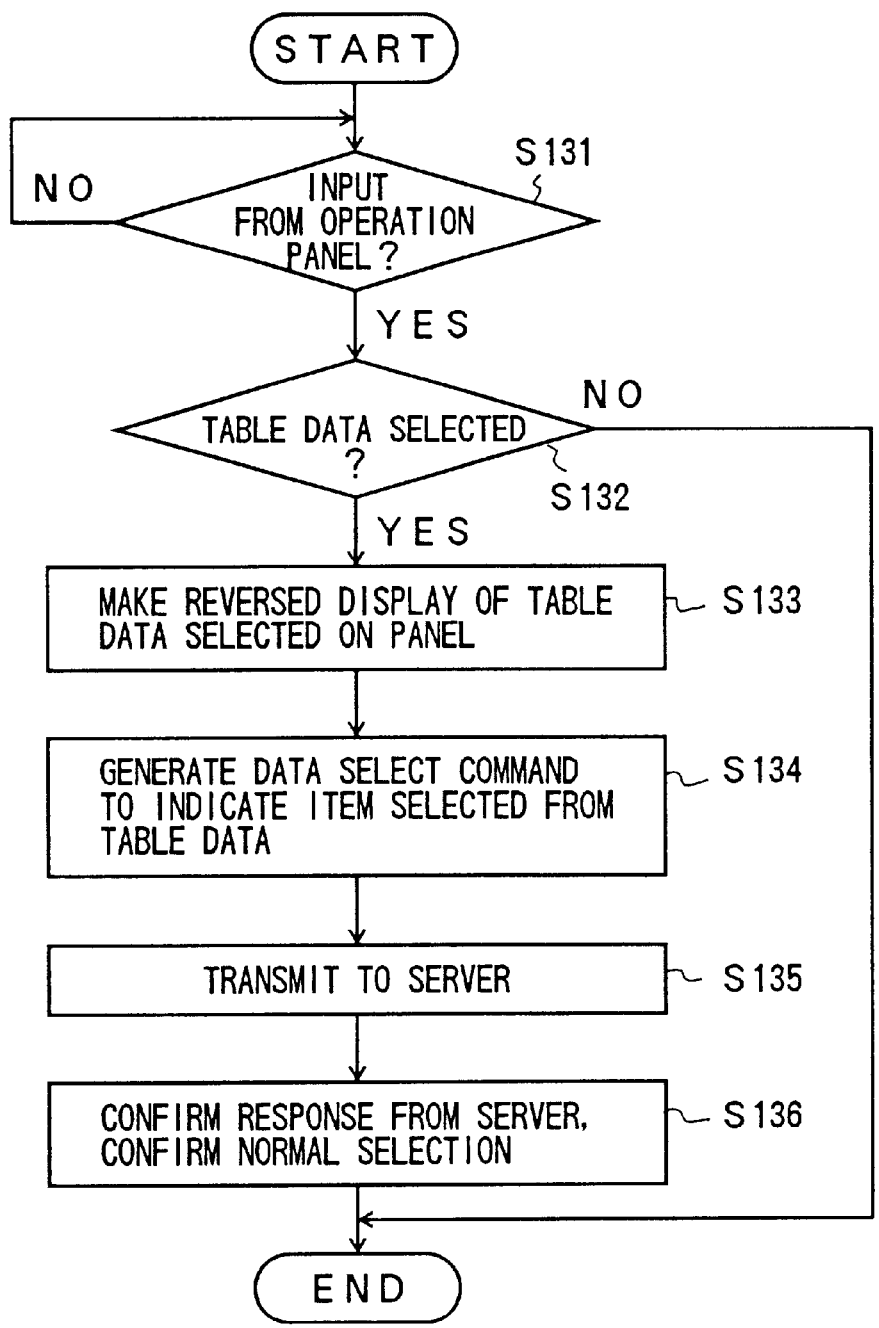
FIG. 33 is a flow chart for explaining a data selection process from the operation panel.

FIG. 33 is a flow chart for explaining a data selection process from the operation panel 23. The process shown in FIG. 33 may be carried out by the equipment state managing part 27 or, by a CPU provided within the operation panel 23 if the operation panel 23 is provided with such a CPU.

In FIG. 33, a step S131 decides whether or not an input and/or selection is made from the operation panel 23. If the decision result in the step S131 is YES, a step S132 decides whether or not the input and/or selection is made from table data. In the case described above, the table data is the telephone directory data. Accordingly, the step S132 decides whether or not a certain item is selected from the table data such as the telephone directory, and the process ends if the decision result in the step S132 is NO.

On the other hand, if the decision result in the step S132 is YES, a step S133 displays the selected item of the table data in the form of a reversed display on the operation panel 23. Of course, a method other than the reversed display may be used as long as the display method enables the selected item of the table data to be distinguished from the non-selected items of the table data. A step S134 generates a data selection command indicating the item selected from the table data, and a step S135 transmits this data selection command to the panel controller 35 of the server 3. A step S136 confirms a response from the panel controller 35 with respect to the data selection command, and the process ends when it is confirmed that the item is selected normally.

(4) OCR Control Process (4a) Title Extraction Process When Registering Document

In this embodiment, when registering the document (image data) which is obtained by reading the document by the scanner engine 22 of the multi-function unit 2 or by a facsimile reception, a title within the read or received image data is automatically extracted and used as the title of the document. As a result, it becomes unnecessary to carry out a troublesome operation of inputting the title of each document.

Figure 34:
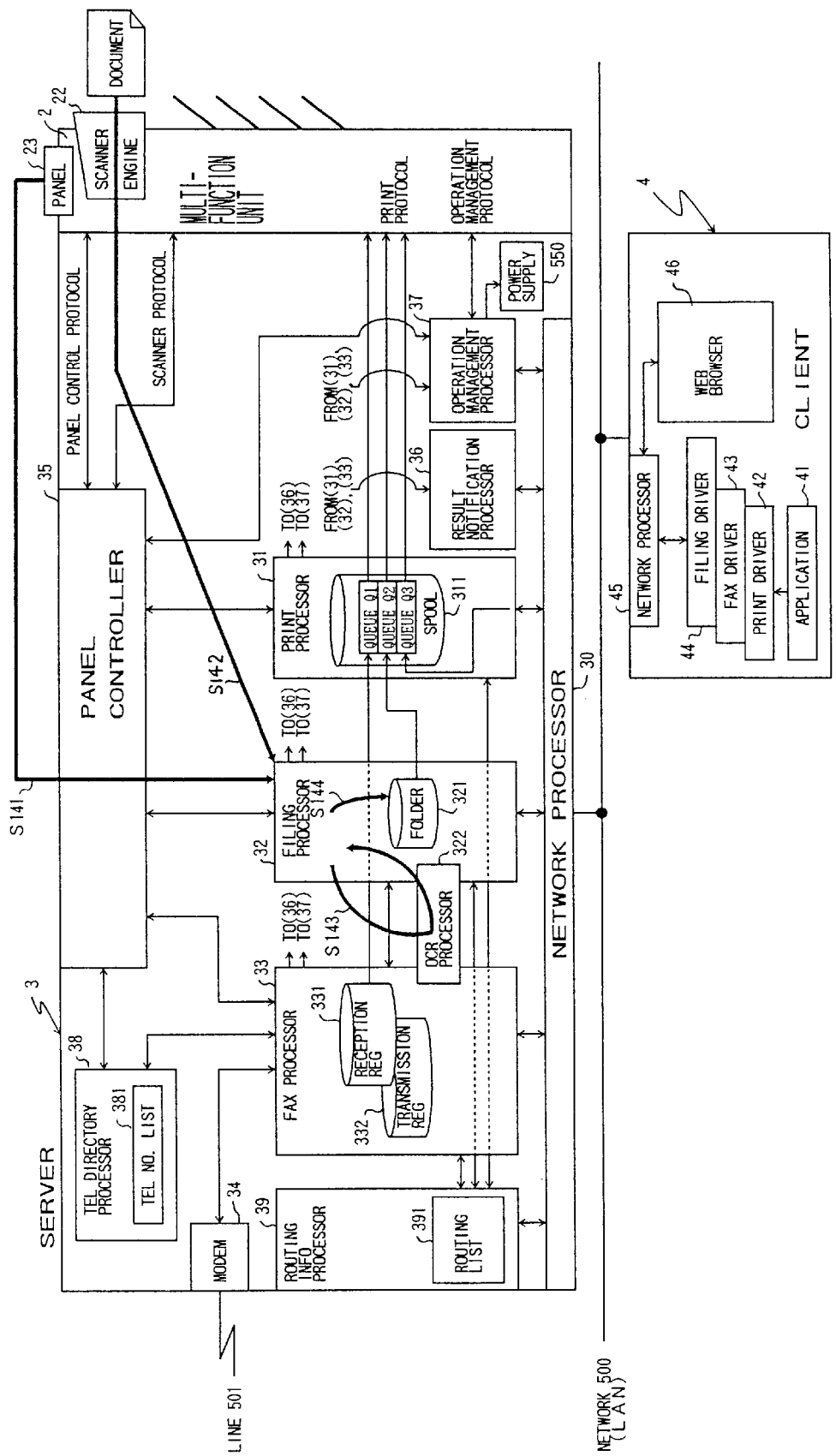
FIG. 34 is a diagram for explaining a title extraction process when reading a document.
Figure 35:
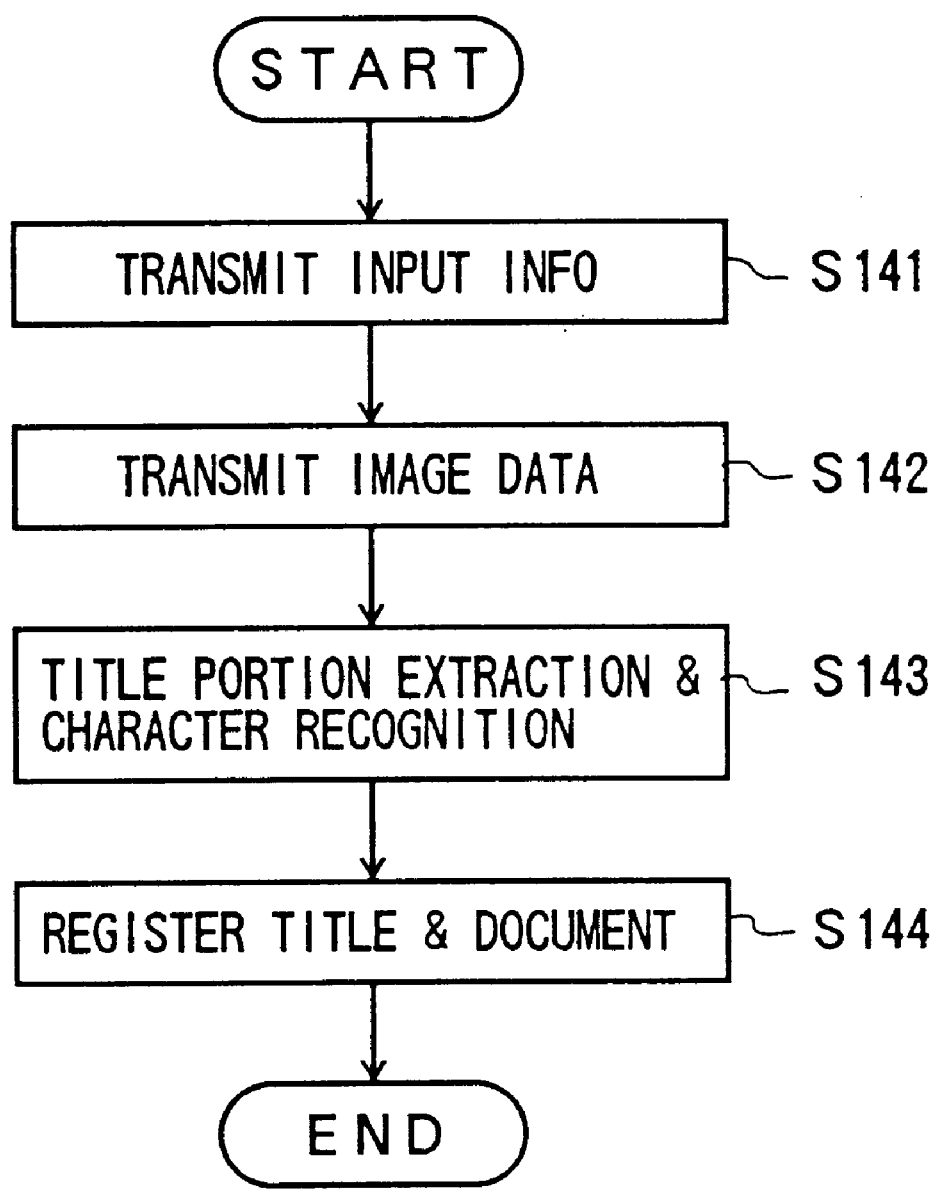
FIG. 35 is a flow chart for explaining a procedure of the title extraction process when reading the document.

FIG. 34 is a diagram for explaining the title extraction process when reading the document. In FIG. 34, those parts which are the same as those corresponding parts in FIG. 6 are designated by the same reference numerals, and a description thereof will be omitted. In addition, FIG. 35 is a flow chart for explaining a procedure of the title extraction process when reading the document. In FIG. 34, S141 through S144 respectively correspond to steps S141 through S144 shown in FIG. 35.

In FIGS. 34 and 35, when an operation related to a document registration is made from the operation panel 23 of the multi-function unit 2, the step S141 transmits input information from the operation panel 23 to the filing processor 32 via the panel controller 35 of the server 3. In addition, the step S142 transmits the image data read from the document by the scanner engine 22 of the multi-function unit 2 to the filing processor 32 via the panel controller 35 of the server 3. In the step S143, the OCR processor 322 extracts a title portion of the image data read from the document and recognizes characters within the title portion, by a known method. The step S144 sets the recognized characters within the title portion as the title of the document, and registers the title and the document in the folder 321.

Figure 36:
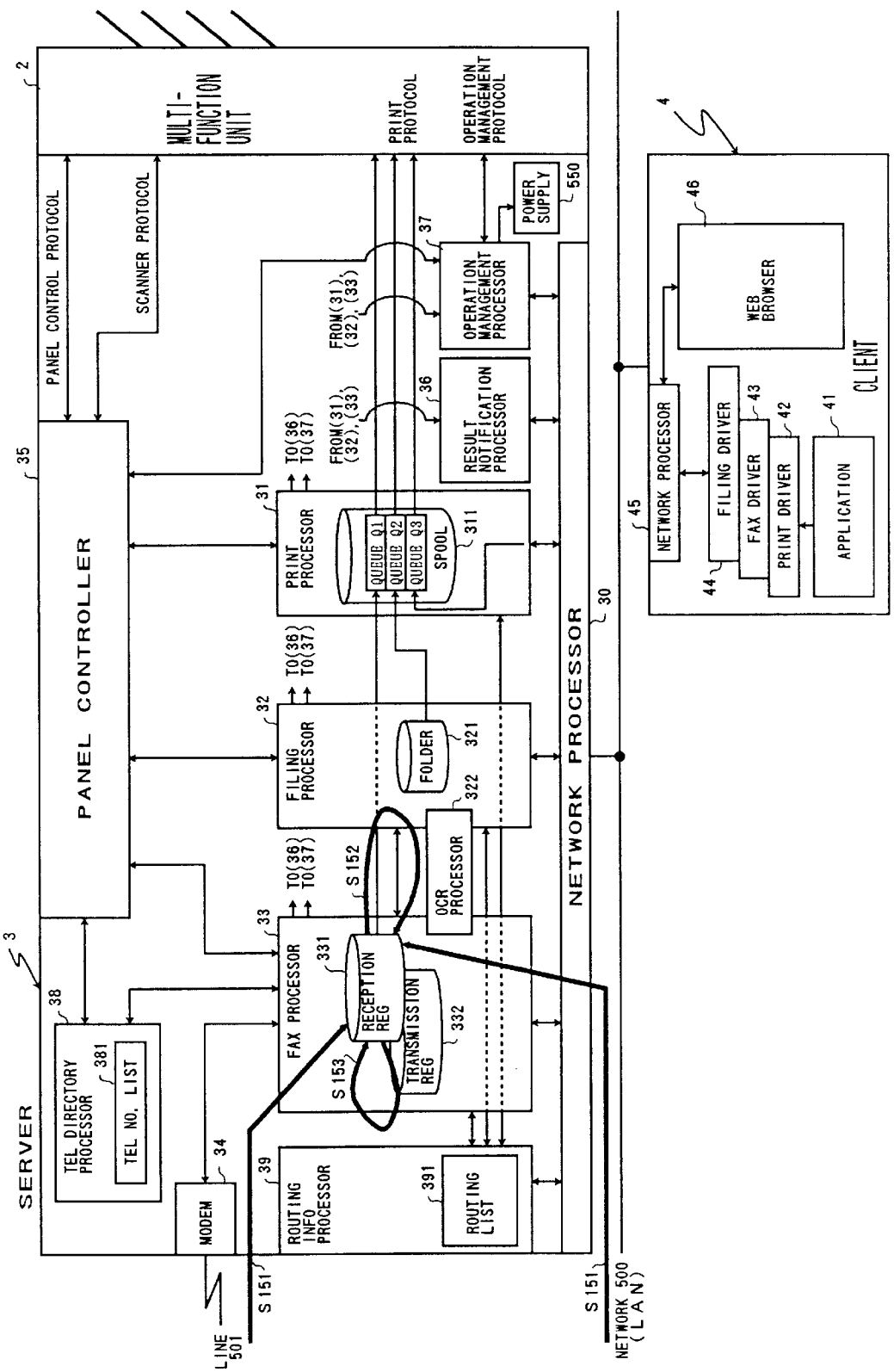
FIG. 36 is a diagram for explaining the title extraction process when making a facsimile reception.
Figure 37:
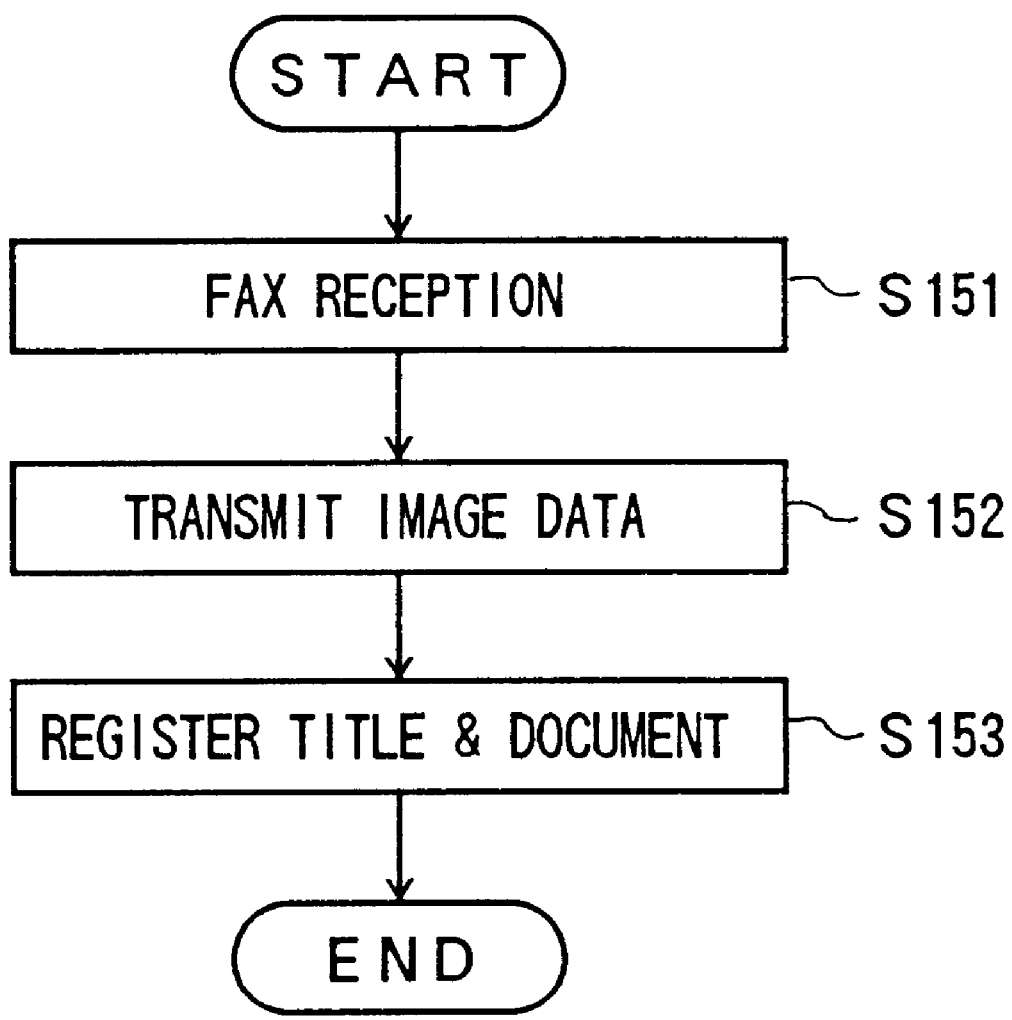
FIG. 37 is a flow chart for explaining a procedure of the title extraction process when making the facsimile reception.

FIG. 36 is a diagram for explaining a title extraction process when making a facsimile reception. In FIG. 36, those parts which are the same as those corresponding parts in FIG. 6 are designated by the same reference numerals, and a description thereof will be omitted. In addition, FIG. 37 is a flow chart for explaining a procedure of the title extraction process when making the facsimile reception. In FIG. 36, S151 through S153 respectively correspond to steps S151 through S153 shown in FIG. 37.

In FIGS. 36 and 37, the step S151 receives by a facsimile reception image data from a facsimile machine, another composite apparatus 1 or a computer 4 via the LAN 500 or via the line 501, and transmits the image data to the facsimile processor 33. The image data received via the LAN 500 is transmitted to the facsimile processor 33 via the network processor 30, while the image data received via the line 501 is transmitted to the facsimile processor 33 via the modem 34. In the step S152, the OCR processor 322 extracts a title portion of the received image data and recognizes characters within the title portion, by a known method. The step S153 sets the recognized characters within the title portion as the title of the document, and instructs the facsimile processor 33 to register the title and the document in the reception register 311.

(4b) Distribution To Folder 321 When Registering Document

In this embodiment, when registering the document (image data) which is read by the scanner engine 22 of the multi-function unit 2 or obtained by the facsimile reception, the characters within the read or received image data are recognized, and the document is distributed to a folder part which is defined in advance based on a recognition result. A character recognition position may be set arbitrarily to a position which is defined in advance, a part where a specified character exists, a part which is recognized as the title by the title extracting process described above, or the like. In other words, the character recognition position may be set in advance or specified. In addition, depending on the setting of definition information of the folder part where the document is to be distributed, it is possible to notify the character recognition position to the computer 4 or the composite apparatus 1 having the address which is specified when the document is distributed to the folder part by using the mail function or the like.

Figure 38:
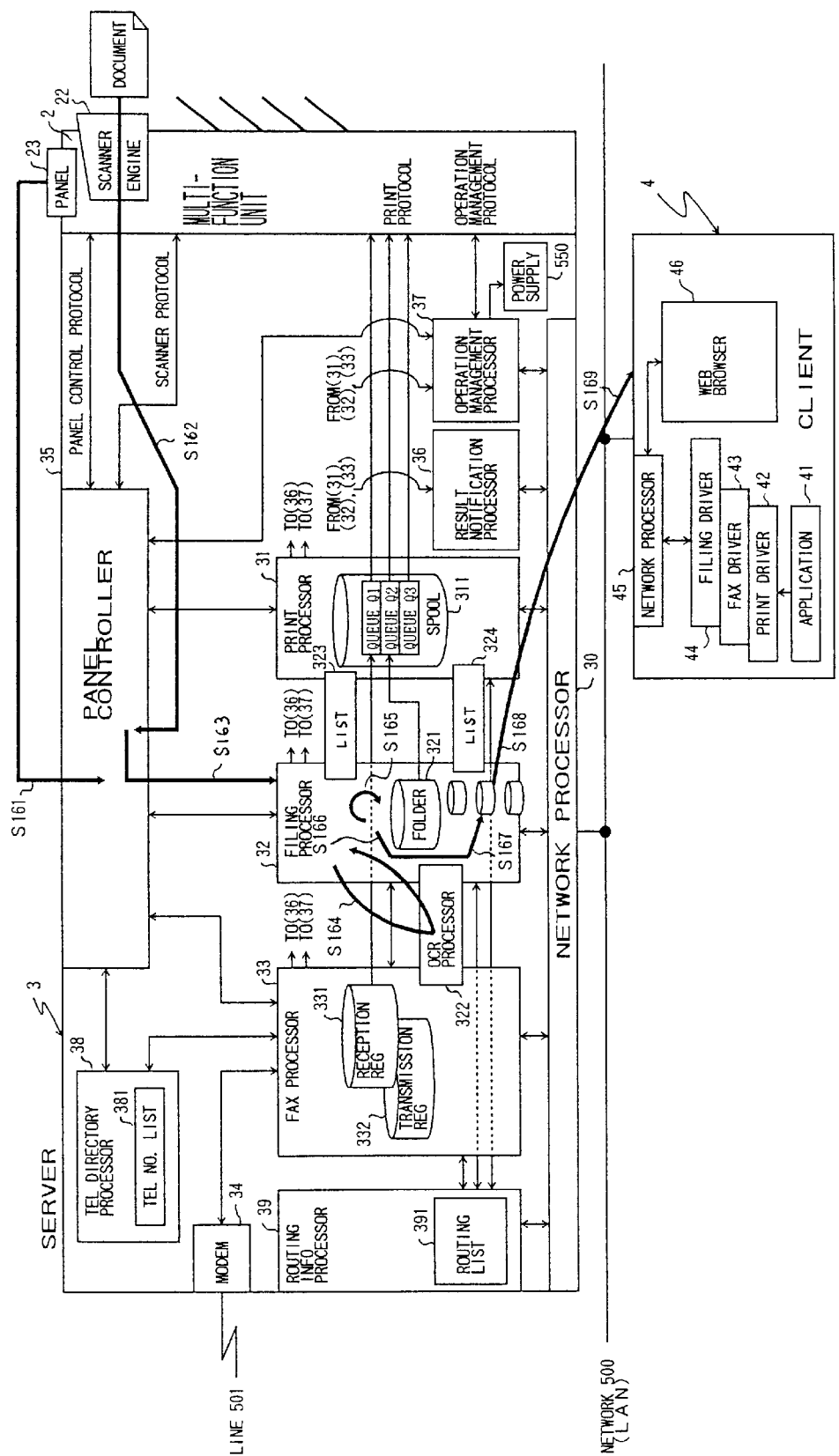
FIG. 38 is a diagram for explaining a distribution process to a folder part when registering a document.
Figure 39:
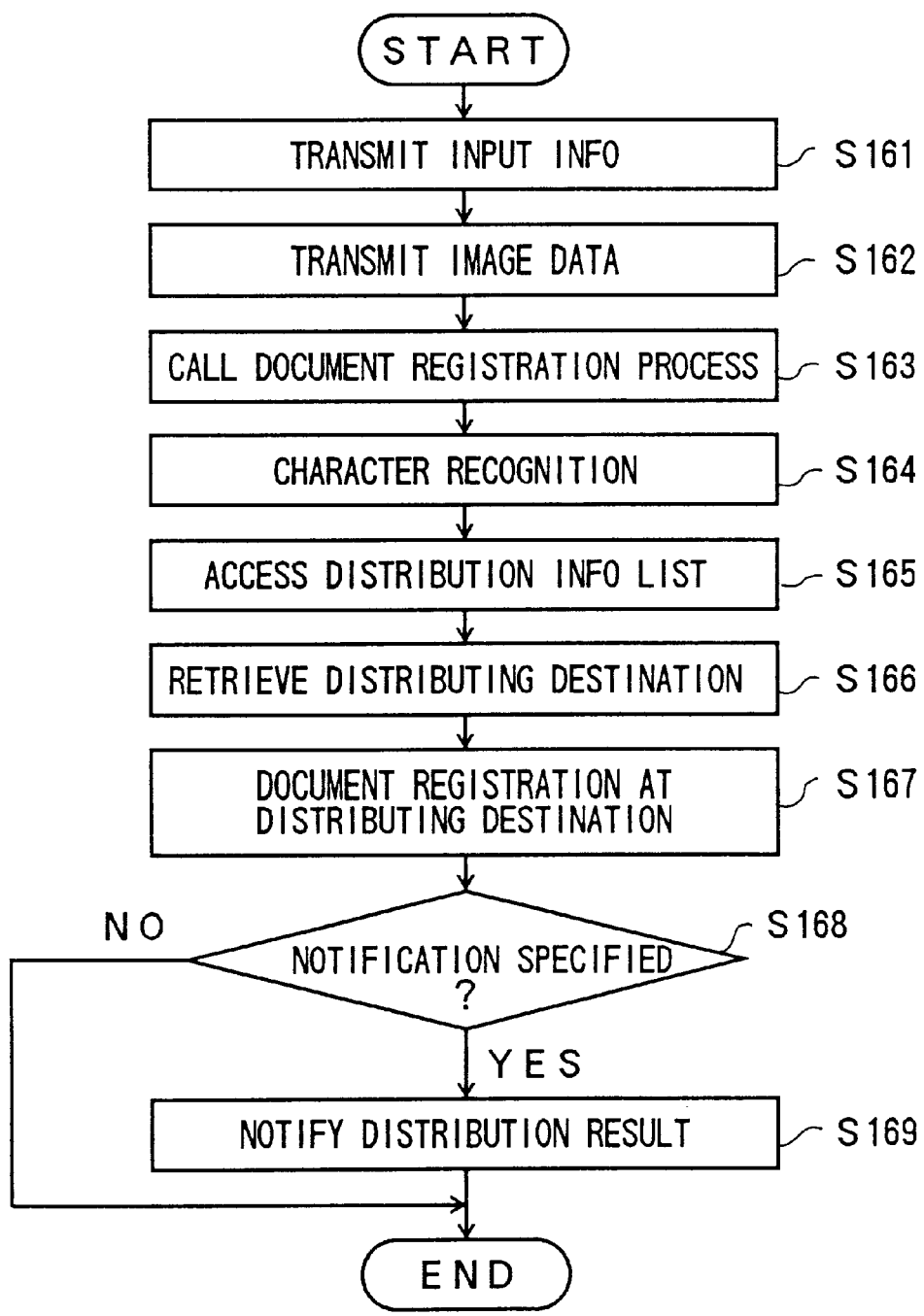
FIG. 39 is a flow chart for explaining a procedure of the distribution process to the folder part when registering the document.

FIG. 38 is a diagram for explaining a distribution process to a folder part when registering a document. In FIG. 38, those parts which are the same as those corresponding parts in FIG. 6 are designated by the same reference numerals, and a description thereof will be omitted. In addition, FIG. 39 is a flow chart for explaining a procedure of the distribution process to the folder part when registering the document. In FIG. 38, S161 through S169 respectively correspond to steps S161 through S169 shown in FIG. 39.

In FIGS. 38 and 39, when an operation related to the document registration is made from the operation panel 23 of the multi-function unit 2, the step S161 transmits input information from the operation panel 23 to the filing processor 32 via the panel controller 35 of the server 3. In addition, the step S162 transmits the image data read from the document by the scanner engine 22 of the multi-function unit 2 to the filing processor 32 via the panel controller 35 of the server 3. The step S163 calls the document registration process from the panel controller 35 with respect to the filing processor 32, and in the step S164, the OCR processor 322 recognizes the character at the character recognition position which is set in advance or is specified.

The step S165 makes a reference to a distribution information list 323 of the filing processor 32 based on a character recognition result, and the step S166 retrieves a distributing destination from the distribution information list 323. The step S167 registers the document at the distributing destination. The step S168 decides whether or not a notification is specified in the folder information list 323 at the distributing destination. If the decision result in the step S168 is YES, the step S169 notifies the specified notifying destination of a distribution result to the folder part. The specified notifying destination may be the computer 4 which is coupled to the LAN 500, for example, and the distribution result may be notified using the mail function or the like.

Figure 40:
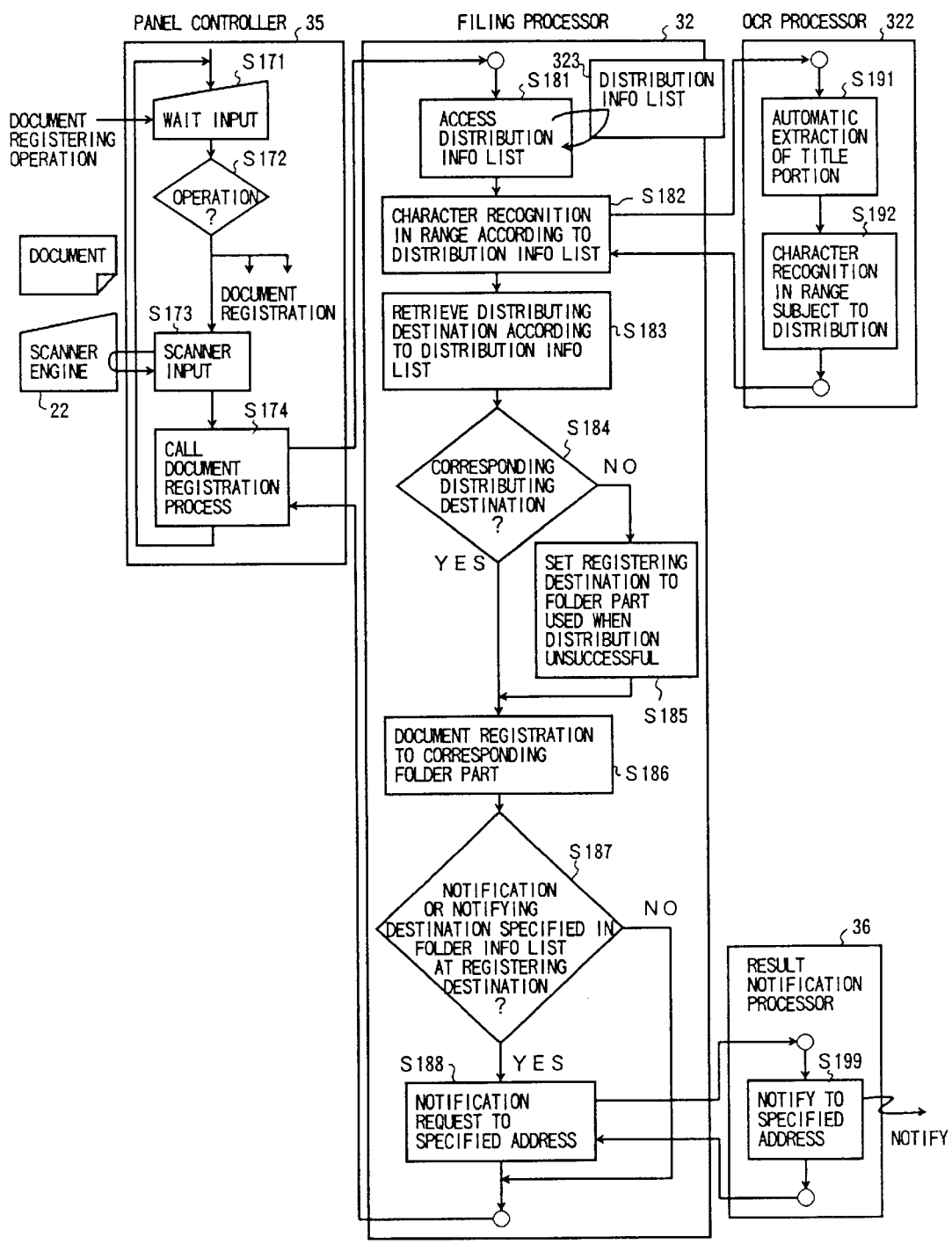
FIG. 40 is a flow chart for explaining the distribution process to the folder part when registering the document.

FIG. 40 is a flow chart for explaining the distribution process to the folder part when registering the document. In a step S171 shown in FIG. 40, the panel controller 35 waits for an input and/or selection related to the document registration from the operation panel 23. When the input and/or selection is made from the operation panel 23, a step S172 judges the kind of document registration. For example, if the document registration relates to the registration of the image data of the document which is read, the process advances to a step S173, and the image data from the scanner engine 22 is input. In addition, a step S174 calls a document registration process with respect to the filing processor 32.

In the filing processor 32, when the document registration process is called from the panel controller 35, a step S181 makes an access to the distribution information list 323. A step S182 instructs the OCR processor 322 to carry out a character recognition within a range depending on the distribution information list 323. Contents shown in FIG. 41 are included in the distribution information list 323.

Figure 41:
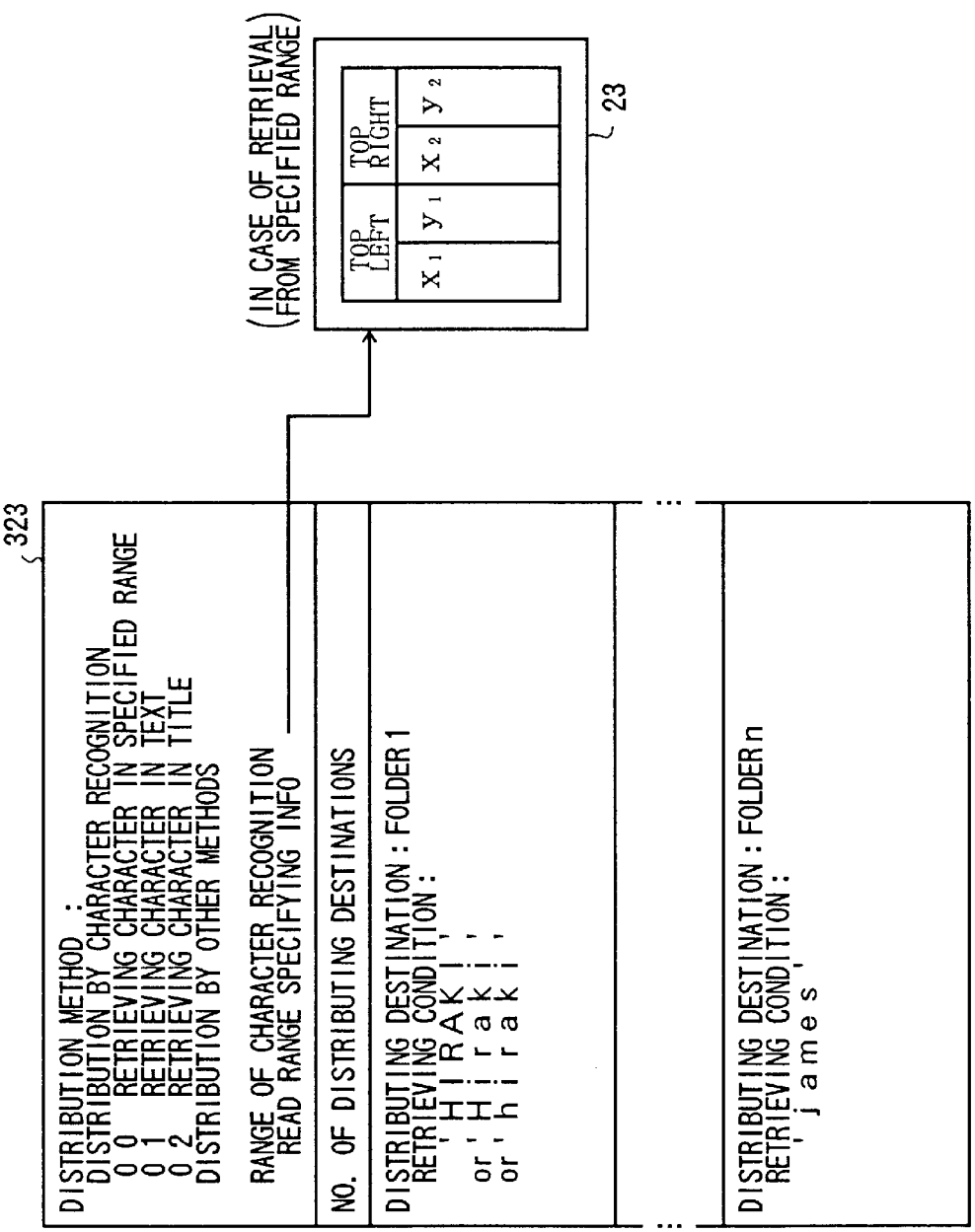
FIG. 41 is a diagram showing a distribution information list.

In the distribution information list 323 shown in FIG. 41, the distribution method is classified into a distribution based on character recognition and a distribution based on other methods. In the case of the distribution based on the character recognition, a recognition of a retrieved character in a specified range is selected by an input code "00", a recognition of a retrieved character within a text or body of the document is selected by an input code "01", and a recognition of a retrieved character within a title of the document is selected by an input code "03". On the other hand, in the case of the distribution based on other methods, a recognition of a retrieved character within a specified range is selected by specifying ranges x1 through y2 indicated on the right-hand side in FIG. 41. In addition, the distribution information list 323 also includes a number of distributing destinations, a distributing destination (folder part) within the folder 321, a retrieval condition and the like.

In the OCR processor 322, if a character recognition is instructed from the filing processor 32, a step S191 carries out a character recognition by automatically extracting a title portion, and a step S192 carries out a character recognition within a range subject to the distribution. Recognition results of the steps S191 and S192 are supplied to the filing processor 32.

A step S183 retrieves a distributing destination based on the distribution information list 323. A step S184 decides whether or not a corresponding distributing destination (folder part) exists in the distribution information list 323. If the decision result in the step S184 is NO, a step S185 sets the document registering destination to a folder part which is used when the distribution is unsuccessful. If the decision result in the step S184 is YES or after the step S185, a step S186 registers the document in the corresponding folder part. A step S187 decides whether or not a notification or a notifying destination is specified in a folder information list 324 with respect to the folder part at the registering destination. The folder information list 324 includes information shown in FIG. 42. The folder information list 324 shown in FIG. 42 includes a folder part name, existence of specified notification, notifying method, and notifying destination.

If the decision result in the step S187 is NO, the process of the filing processor 32 ends, and the process moves to the process of the panel controller 35. On the other hand, if the decision result in the step S187 is YES, a step S188 instructs the result notification processor 36 to make a document registration result notification to an address which is specified as the notifying destination in the folder information list 324. In the result notification processor 36, a step S199 notifies the document registration result to the specified address using the mail function, for example, in response to the instruction from the filing processor 32. After the step S199, the process moves to the process of the panel controller 35.

(4c) Specifying Process Content After Distribution When Registering Document

In this embodiment, when registering the document (image data) which is read by the scanner engine 22 of the multi-function unit 2 or obtained by the facsimile reception, the character within the read or obtained image data is recognized, and a process which is specified in advance is carried out based on a recognition result.

Figure 43:
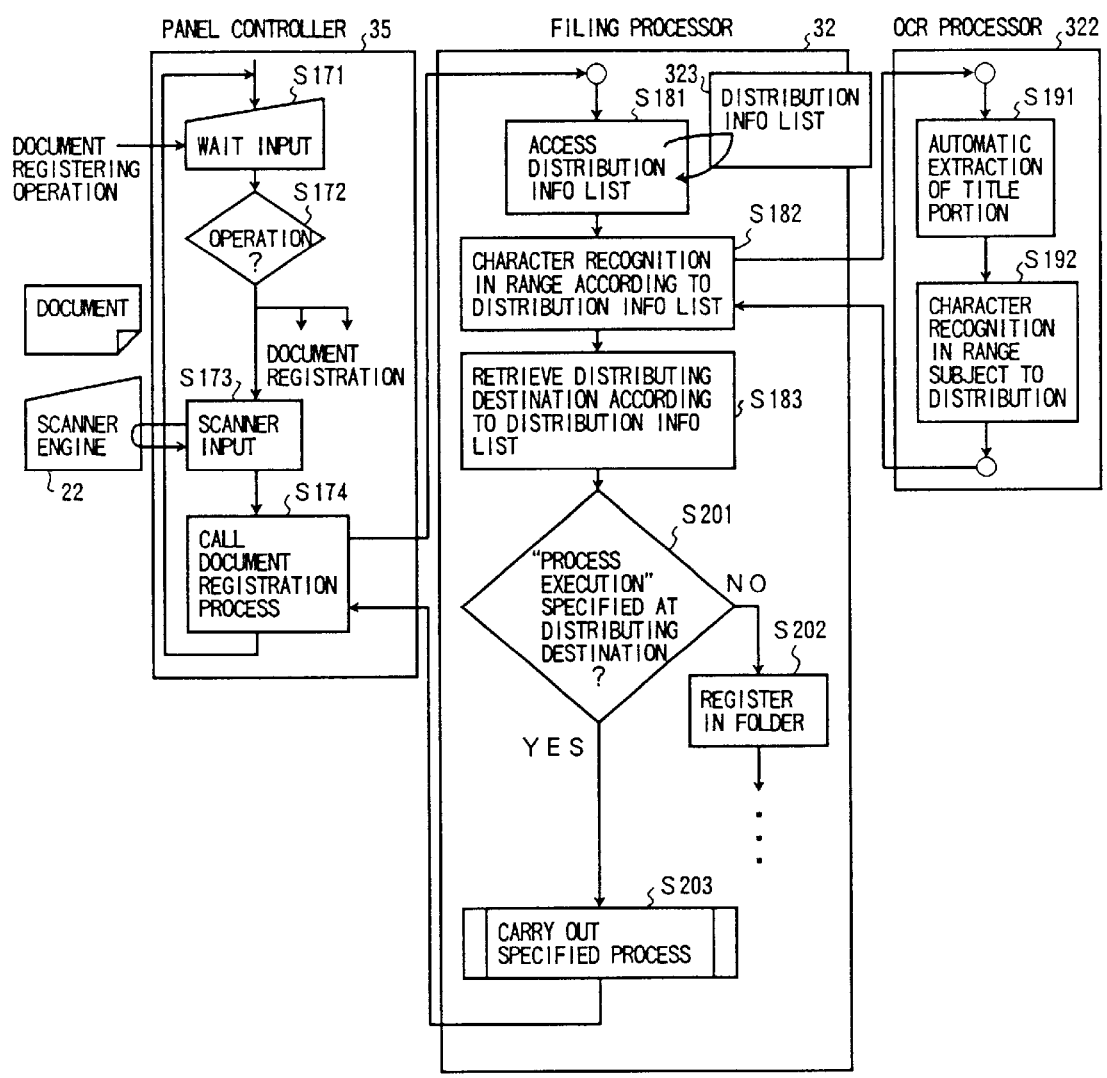
FIG. 43 is a flow chart for explaining a processing content specifying process after the distribution when registering the document.

FIG. 43 is a flow chart for explaining a processing content specifying process after the distribution when registering the document. In FIG. 43, those parts which are the same as those corresponding parts in FIG. 40 are designated by the same reference numerals, and a description thereof will be omitted.

In FIG. 43, when a document registration process is called from the panel controller 35, the filing processor 32 makes an access to the distribution information list 323 in the step S181. The step S182 instructs the OCR processor 322 to carry out a character recognition within a range depending on the distribution information list 323. Contents shown in FIG. 44 are included in the distribution information list 323.

Figure 44:
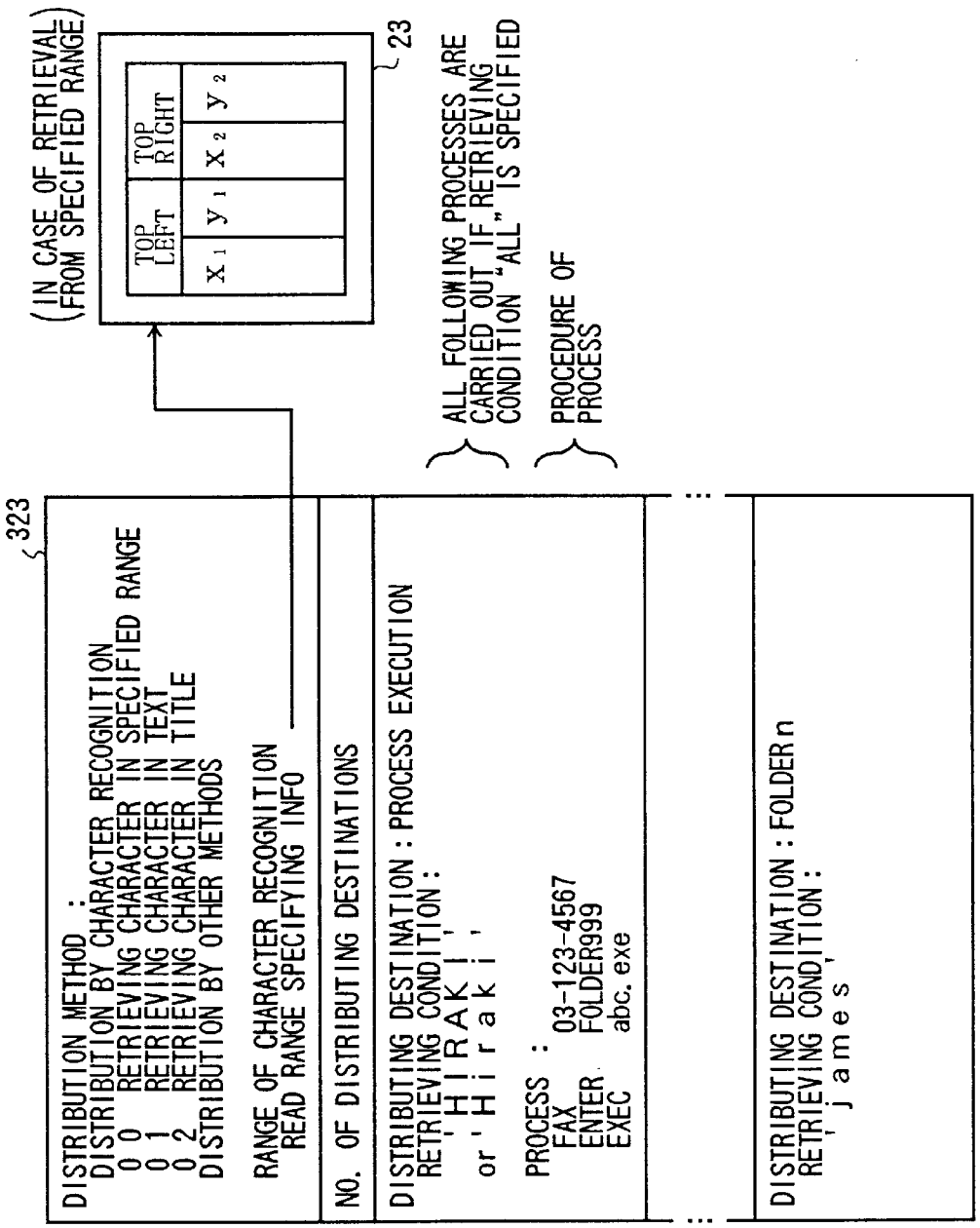
FIG. 44 is a diagram showing a distribution information list.

In FIG. 44, those parts which are the same as those corresponding parts in FIG. 41 are designated by the same reference numerals, and a description thereof will be omitted. The distribution information list 323 shown in FIG. 44 includes a distributing destination (folder part) within the folder 321, retrieving condition, process, and the like. In a case where "process execution" is specified as the distributing destination, a procedure of the process is specified in an item "process". When "all" is specified in "retrieving condition", all processes which follow are carried out.

In the OCR processor 322, if a character recognition is instructed from the filing processor 32, the step S191 carries out a character recognition by automatically extracting a title portion, and the step S192 carries out a character recognition within a range subject to the distribution. Recognition results of the steps S191 and S192 are supplied to the filing processor 32.

The step S183 retrieves a distributing destination based on the distribution information list 323. A step S201 decides whether or not the "process execution" is specified at a corresponding distributing destination (folder part) in the distribution information list 323. If the decision result in the step S201 is NO, a step S202 registers the document in the corresponding folder part, and processes similar to those shown in FIG. 40 may be carried out thereafter. On the other hand, if the decision result in the step S201 is YES, a step S203 carries out a process specified by the item "process" in the distribution information list 323, and the process moves to the process of the panel controller 35.

(5) Operation Managing Process (5a) Accounting By ID Input

In this embodiment, accounting with respect to operations carried out by the operator, such as copying, facsimile transmission and document registration, is managed by inputting an identification (ID) of the operator from the operation panel 23 of the multi-function unit 2. It is possible to prevent unauthorized use of the composite apparatus 1 and the network system which includes this composite apparatus 1 by adding a password to the ID. In addition, it is possible to specify a process for each ID by defining attribute information in advance with respect to each ID. For example, a process which may be specified by the attribute information includes a registration of a document to a specific folder part of an individual or department, a result notification of a facsimile transmission or document registration, and the like.

Figure 45:
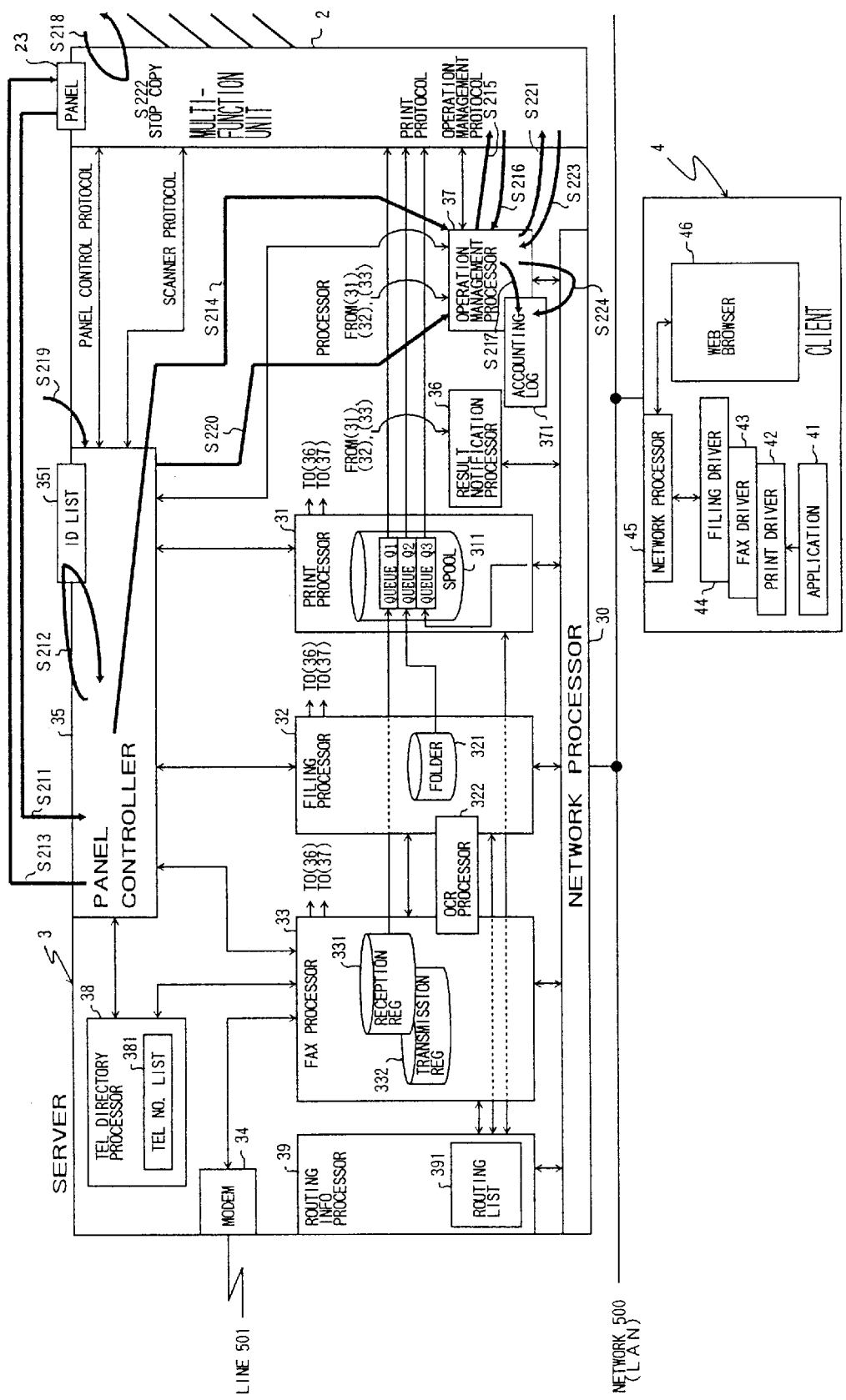
FIG. 45 is a diagram for explaining an accounting process by inputting an identification.
Figure 46:
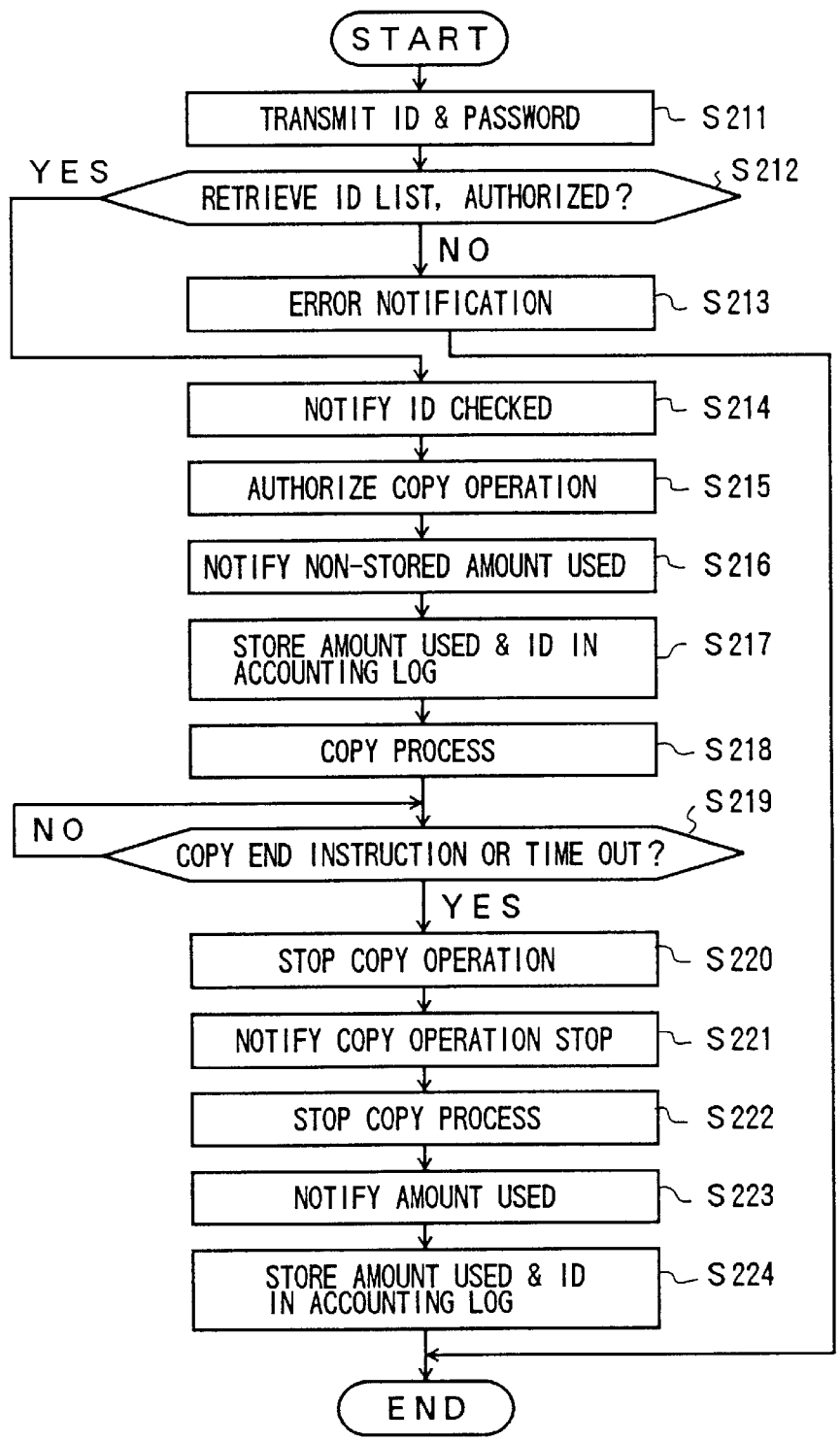
FIG. 46 is a flow chart for explaining a procedure of the accounting process by inputting the identification.

FIG. 45 is a diagram for explaining an accounting process by inputting the ID. In FIG. 45, those parts which are the same as those corresponding parts in FIG. 6 are designated by the same reference numerals, and a description thereof will be omitted. In addition, FIG. 46 is a flow chart for explaining a procedure of the accounting process by inputting the ID. In FIG. 45, S211 through S224 respectively correspond to steps S211 through S224 shown in FIG. 46.

For the sake of convenience, a description will be given of the accounting process for a case where the copying function of the multi-function unit 2 is used. In FIGS. 45 and 46, the step S211 transmits the ID and the password input from the operation panel 23 of the multi-function unit 2 to the panel controller 35 of the server 3. The step S212 retrieves an ID list 351 within the panel controller 35 based on the input ID and password, and decides whether or not the ID and the password correspond to each other and the ID is authorized to use the composite apparatus 1 and the network system which includes this composite apparatus 1. If the decision result in the step S212 is NO, the step S213 outputs an error notification to the operation panel 23. On the other hand, if the decision result in the step S212 is YES, the step S214 notifies the operation managing processor 37 that the ID is already checked. The step S215 outputs a copy operation authorization to the equipment state managing part 27 of the multi-function unit 2 in response to this notification indicating that the ID is already checked. If an amount used which is not yet stored exists with respect to the same ID due to an unsuccessful notification of the amount used by an immediately preceding process or the like, the step S216 notifies the amount used which is not yet stored to the operation managing processor 37, and the step S217 stores this amount used in an accounting log 371 of the operation managing processor 37 together with the ID. In addition, the step S218 carries out a copying process using the scanner engine 22 and the printer engine 21.

The step S219 decides whether or not an end of the copying process is instructed from the operation panel 23 or, whether or not a time which is measured by a timer within the panel controller 35 and during which no copying process is carried out exceeds a predetermined time. When the decision result in the step S219 becomes YES, the step S220 transmits a copy operation stop instruction to the operation managing processor 37. As a result, the step S221 notifies the equipment state managing part 27 of the copy operation stop, and the step S222 stops the copying process of the multi-function unit 2. When the copying process of the multi-function unit 2 stops, the step S223 notifies the operation managing processor 37 of the amount used by the copying process, and the step S224 stores the notified amount used in the accounting log 371 together with the ID.

Figure 47:
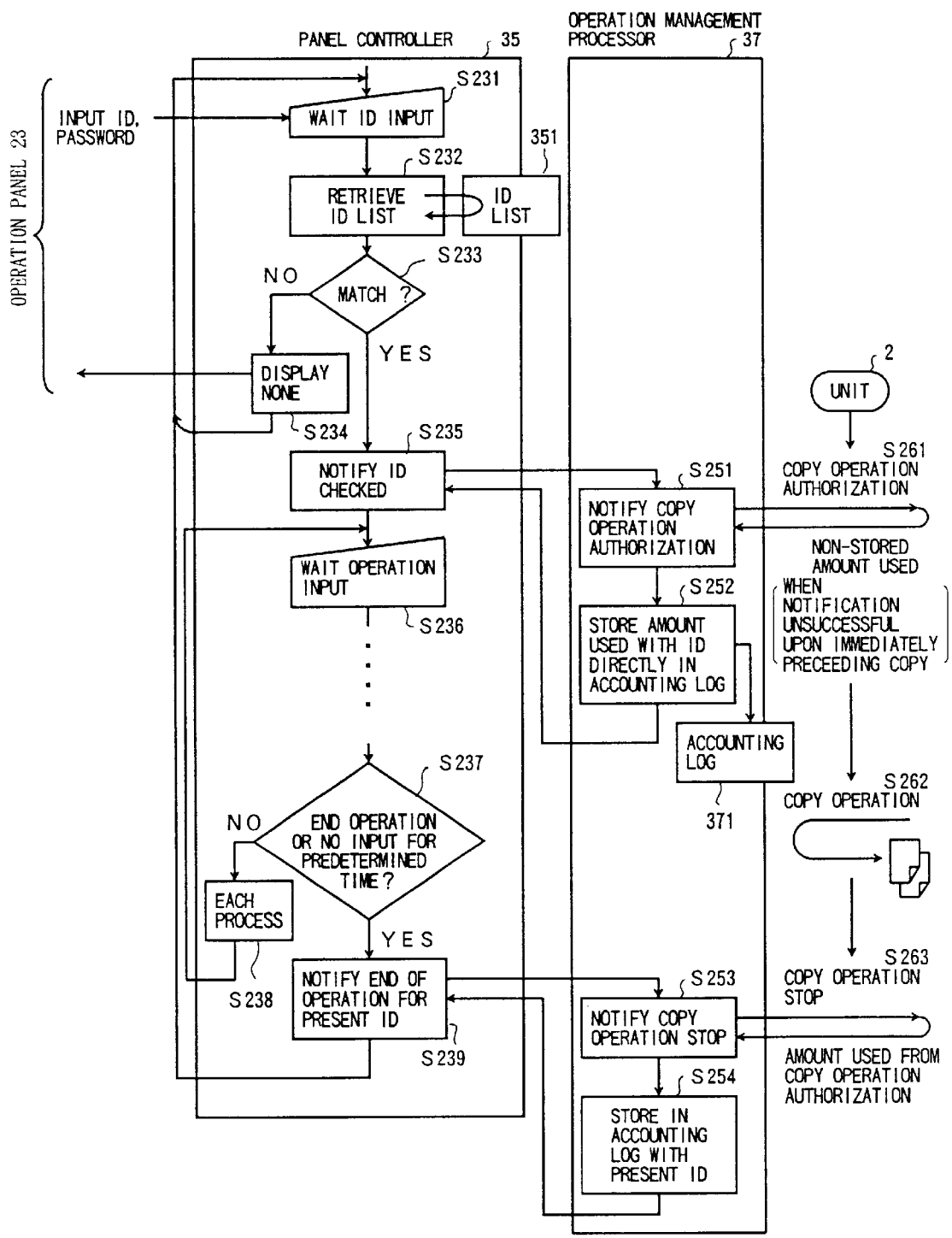
FIG. 47 is a flow chart for explaining the accounting process by inputting the identification.

FIG. 47 is a flow chart for explaining the accounting process by the ID input. In FIG. 47, the panel controller 35 waits for the ID and the password to be input from the operation panel 23 in a step S231. When the ID and the password are input from the operation panel 23, a step S232 retrieves the ID list 351 based on the input ID and password. FIG. 48 is a diagram showing the ID list 351. In FIG. 48, an enciphered password and attribute information are stored with respect to each ID, and the attribute information specifies a notification of a facsimile transmission or document registration result to a notifying destination "NOTIFY" and a registration process to a specific folder part "FOLDER".

A step S233 decides whether or not the input ID and password match an ID and password included in the ID list 351. If the decision result in the step S233 is NO, a step S234 displays on the operation panel 23 a message which indicates that no corresponding ID is found, and the process of the panel controller 35 returns to the step S231. On the other hand, if the decision result in the step S233 is YES, a step S235 notifies the operation managing processor 37 that the ID is already checked. A step S236 waits for an operation input from the operation panel 23 of the multi-function unit 2.

When the operation managing processor 37 receives the notification from the panel controller 35 that the ID is already checked, a step S251 notifies the multi-function unit 2 of the copy operation authorization. If an amount used which is not yet stored exists with respect to the same ID due to an unsuccessful notification of the amount used by an immediately preceding process or the like, a step S261 notifies this amount used which is not yet stored to the operation managing processor 37. In the operation managing processor 37, a step S252 stores this amount used in the accounting log 371 of the operation managing processor 37 together with the ID, and notifies the panel controller 35 of this storage to the accounting log 371. FIG. 49 is a diagram showing the accounting log 371. As shown in FIG. 49, the accounting log 371 stores a date, time, ID, amount used for each paper size, that is, number of paper/sides used and the like, and it is possible to store a rate (price) directly in place of the amount used. In addition, in the multi-function unit 2, a step S262 carries out a copying process using the scanner engine 22 and the printer engine 21.

In the panel controller 35, a step S237 decides whether or not an end of the copying process is instructed from the operation panel 23 or, whether or not a time which is measured by a timer within the panel controller 35 and during which no copying process is carried out exceeds a predetermined time. If the decision result in the step S237 is NO, a step S238 continues the process in the multi-function unit 2, and the process of the panel controller 35 returns to the step S236. On the other hand, if the decision result in the step S237 is YES, a step S239 notifies the operation managing processor 37 of the end of the operation with respect to the present ID, and the process of the panel controller 35 returns to the step S231.

In the operation managing processor 37, a step S253 notifies a copy operation stop to the equipment state managing part 27 of the multi-function unit 2 in response to a copy operation stop instruction. In the multi-function unit 2, a step S263 stops the copying process of the multi-function unit 2 and notifies the operation managing processor 37 of the amount used by the copying process. In the operation managing processor 37, the notified amount used is stored in the accounting log 371 together with the ID, and the panel controller 35 is notified of this storage to the accounting log 371 in a step S254.

(5b) Load Reducing Process of Equipment State Display

In this embodiment, state information related to the operation state of the composite apparatus 1, the state of the supplies (such as toner, developing agent and photoconductive body), and the like is accessible from the web browser 46 or the like of the computer 4 within the network system. In this case, if the access to the state information is made simultaneously from a plurality of computers 4 or the like or, if the access to the state information from the computer 4 or the like is unconditionally permitted, there is a possibility that an extremely large load will be applied on the server 3 of the composite apparatus 1 which is accessed. Hence, in this embodiment, the operation managing processor 37 of the server 3 stores the state information of the composite apparatus 1 at predetermined time intervals, and the load on the server 3 is reduced by returning the stored state information when an access to the state information is made at a frequency higher than the predetermined time intervals.

Figure 50:
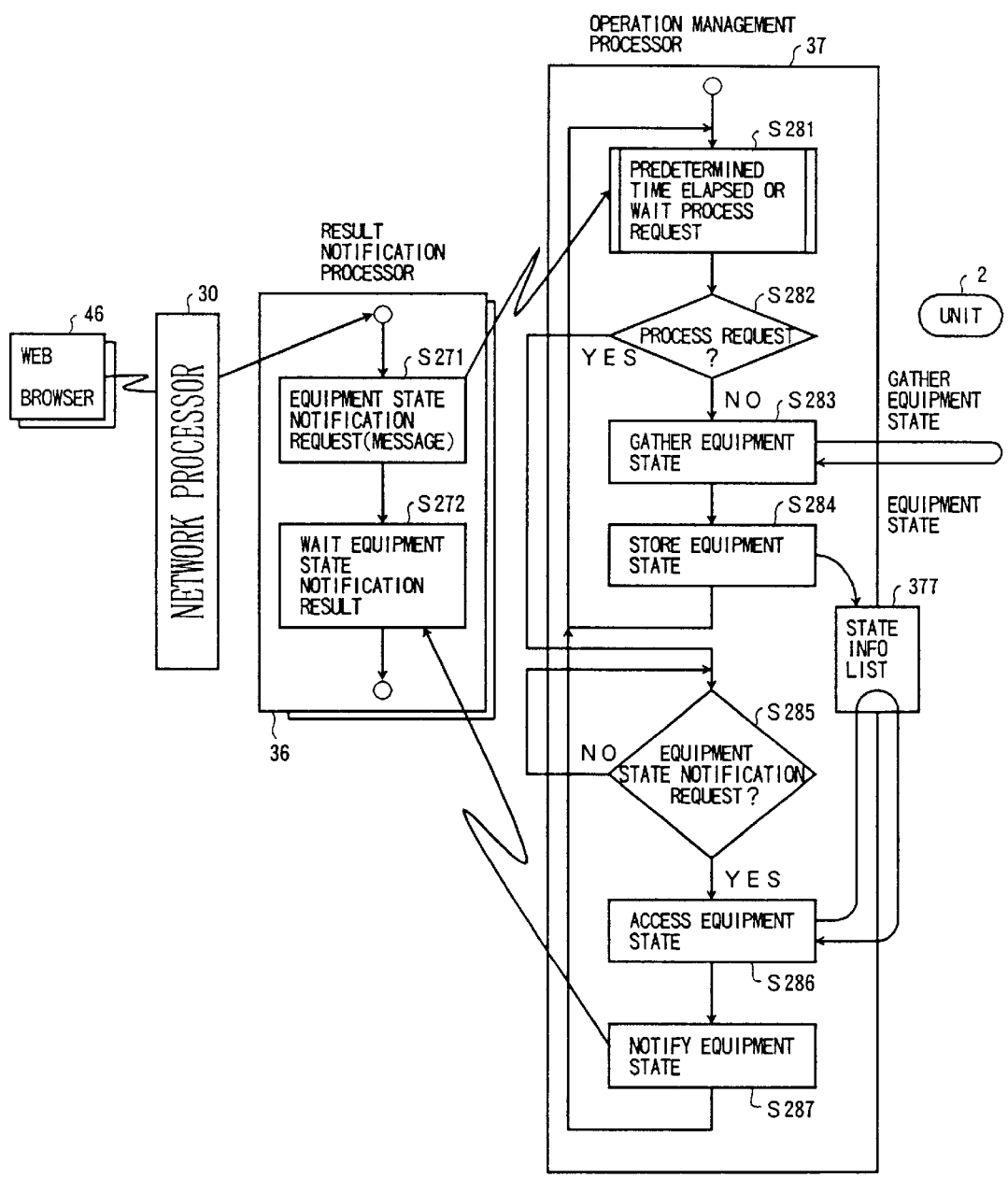
FIG. 50 is a flow chart for explaining load reducing process for an equipment state display.

FIG. 50 is a flow chart for explaining the load reducing process for the equipment state display. In FIG. 50, when a state information access request which requests an access to the state information of the multi-function unit 2 is made from the web browser 46 of the computer 4, this state information access request is transmitted to the result notification processor 36 via the network processor 30 of the server 3. In the result notification processor 36, a step S271 requests notification of the state information of the multi-function unit 2 with respect to the operation managing processor 37.

In the operation managing processor 37, a step S281 waits until a predetermined time elapses or, until a request for a state information gathering process is received. A step S282 decides whether or not the request for the state information gathering process is received, and the process advances to a step S285 which will be described later, so as to decide whether or not a request for a state information notification is received, if the decision result in the step S282 is YES. On the other hand, if the decision result in the step S282 is NO, a step S283 makes an access to the equipment state managing part 27 of the multi-function unit 2 and gathers the state information of the multi-function unit 2. A step S284 stores the gathered state information in a state information list 377.

When the decision result in the step S285 becomes YES, a step S286 acquires the stored state information by accessing the state information list 377. Then, a step S287 notifies the result notification processor 36 of the acquired state information. In the result notification processor 36, a step S272 waits for an equipment state notification result, and the web browser 46 at the request source is notified of the equipment state notification result.

Further, the present invention is not limited to these embodiments, but various variations and modifications may be made without departing from the scope of the present invention.

What is claimed is:

1. A multi-function unit, comprising:

a printer engine;

a logical copying machine carrying out a copying process with respect to a recording medium by said printer engine;

a plurality of logical printers carrying out printing processes with respect to the recording medium by said printer engine independently of the copying process of said logical copying machine; and a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers.

2. The multi-function unit as claimed in claim 1, further comprising:

a spool storing a plurality of queues for copying or printing, wherein each of the bin stackers corresponds to a pair of a corresponding one of the queues and a corresponding one of said logical copying machine and said logical printers.

3. The multi-function unit as claimed in claim 1, wherein said multi-bin stacker comprises a plurality of bin stackers corresponding to said logical copying machine.

4. The multi-function unit as claimed in claim 1, wherein said multi-bin stacker comprises a plurality of bin stackers corresponding to at least one of said logical printers.

5. The multi-function unit as claimed in claim 1, wherein each of said logical printers corresponds to one print source.

6. The multi-function unit as claimed in claim 1, wherein said printer engine sets a priority of a printing order in an order of print requests received from said logical copying machine and said logical printers.

7. The multi-function unit as claimed in claim 1, wherein said printer engine sets a priority of a printing order so that a print request received from said logical copying machine has a higher priority than print requests received from said logical printers.

8. The multi-function unit as claimed in claim 1, wherein said printer engine variably sets a priority of a printing order with respect to print requests received from said logical printers.

9. The multi-function unit as claimed in claim 1, wherein said printer engine, said logical copying machine and said logical printers form a single unit.

10. The multi-function unit as claimed in claim 1, which further comprises:

a scanner engine; and a logical scanner reading a document by said scanner engine.

11. The multi-function unit as claimed in claim 10, wherein said printer engine, said logical copying machine, said logical printers, said scanner engine and said logical scanner form a single unit.

12. The multi-function unit as claimed in claim 10, wherein said scanner engine and said logical scanner form a single unit.

13. The multi-function unit as claimed in claim 10, which further comprises:

an operation panel coupled to said logical copying machine and said logical scanner; and an equipment state managing part, coupled to said logical copying machine, said logical scanner and said logical printers, gathering information from said logical copying machine, said logical scanner and said logical printers and managing information related to states of the multi-function unit.

14. The multi-function unit as claimed in claim 13, wherein:

said operation panel, said logical scanner, said equipment state managing part and said logical printers respectively exchange information with a server according to a panel control protocol, a scanner protocol, an operation management protocol and a print protocol, and said server is linked to a computer which is coupled to a network and carries out a printing, document registration, facsimile communication and operation management via the network.

15. The multi-function unit as claimed in claim 14, wherein said operation panel, said logical scanner, said equipment state managing part and said logical printers are coupled to said server via a private local area network (LAN).

16. A network system, comprising:

at least one computer;

at least one multi-function unit comprising:

a printer engine, a logical copying machine carrying out a copying process with respect to a recording medium by said printer engine, a plurality of logical printers carrying out printing processes with respect to the recording medium by said printer engine independently of the copying process of said logical copying machine, and a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and one or more networks coupling said computer and said multi-function unit.

17. The network system as claimed in claim 16, which further comprises:

a server coupled to said multi-function unit according to a protocol and controlling said multi-function unit, said server linking to said computer which is coupled to said one or more networks and carrying out at least one of a printing, document registration, facsimile communication and operation management via said one or more networks.

18. The network system as claimed in claim 17, wherein said multi-function unit and said server are coupled via a private local area network (LAN).

19. A network system, comprising:

at least one computer;

at least one multi-function unit comprising:

a printer engine, a logical copying machine carrying out a copying process with respect to a recording medium by said printer engine, a plurality of logical printers carrying out printing processes with respect to the recording medium by said printer engine independently of the copying process of said logical copying machine, and a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and one or more networks coupling said computer and said multi-function unit, wherein said networks comprise first, second and third networks, at least one multi-function unit and at least one server being coupled to said first network, at least one multi-function unit and at least one server being coupled to said second network, said first network and said second network being coupled via said third network.

20. A network system, comprising:
at least one computer;
at least one multi-function unit comprising:
   a printer engine,
   a logical copying machine carrying out a copying process with respect to a recording medium by said printer engine,
   a plurality of logical printers carrying out printing processes with respect to the recording medium by said printer engine independently of the copying process of said logical copying machine,
   a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and
one or more networks coupling said computer and said multi-function unit; and
a server coupled to said multi-function unit according to a protocol and controlling said multi-function unit, said server comprising:
   a print processor having a spool part in which print data are queued, and transferring the print data queued in the spool part to said multi-function unit according to a print protocol, and
   a routing information processor having a routing list which stores at least an address of said multi-function unit or another server coupled to the network,
   wherein a transmitting destination of the print data being specified by accessing the routing list.

21. The network system as claimed in claim 20, wherein said one or more networks comprise first, second and third networks, at least one multi-function unit and at least one server being coupled to said first network, at least one multi-function unit and at least one server being coupled to said second network, said first network and said second network being coupled via said third network.

22. A network system, comprising:
at least one computer;
at least one multi-function unit comprising:
   a printer engine,
   a logical copying machine carrying out a copying process with respect to a recording medium by said printer engine,
   a plurality of logical printers carrying out printing processes with respect to the recording medium by said printer engine independently of the copying process of said logical copying machine,
   a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and
one or more networks coupling said computer and said multi-function unit; and
a server coupled to said multi-function unit according to a protocol and controlling said multi-function unit, said server comprising:
   a filing processor having a folder which stores image data read from a document by said multi-function unit, and carrying out a document registration process by controlling input and output of the image data with respect to the folder, and
   a routing information processor having a routing list which stores at least an address of said multi-function unit or another server coupled to the network,
   wherein a transmitting destination of the print data being specified by accessing the routing list.

23. The network system as claimed in claim 22, wherein said networks comprise first, second and third networks, at least one multi-function unit and at least one server being coupled to said first network, at least one multi-function unit and at least one server being coupled to said second network, said first network and said second network being coupled via said third network.

24. A network system, comprising:
at least one computer;
at least one multi-function unit comprising:
   a printer engine,
   a logical copying machine carrying out a copying process with respect to a recording medium by said printer engine,
   a plurality of logical printers carrying out printing processes with respect to the recording medium by said printer engine independently of the copying process of said logical copping machine,
   a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and
one or more networks coupling said computer and said multi-function unit; and
a server coupled to said multi-function unit according to a protocol and controlling said multi-function unit, said server comprising:
   a facsimile processor having a reception register and a transmission register which store image data, and controlling facsimile transmission and reception of the image data, and
   a routing information processor having a routing list which stores at least an address of said multi-function unit or another server coupled to the network,
   wherein said facsimile processor automatically retrieving and selecting a route having a minimum transmission cost by accessing the routing list.

25. The network system as claimed in claim 24, wherein said networks include first, second and third networks, at least one multi-function unit and at least one server being coupled to said first network, at least one multi-function unit and at least one server being coupled to said second network, said first network and said second network being coupled via said third network.

26. A network system, comprising:
- at least one computer;
- at least one multi-function unit comprising:
  - a printer engine,
  - a logical copying machine carrying out a copying process with respect to a recording medium by said printer engine,
  - a plurality of logical printers carrying out printing processes with respect to the recording medium by said printer engine independently of the copying process of said logical copying machine,
  - a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers; and
- one or more networks coupling said computer and said multi-function unit; and
- a server coupled to said multi-function unit according to a protocol and controlling said multi-function unit, said server comprising:
  - a facsimile processor having a reception register and a transmission register which store image data, and controlling facsimile transmission and reception of the image data, and
  - a telephone directory processor having a telephone number list which stores telephone numbers, and controlling input and output of a telephone number used for a facsimile process,
  - wherein said telephone directory processor generating a telephone directory to be displayed on an operation panel of said multi-function unit based on the telephone number list.

27. The network system as claimed in claim 26, wherein said networks comprise first, second and third networks, at least one multi-function unit and at least one server being coupled to said first network, at least one multi-function unit and at least one server being coupled to said second network, said first network and said second network being coupled via said third network.

28. A network system, comprising:
- at least one computer;
- at least one multi-function unit comprising:
  - a printer engine,
  - a logical copying machine carrying out a copying process with respect to a recording medium by said printer engine,
  - a plurality of logical printers carrying out printing processes with respect to the recording medium by said printer engine independently of the copying process of said logical copying machine,
  - a multi-bin stacker having a plurality of bin stackers, each of the bin stackers corresponding to either said logical copying machine or to one of said logical printers such that each bin stacker is used exclusively by said logical copying machine or one of said logical printers, thereby carrying out apparent parallel operations on said logical copying machine and said logical printers;
- one or more networks coupling said computer and said multi-function unit;
- a directory provided by the network system; and
- a server coupled to said multi-function unit according to a protocol and controlling said multi-function unit, said server comprising:
  - a routing information processor having a routing list which stores an address of each multi-function unit and each server coupled within the network system,
  - wherein said routing information processor automatically generating the routing list by accessing said directory provided by the network system.

29. A multi-function unit, comprising:
- a logical copying machine performing a copying process; and
- a plurality of logical printers performing printing processes independently of said logical copying machine, such that said logical copying machine and said logical printers operate in parallel.

30. A method for performing multiple functions using a multi-function unit, comprising:
- performing, by a logical copying machine, a copying process; and
- performing, by a plurality of logical printers, printing processes independently of said logical copying machine, such that said logical copying machine and said logical printers operate in parallel.

\* \* \* \* \*